US012711152B1

(12) United States Patent
Backler et al.

(10) Patent No.: US 12,711,152 B1
(45) Date of Patent: Aug. 18, 2026

(54) SYSTEMS AND METHODS FOR PROCESSING INFORMATION

(71) Applicant: The Boston Consulting Group, Inc., Boston, MA (US)

(72) Inventors: Wendi Backler, Vancouver (CA); Nicole Quenneville, Vancouver (CA); Harsh Kaushik, Gurgaon, IN (US); Ruchika Mendiratta, Gurgaon, IN (US); Michael Ringel, Boston, MA (US); Joe Brillando, San Francisco, CA (US); Alex Aboshiha, Los Angeles, CA (US); Chris Yellick, Chicago, IL (US); Carl Reed Jessen, Seattle, WA (US)

(73) Assignee: The Boston Consulting Group, Inc., Boston, MA (US)

( * ) Notice: Subject to any disclaimer, the term of this patent is extended or adjusted under 35 U.S.C. 154(b) by 74 days.

(21) Appl. No.: 18/495,243

(22) Filed: Oct. 26, 2023

Related U.S. Application Data

(63) Continuation-in-part of application No. 16/691,341, filed on Nov. 21, 2019, now abandoned, and a continuation-in-part of application No. 16/668,835, filed on Oct. 30, 2019, now abandoned.

(60) Provisional application No. 62/770,455, filed on Nov. 21, 2018.

(51) Int. Cl.
*G06F 16/28* (2019.01)

(52) U.S. Cl.
CPC .................................. *G06F 16/285* (2019.01)

(58) Field of Classification Search
CPC .................................................... G06F 16/285
USPC ......................................................... 707/740
See application file for complete search history.

(56) References Cited

U.S. PATENT DOCUMENTS

| | | | | |
|---|---|---|---|---|
| 6,266,649 | B1 * | 7/2001 | Linden | G06Q 30/02<br>705/26.7 |
| 8,805,845 | B1 | 8/2014 | Li et al. | |
| 8,990,149 | B2 | 3/2015 | Danciu et al. | |
| 9,286,391 | B1 | 3/2016 | Dykstra et al. | |
| 9,715,495 | B1 | 7/2017 | Tacchi et al. | |
| 9,836,183 | B1 | 12/2017 | Love et al. | |
| 9,852,231 | B1 | 12/2017 | Ravi et al. | |
| 9,911,211 | B1 | 3/2018 | Damaraju et al. | |
| 10,311,087 | B1 | 6/2019 | Kayyoor et al. | |

(Continued)

FOREIGN PATENT DOCUMENTS

WO 2024134556 A1 6/2024

OTHER PUBLICATIONS

Alcacer J., et al., "Applicant and Examiner Citations in U.S. Patents: An Overview and Analysis," Research Policy, 2009, pp. 415-427, 43 Pages.

(Continued)

*Primary Examiner* — Clifford B Madamba
(74) *Attorney, Agent, or Firm* — DLA PIPER LLP (US)

(57) ABSTRACT

Systems and methods can be provided for processing information. Multiple categories of ties for multiple types of assets can be identified, where a tie can comprise a relationship between assets. A relative importance for each tie category can be determined. A category weight for each tie category can be assigned using a determined relative importance for each tie category. A tie value can be combined with a tie category weight to create a weighted tie value for each tie. All tie weighted values can be combined into a meta tie value.

22 Claims, 157 Drawing Sheets

(56) References Cited

U.S. PATENT DOCUMENTS

| | | | | |
|---|---|---|---|---|
| 10,554,665 | B1 | 2/2020 | Badawy et al. | |
| 11,100,523 | B2 | 8/2021 | Treiser | |
| 11,484,800 | B2 | 11/2022 | Ng | |
| 12,265,461 | B2 | 4/2025 | Kozhaya et al. | |
| 2002/0127529 | A1 | 9/2002 | Cassuto et al. | |
| 2005/0149401 | A1 | 7/2005 | Ratcliffe et al. | |
| 2005/0246350 | A1 | 11/2005 | Canaran | |
| 2007/0087756 | A1 | 4/2007 | Hoffberg | |
| 2009/0012971 | A1 * | 1/2009 | Hunt | G06F 16/283 |
| 2010/0250597 | A1 | 9/2010 | Yang et al. | |
| 2011/0169835 | A1 | 7/2011 | Cardno et al. | |
| 2013/0013603 | A1 | 1/2013 | Parker et al. | |
| 2013/0018900 | A1 | 1/2013 | Cheng et al. | |
| 2013/0326325 | A1 | 12/2013 | De et al. | |
| 2014/0053309 | A1 | 2/2014 | Medina | |
| 2014/0075004 | A1 | 3/2014 | Van Dusen et al. | |
| 2014/0280224 | A1 | 9/2014 | Feinberg et al. | |
| 2014/0297837 | A1 | 10/2014 | Agarwal et al. | |
| 2015/0127565 | A1 | 5/2015 | Chevalier et al. | |
| 2015/0154263 | A1 | 6/2015 | Boddhu et al. | |
| 2015/0242486 | A1 | 8/2015 | Chari et al. | |
| 2015/0269691 | A1 | 9/2015 | Bar Yacov et al. | |
| 2015/0317589 | A1 | 11/2015 | Anderson et al. | |
| 2016/0155067 | A1 | 6/2016 | Dubnov et al. | |
| 2016/0314184 | A1 | 10/2016 | Bendersky et al. | |
| 2016/0350886 | A1 | 12/2016 | Jessen et al. | |
| 2016/0378847 | A1 | 12/2016 | Byrnes et al. | |
| 2017/0053309 | A1 | 2/2017 | Malaviya et al. | |
| 2017/0083608 | A1 | 3/2017 | Ye et al. | |
| 2017/0091304 | A1 | 3/2017 | Hanis et al. | |
| 2017/0185601 | A1 | 6/2017 | Qin et al. | |
| 2017/0213280 | A1 | 7/2017 | Kaznady | |
| 2017/0236081 | A1 | 8/2017 | Grady Smith et al. | |
| 2018/0082172 | A1 | 3/2018 | Patel et al. | |
| 2018/0150864 | A1 | 5/2018 | Kolb et al. | |
| 2018/0174160 | A1 | 6/2018 | Gupta et al. | |
| 2018/0225372 | A1 | 8/2018 | Lecue et al. | |
| 2018/0285595 | A1 | 10/2018 | Jessen | |
| 2019/0347282 | A1 | 11/2019 | Cai et al. | |
| 2020/0004820 | A1 | 1/2020 | Chhaya et al. | |
| 2023/0289276 | A1 | 9/2023 | Kozhaya et al. | |
| 2024/0248963 | A1 | 7/2024 | Parham et al. | |
| 2025/0086737 | A1 | 3/2025 | Walters et al. | |
| 2025/0209544 | A1 | 6/2025 | Kong et al. | |

OTHER PUBLICATIONS

Bessen J., "The Value of U.S. Patents by Owner and Patent Characteristics," Research Policy, 2008, vol. 37, pp. 932-945.

Blei D.M., et al., "Latent Dirichlet Allocation," Journal of Machine Learning Research, 2003, vol. 3, pp. 993-1022.

Chen H., et al., "A Fuzzy Approach for Measuring Development of Topics in Patents Using Latent Dirichlet Allocation," IEEE International, 2015, 7 Pages, Printed from URL: http://ieeexplore.ieee.org.

Datascience: "A Zero-Math Introduction to Markov Chain Monte Carlo Methods," Dec. 22, 2017, 16 Pages, [Retrieved on Sep. 1, 2021] Retrieved from URL: https://towardsdatascience.com/a-Zero-matt-introduction-tomarkov-chain-monte-carlo-methods-dcba889e0c50.

U.S. Appl. No. 16/668,835.

U.S. Appl. No. 16/691,341.

Kutty S., et al., "HCX: An Efficient Hybrid Clustering Approach for XML Documents," Proceedings of the 9th ACM Symposium on Document Engineering, Sep. 16-18, 2009, 4 Pages, URL: dl.acm.org.

Nemet G.F., et al., "Do Important Inventions Benefit from Knowledge Originating in Other Technological Domains?," Research Policy, 2012, vol. 41, pp. 190-200.

Pritchard J.K., et al., "Inference of Population Structure Using Multilocus Genotype Data," Genetics, Jun. 2000, vol. 155, pp. 945-959, Printed from URL: academic.oup.com.

SpaCy: "SpaCy 101: Everything You Need to Know," 2021, 34 Pages, [Retrieved on Sep. 1, 2021] Retrieved from URL: https://spacy.io/usage/spacy-101.

Towne W.B., et al., "Measuring Similarity Similarly: LDA and Human Perception," ACM Transactions on Intelligent Systems and Technology, Jan. 2016, vol. 7, No. 2, Article. 25, 29 Pages, Printed From URL: http://dl.acm.org.

Wikipedia: "Latent Dirichlet Allocation," 2021, 14 Pages, [Retrieved on May 3, 2021] Retrieved from URL: https://en.wikipedia.org/wiki/Latent_Dirichlet_allocation.

Zhang L., et al., "PatentDom: Analyzing Patent Relationships on Multi-View Patent Graphs," Proceedings of the 23rd ACM International, Nov. 3, 2014, 10 Pages, Retrieved from URL: http://dl.acm.org.

Zhang L., et al., "Patentline: Analyzing Technology Evolution on Multi-View Patent Graphs," Proceedings of the 37th International ACM, Jul. 2014, 4 Pages, Retrieved from URL: http://dl.acm.org.

U.S. Appl. No. 19/288,722, capture Apr. 28, 2026.

* cited by examiner

FIGURE 5 – Example deep dive on cosine similarity
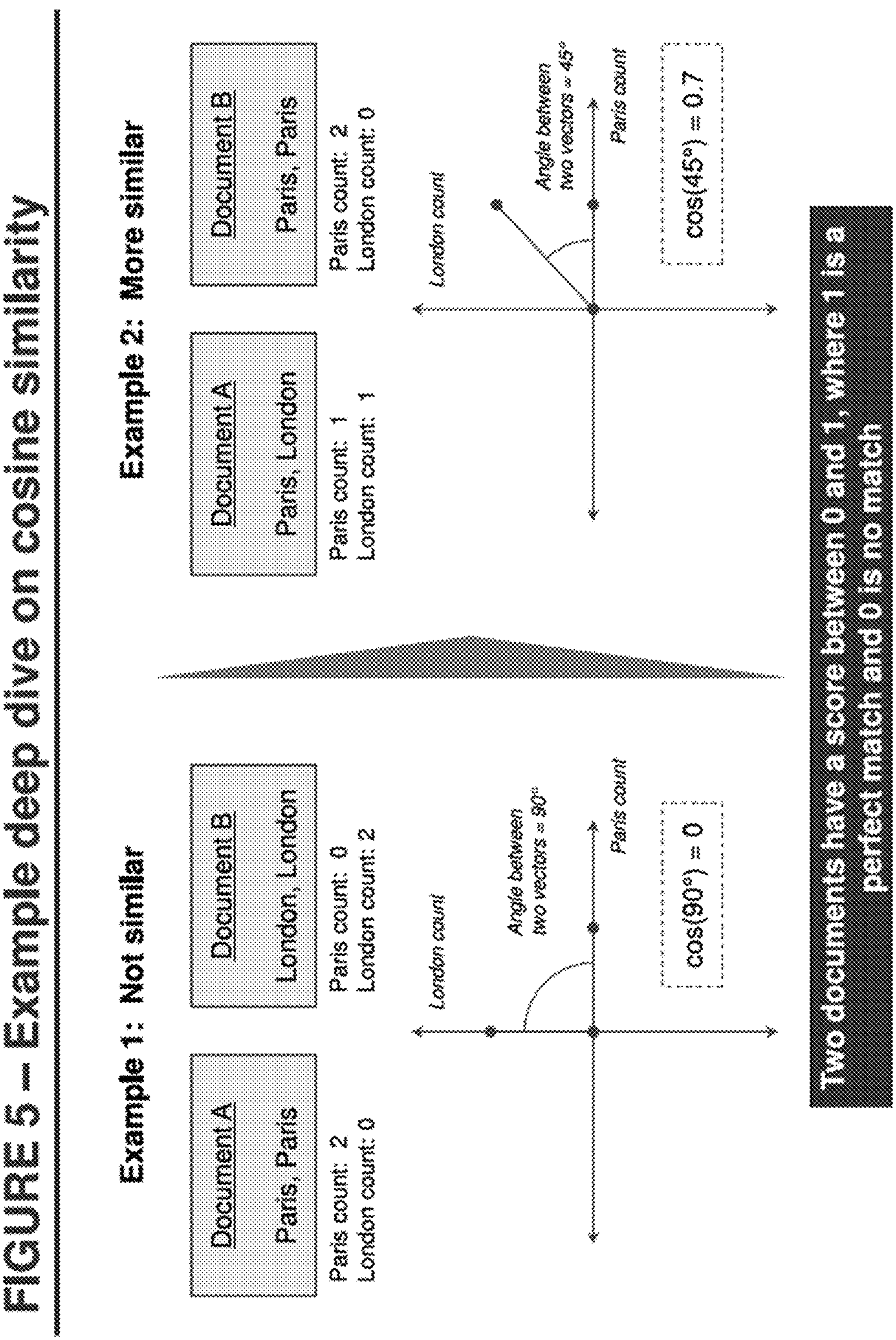

FIGURE 6 Example deep dive on cosine similarity

1 Two example texts

Text A: Julie loves me more than Linda loves me
Text B: Jane likes me more than Julie loves me

2 ...are translated to vectors...

| Word | Text A count | Text B count |
|---|---|---|
| *me* | 2 | 2 |
| *Julie* | 1 | 1 |
| *likes* | 0 | 1 |
| *loves* | 2 | 1 |
| *Jane* | 0 | 1 |
| *Linda* | 1 | 0 |
| *than* | 1 | 1 |
| *more* | 1 | 1 |

| A | B |
|---|---|
| 2 | 2 |
| 1 | 1 |
| 0 | 1 |
| 2 | 1 |
| 0 | 1 |
| 1 | 0 |
| 1 | 1 |
| 1 | 1 |

3 ...their cosines are calculated...

$$\text{similarity} = \cos(\theta) = \frac{A \cdot B}{\|A\|\|B\|} = \frac{\sum_{i=1}^{n} A_i \times B_i}{\sqrt{\sum_{i=1}^{n} (A_i)^2} \times \sqrt{\sum_{i=1}^{n} (B_i)^2}}$$

cos (A,B) → *fancy math* → 0.822

4 ...and recorded in a table

We will have an M x M matrix:

- Recording the cosine similarity scores between each asset and every other corresponding asset in the database
- Where M equals the total number of records in the entire database
- The matrix can be collapsed into 3 columns, with asset 1, asset 2, and cosine score

FIGURE 7 – Example fields for first pass semantic analysis

Biasing to simplicity and fewer fields with high hit rate

| | Patent | Experts | Know-how | Bundles |
| --- | --- | --- | --- | --- |
| Fields needed for tool | • Publication #<br>• Title (+DWPI)<br>• Abstract (+DWPI)<br>• Full text<br>• Claims<br>• Search keywords<br>• IPC / CPC<br>• Industry<br>• Country<br>• Year (various)<br>• Legal status<br>• Assignee / depositor<br>• Deposited (Y/N) | • TR ID #<br>• Name<br>• Contact info<br>• Company<br>• Title / position<br>• Industry<br>• Expert short bio<br>• Keywords (tech, commercial, other)<br>• Education (for each degree)<br>• Previous experience<br>• Languages<br>• Country<br>• Publications<br>• Preferred projects | • TR ID #<br>• Title<br>• Year<br>• Industry<br>• Abstract<br>• Full text<br>• Search keywords<br>• Images / PDF<br>• Price (base, royalty, milestone)<br>• Country<br>• Depositor<br>• Deposited (Y/N)<br>• Know-how type | • TR ID #<br>• Title<br>• Year<br>• Industry<br>• Abstract / summary<br>• Full text<br>• Search keywords<br>• Images / PDF<br>• Price (base, royalty, milestone)<br>• Licensee characteristics<br>• Applications for the invention |
| Others | • Description<br>• Additional notes / info<br>• Applications for the invention | • Accomplishments<br>• Referees<br>• Bank information | | • Additional notes/ info<br>• Deposited vs. un-deposited IP<br>• Transfer schedule |

*Will be same in TR database* (Know-how and Bundles)

FIGURE 8: Linkages example
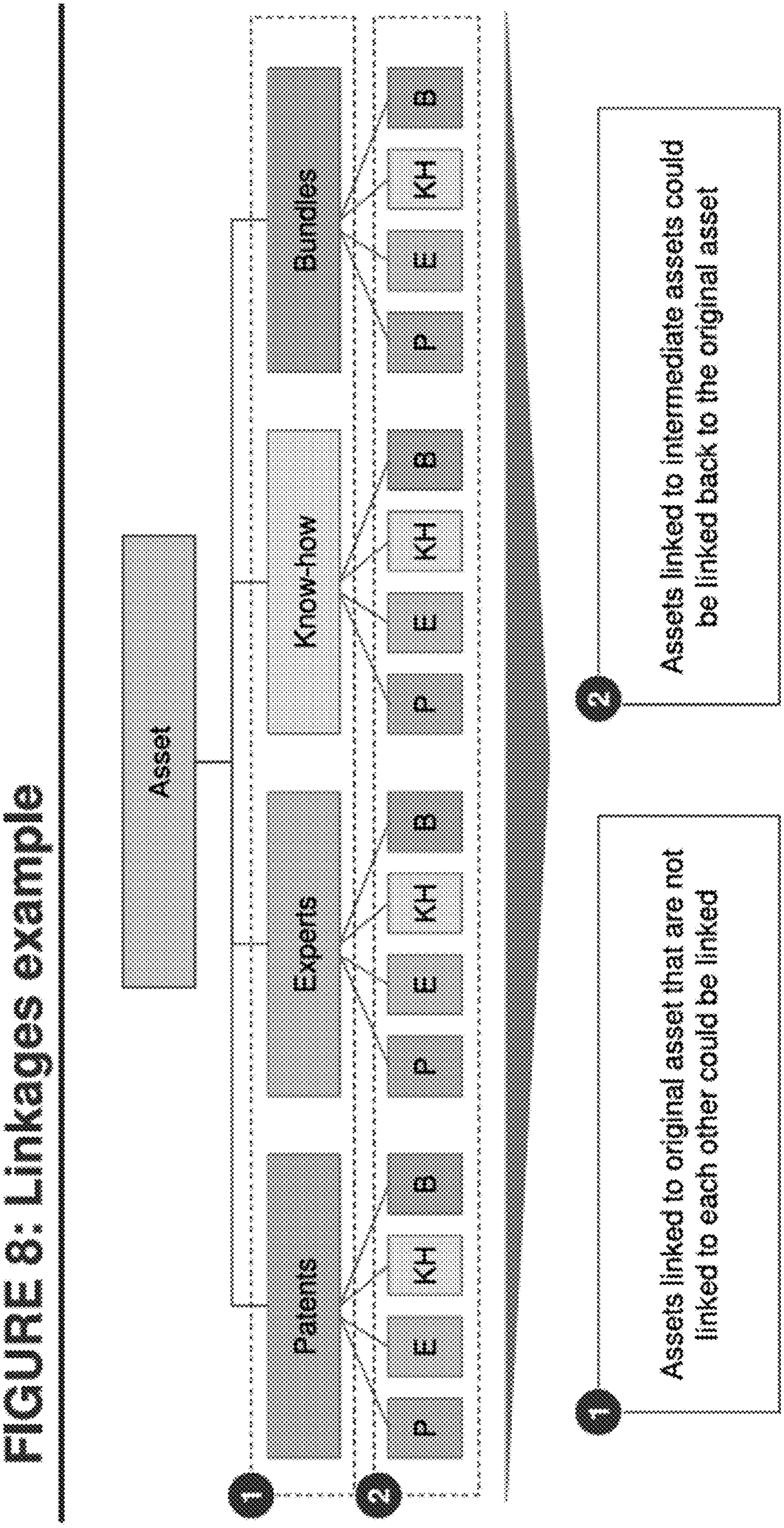

FIGURE 9 - Example methods to link assets

| | | Description | Key considerations |
|---|---|---|---|
| All assets | Semantic count | Pairs assets with high frequency of a given word<br>• e.g. patents with high counts of "surfactant" are linked | • Will require stopword list<br>• May be biased to extremely high counts<br>• Likely thematic, not functional |
| All assets | Semantic overlap | Pairing assets that have higher overlap in keywords<br>• e.g. patents with both "surfactant" and "polymer" are linked | • Will require stopword list<br>• Likely thematic, not functional |
| All assets | Common linkages | Pairing assets with mutual linkages<br>• e.g. patent that is common link between know-how and expert pairs the expert with the know-how | • Linkages may be rather distant<br>• May be very complex, depending on algorithm design |
| Patents | IPC distance | Pairing assets with near distance score<br>• e.g. patents with IPC codes that are closer are paired together | • Only works on patents<br>• May be very computationally intensive |

FIGURE 10: Semantic count and overlap example
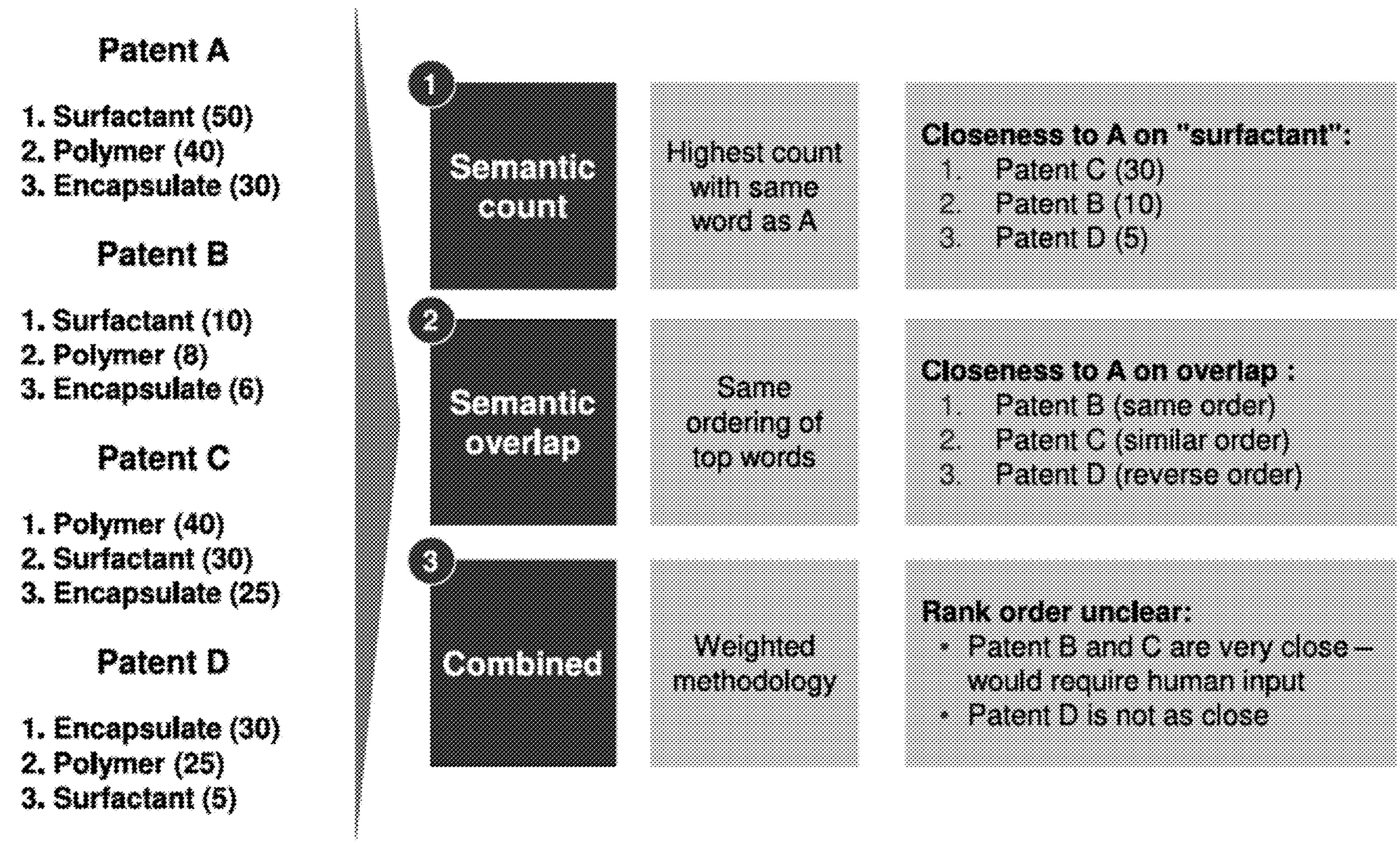

| | Co-occurances that could indicate a link (Examples) | Types of relation |
|---|---|---|
| Patent to patent | • Common author/inventor<br>• Shared IPC code | • Content<br>• Content |
| Expert to expert | • Common article/patent (co-author)<br>• Common employer | • Content<br>• Affiliation |
| Bundle to bundle | • Patents in bundles cite one another, share IPCs or keywords | • Content |
| Patent to expert | • Authorship/inventorship<br>• Inventor patents cite patent, share IPCs or keywords | • Content |
| Expert to bundle | • Expert is inventor on patent(s) in bundle<br>• Expert's patents or articles share keywords or IPC with those in bundle, or cites directly | • Content<br>• Content |
| Bundle to patent | • Patent shares keywords, IPC or cites directly patents in bundle | • Content |

(2)
FIGURE 13
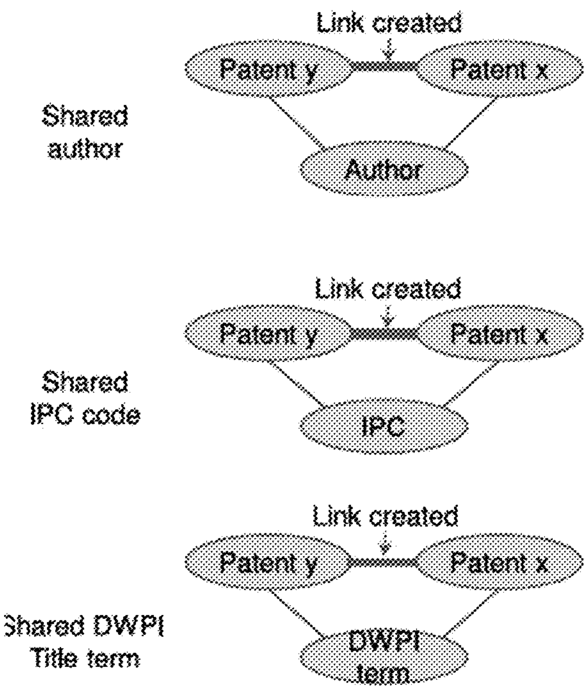
- Identify unique co-occurances
- Calculate frequency/strength of co-occurence tie e.g., No. of times co-author together
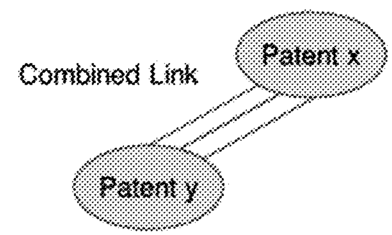
| Count of shared | Frequency | Weight | Weight |
|---|---|---|---|
| Authors | 3 | 0.5 | 1.5 |
| IPCs | 2 | 0.3 | 0.6 |
| Keyword terms | 1 | 0.2 | 0.2 |
| | | Cumulated Strength of Tie | 1.3[1] |
- Cumulate different co-occurence and direct ties between assets
- Based on relative weighting of type of tie

2

Note: An asset can be a company, a person or any other 'entity'.

| Asset Type | Asset Name | Strength of relationship to Asset A | Rank/ weight |
|---|---|---|---|
| Know How | A | .8 | 1 |
| | B | .65 | 2 |
| | C | .2 | 3 |
| Expert | X | .9 | 1 |
| | Y | .8 | 2 |
| | Z | 3 | 3 |
| Patent | 1 | .84 | 1 |
| | 2 | .4 | 2 |
| | 3 | .3 | 3 |
| Value of Asset A | = SUM (relationship strength x rank/weight of asset) | | |

<u>Rank related assets (Prioritize)</u> – Asset is more or less likely to be a viable or valuable asset within a group of assets

Underlying assumptions:

- Network ties link the assets in the group
- Ties reflect similarity and /or influence between assets

| Metric | Description | Use |
| --- | --- | --- |
| Centrality | Measures connected-ness of an asset within a group of assets | Identifies assets most central to the network |
| Eigenvector Centrality | Measures connected-ness of a given assets to other well connected assets. An asset's centrality is proportional to the sum of centralities of those it has ties to | Which assets are most central to the overall network, by virtue of their connection to other well connected assets? |
| Weighted Influence (modified Katz metric) | Takes into account *importance* of individual asset, as well as how connected it is to other important assets Importance could include citations, dollar value or qualitative assessment (H,M, L) | Most robust measure of potential influence/value of an asset in a network/group of assets |

Surface and rank individual assets (for Ideation) - identify individual assets most likely to be highly innovative/leading edge

| Metric | Description | Use |
|---|---|---|
| Betweenness Centrality | Number of times that a node lies along the shortest path between two others; Measure of an asset's role in linking different assets in the network | Identify patents and assets most likely to be highly innovative/leading edge, within a given results set |
| Bridges | Assets that connect otherwise unconnected assets; 'bridges' that sit at the confluence of otherwise unconnected networks can often be the greatest source of new ideas and have a performance advantage by virtue of their position<br>E.g. Burt's constraint metric | Identify more innovative or leading edge assets<br>Identify potentially higher performing assets |

Betweenness centrality and bridging metrics can be used to identify emerging clusters of assets

3

Note: B is connected to clusters of people who are not highly connected; he has the opportunity to play a bridging or brokerage role; A is connected to clusters of people who are already highly connected; limited opportunity to play a bridging or brokerage role

FIGURE 19

| Metric | Description | Use |
| --- | --- | --- |
| Semantic clustering | Cosine score becomes weighted strength of tie between individual nodes | Identify clusters of thematically-similar nodes |
| Clustering algorithms | Suggest groupings of nodes based on how connected they are to one another | Identify clusters of similar nodes |

Navigate

Interactive network map allows users to navigate through data, follow connections

- 'More like this' function visualize related assets, click through to read more about them
- Linked to interactive data table
- Node sizing based on prioritization metrics
  - quickly zoom in to assets of most interest

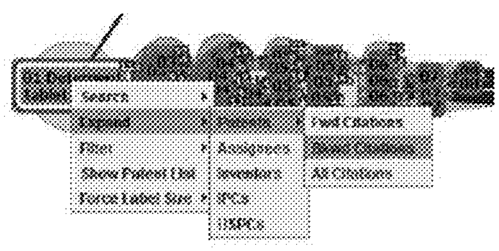

Example software package: NCompass IP

Analyze (Surface opportunities)

Visual display of clusters, their interconnections and outliers can provide ideas for innovative combinations of assets

- Semantic clustering (similar to themescape, but more automated)
- Pre-packaged software programs exist

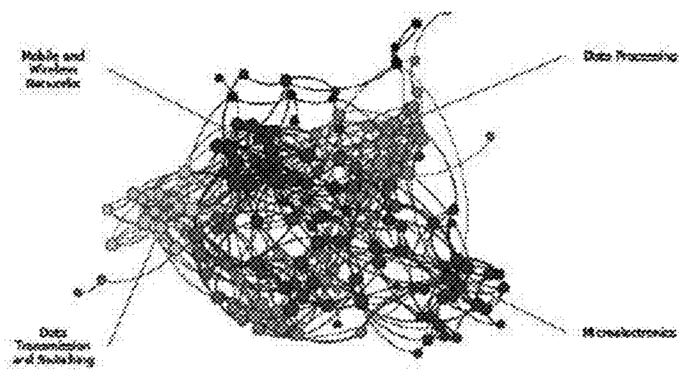

| Goal | Methodology |
|---|---|
| Define patent landscape | Data-driven, text based clustering of patents |
| Identify high potential segments | Analyze size, growth, consolidation and innovation of clusters and individual patents |
| Identify innovative patents | Use patent level metrics to find 'outlier' patents of interest |

FIGURE 22 – Stakeholder network metrics vary in terms of complexity

| | | Simplified approach | Moderately sophisticated | More sophisticated |
|---|---|---|---|---|
| | Decision criteria | Built in, fast<br>Intuitive/simple<br>Easy to communicate | Built in (with exception of between-ness centrality)<br>Reasonable to communicate | Generate externally<br>Complex algorithms<br>Can be difficult to explain<br>Time consuming |
| 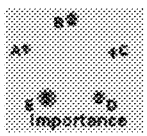 | Importance | | Potential internal 'importance score' sum of individual weights for publication and organization membership | |
| 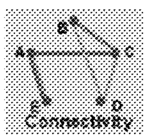 | Connections | Simple degree centrality<br>• # people<br>• # organizations | Freeman degree centrality (connections weighted by simple sum strength of tie) | Freeman degree centrality (connections based on weighted strength of tie) |
| 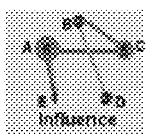 | Influence | Potential internal 'influence' metric<br>• sum of importance of direct connections | Potential internal modified 'Katz' metric<br>• Weighted sum of importance scores of direct connections | Katz metric (including attenuation factor)<br>Eigenvector centrality |
| | Bridging and brokerage metrics | n/a | Between-ness centrality | Burt's constraint metric (brokerage) |
| | Other | n/a | | Key player analysis<br>Cluster analysis |

FIGURE 23 - Influence score displays importance of each stakeholder's network
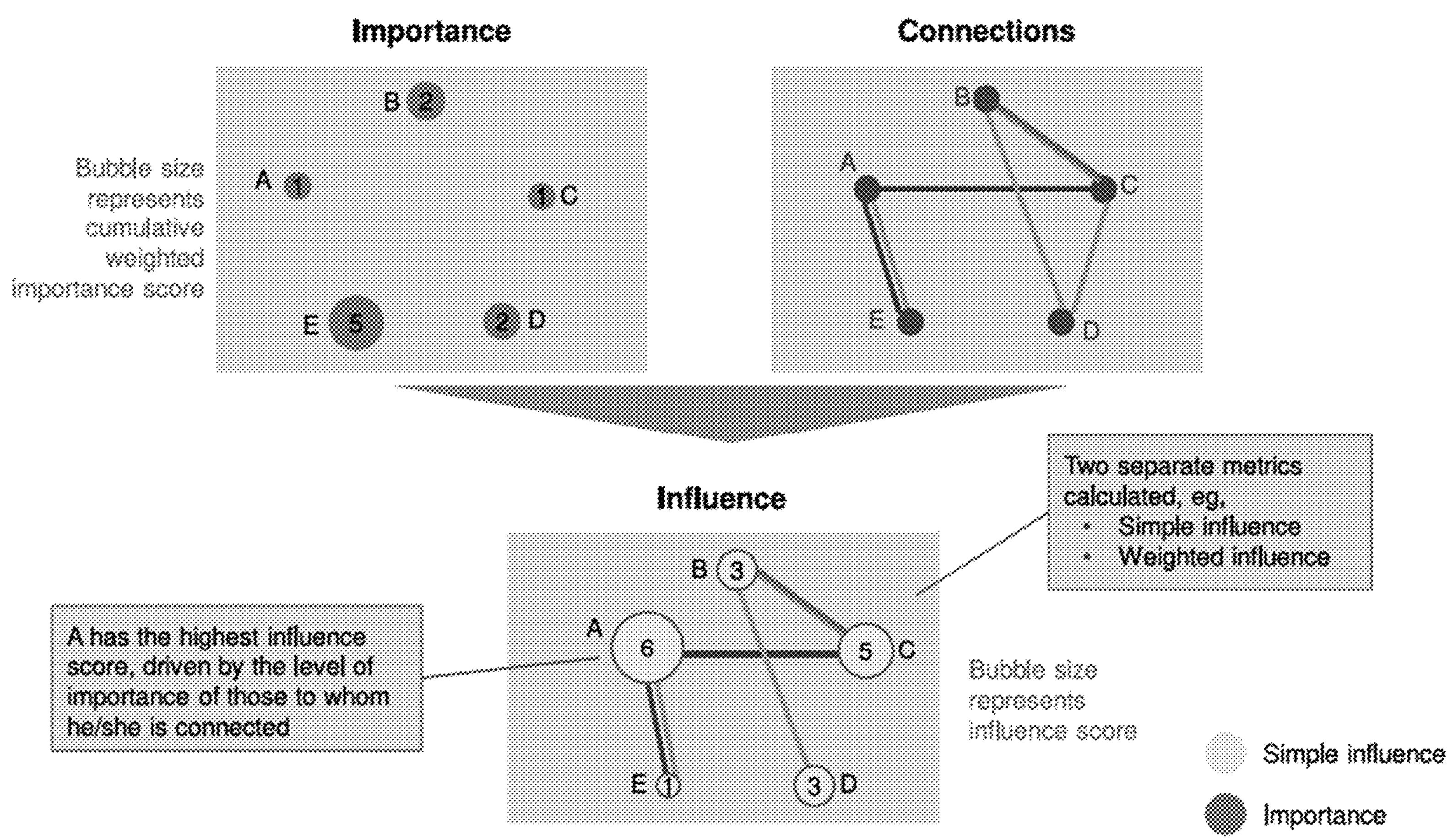

FIGURE 24 - Simple influence

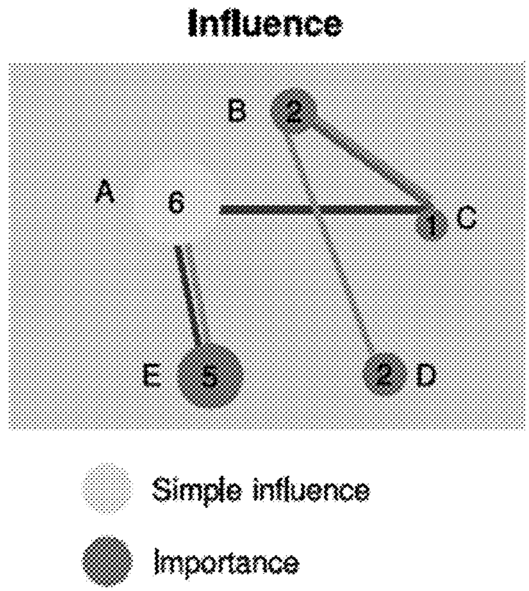

Challenge: Individuals exert control over the network by virtue of their own importance, as well as by virtue to the importance of those to whom they are connected. Both the number of people in individual A's ego net, and their importance, need to be taken into account, when determining influence A simplified way to get a relative sense of influence is to simply add the importance scores of the people in an individual's network Influence of (A) = Importance of C (1) + Importance of E (5)

So, in our example: Individual A's influence = 6

FIGURE 25 - Weighted influence

Influence

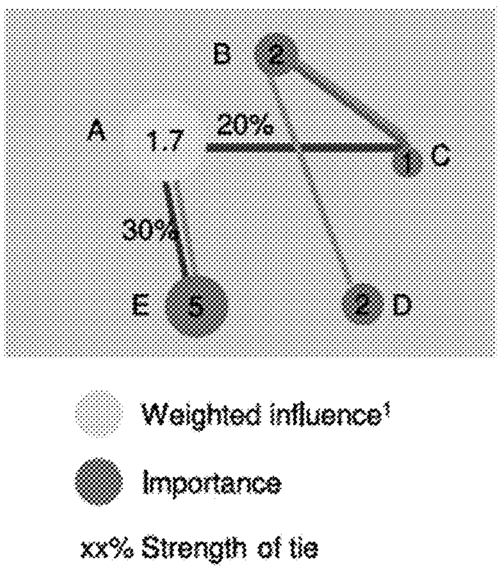

Challenge: Most individuals have much stronger ties with some of the individuals to who he/she is connected than others.

Individual A will have a much greater chance of influencing the network if he/she has a strong tie with E.

Weighted Influence A = [Importance of (C) x strength of tie of (A to C)] + [Importance of (E) x strength of tie of (A to E)]

In our example,

- Strength of tie between A and C = 20%
- Strength of tie between A and E = 30%
- Importance of C = 1
- Importance of E = 5
- So, Weighted Influence A=(1) x (20%) + (5) x (30%) = 1.7

Strength of tie between A and C is the probability that individual C will pass a piece of information on to individual A

- Considers all co-authorships/memberships connecting the individuals
- Strengths of ties are not directional 1. Weighted influence scores may not be comparable to importance scores in some embodiments

FIGURE 26 -Stakeholder database software calculates connectivity and influence in roughly a three step process

Catalog and weight connections

Catalogs all links between all individuals
- Due to co-memberships
- Due to co-authorships

Weight strengths of ties between individuals
- E.g., can return a probability that information will be passed from Individual X to Y if X and Y sit on several different organizations together
- Utilizes number of links between individuals X & Y
  - Co-memberships
  - Co-authorships

Calculate connectivity

Simple connections
- Indiv X's connections = count of all people indiv X is connected to

Weighted connectivity
- Sum of weighted connections between an individual and all individuals they are connected to
- Utilizes weighted strength of ties

Calculate influence

Simple influence
- Imp of Indiv X = Sum of importance of all the people indiv X is connected to

Weighted influence
- Weighted Infl Indiv X = Sum of imp of all people indiv X is connected to weighted by the strength of those connections
- Utilizes weighted strength of ties

Weighted connectivity and influence can be used in the visualization and analysis of the stakeholder network

FIGURE 29 - Overview of tool
The tool facilitates a range of analyses and outputs
2X2 of importance/influence of organizations
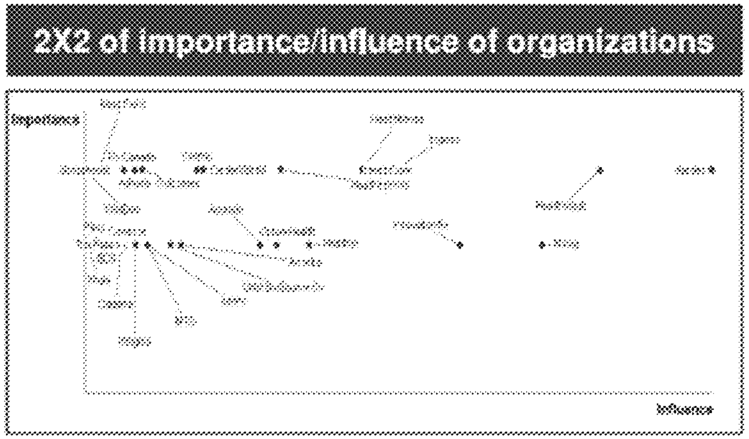
2x2 of importance for two different objectives
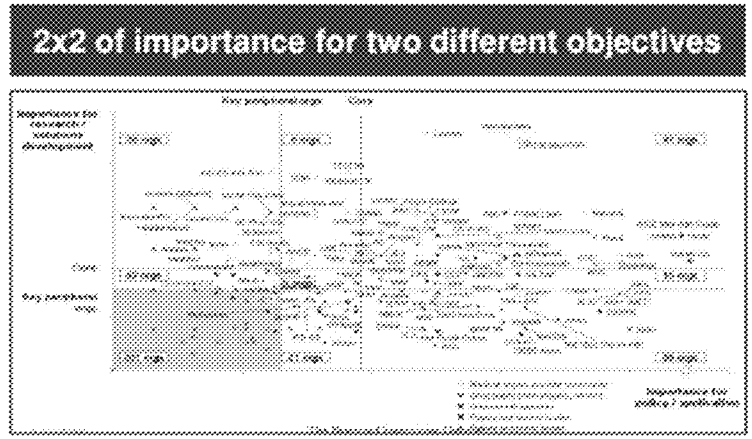
2X2 of importance/influence of individuals
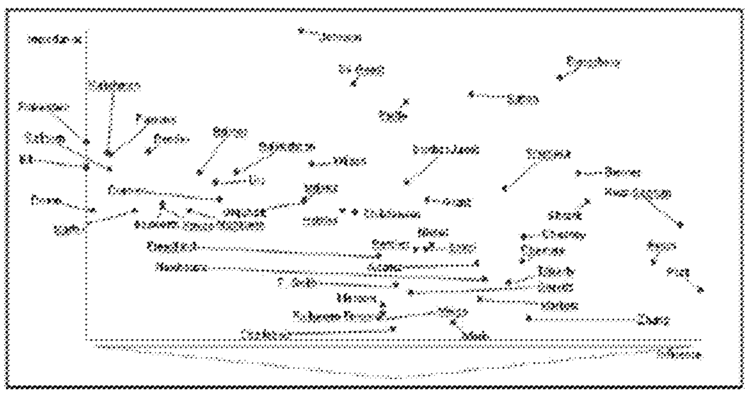
Quick reference tool allows client to look up connections of any individual
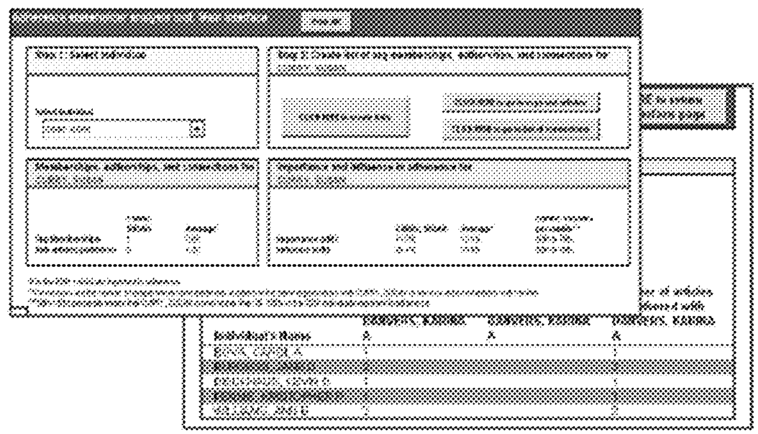

FIGURE 30 - Overview of tool
Tool interfaces with BCG custom version of Touchgraph Navigator for network visualization
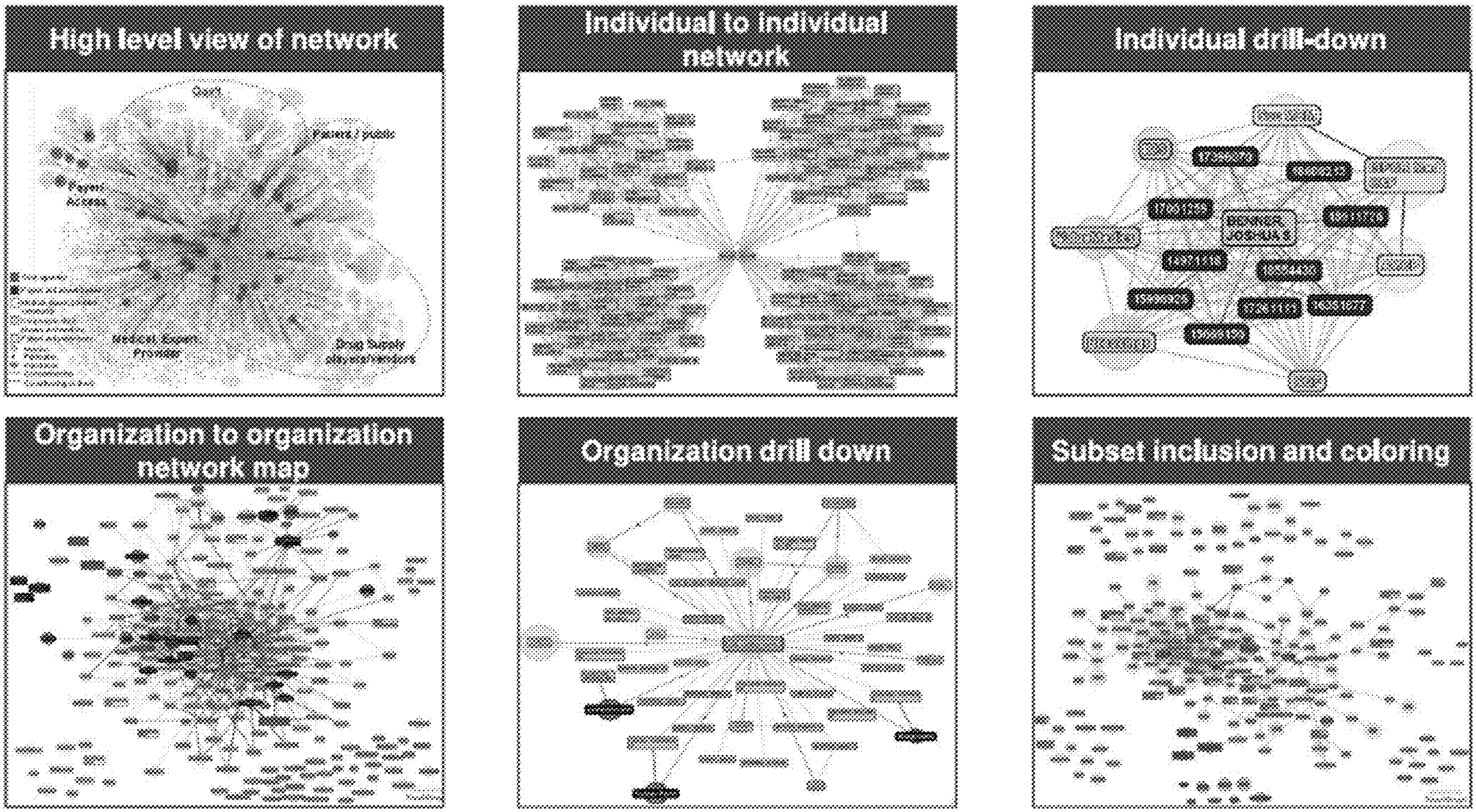

FIGURE 31 - Navigating tool (screenshots and the functionality)
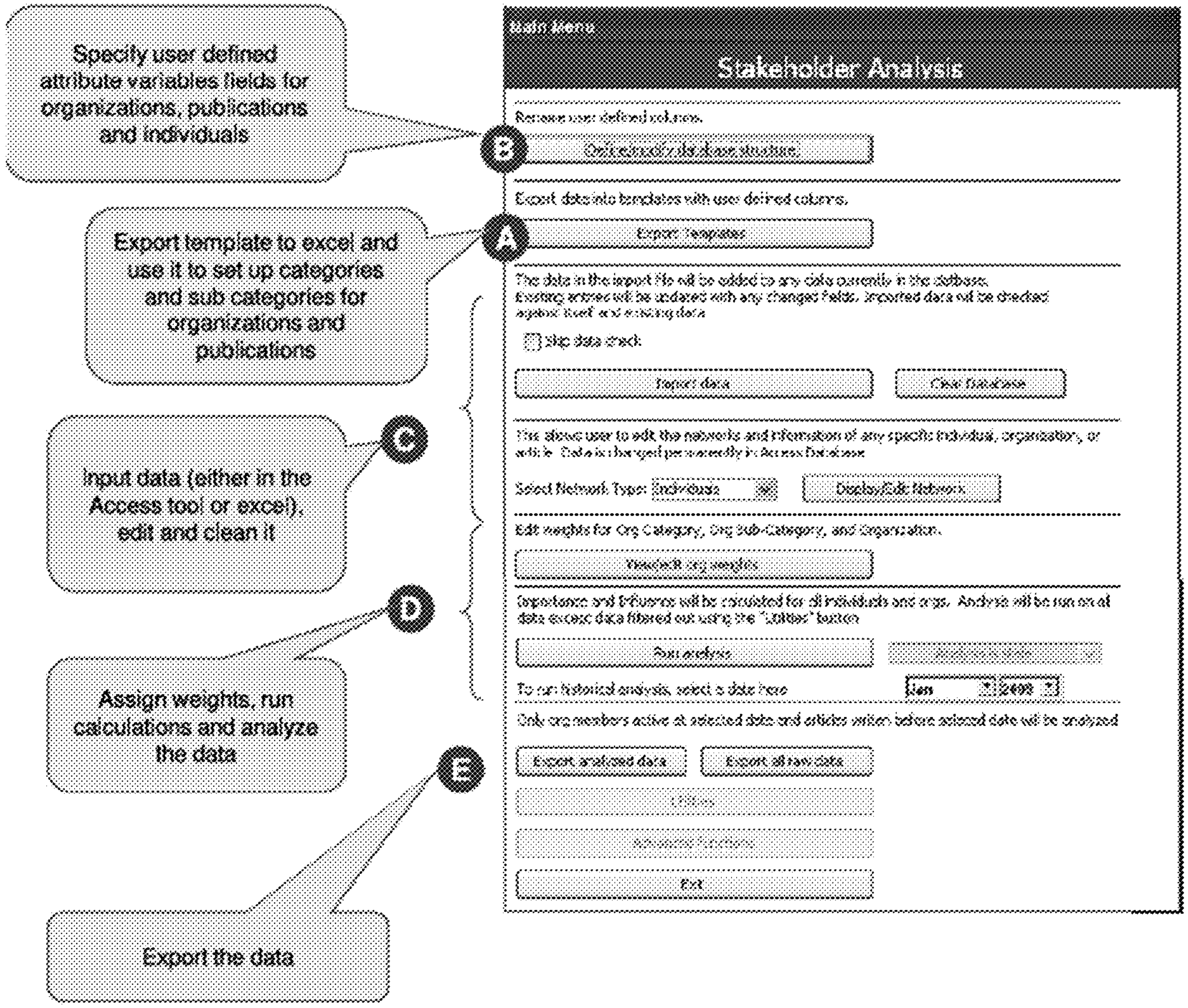

FIGURE 33 - Overview of tool process
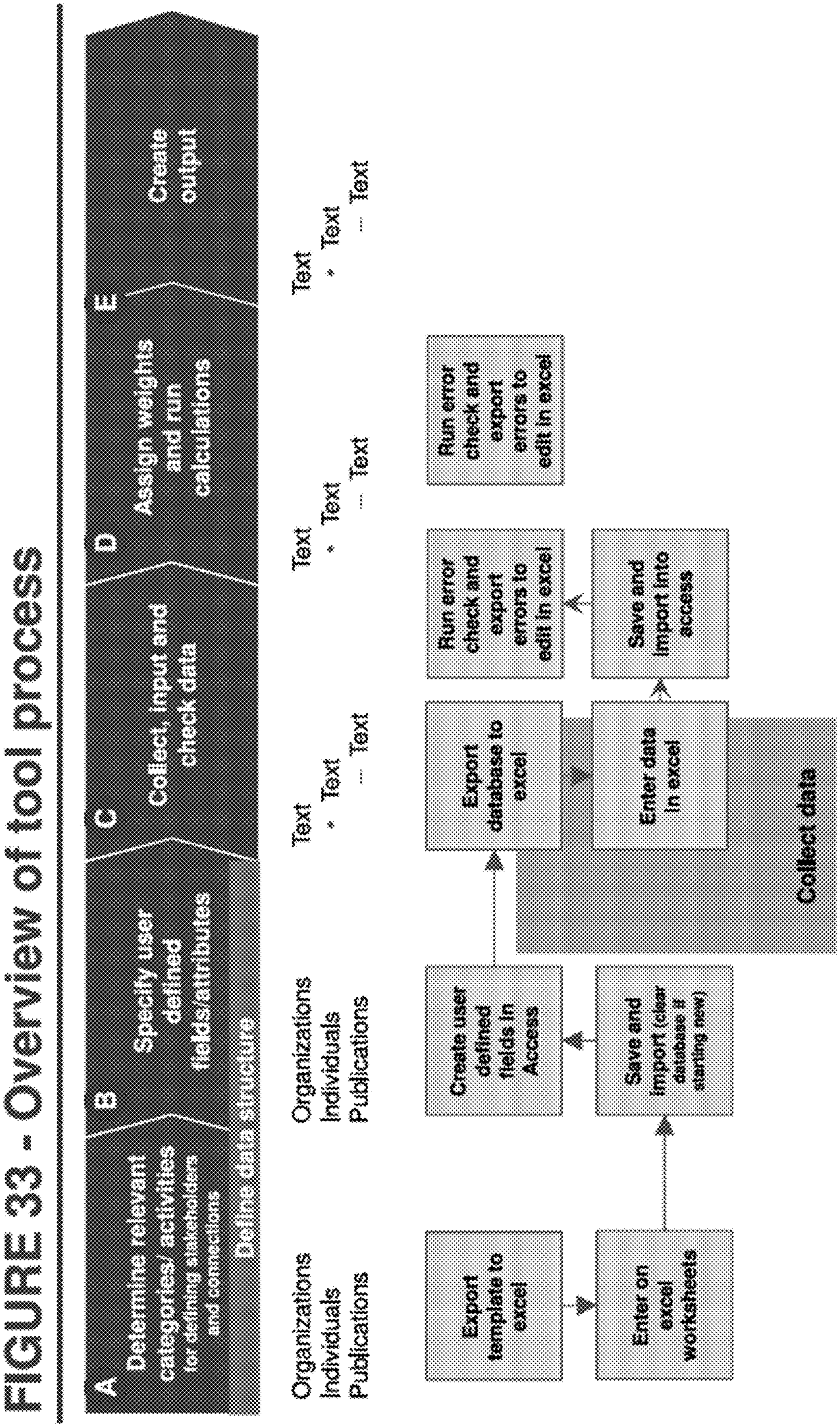

A FIGURE 34 - Determine relevant categories/ activities for defining stakeholders and connections
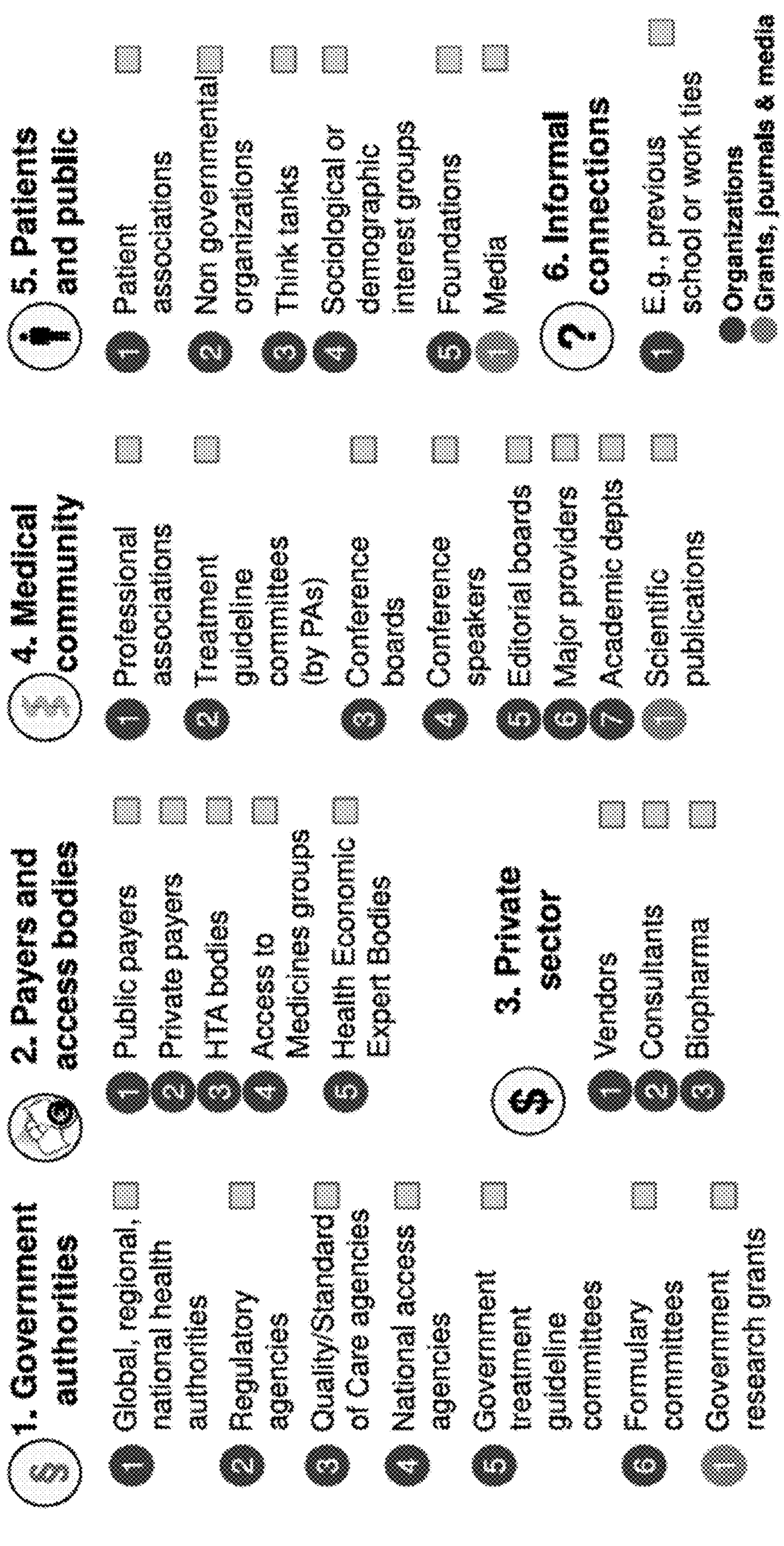

FIGURE 35 - Organization categories and sub categories are then entered directly into excel template

Step 1: Export excel data template from tool

Step 2: Enter highest level organization categories on "OrganizationCategories" worksheet

Step 3: Enter organization subcategories on "OrgSubCategories" sheet, specifying for each which organization category they belong to

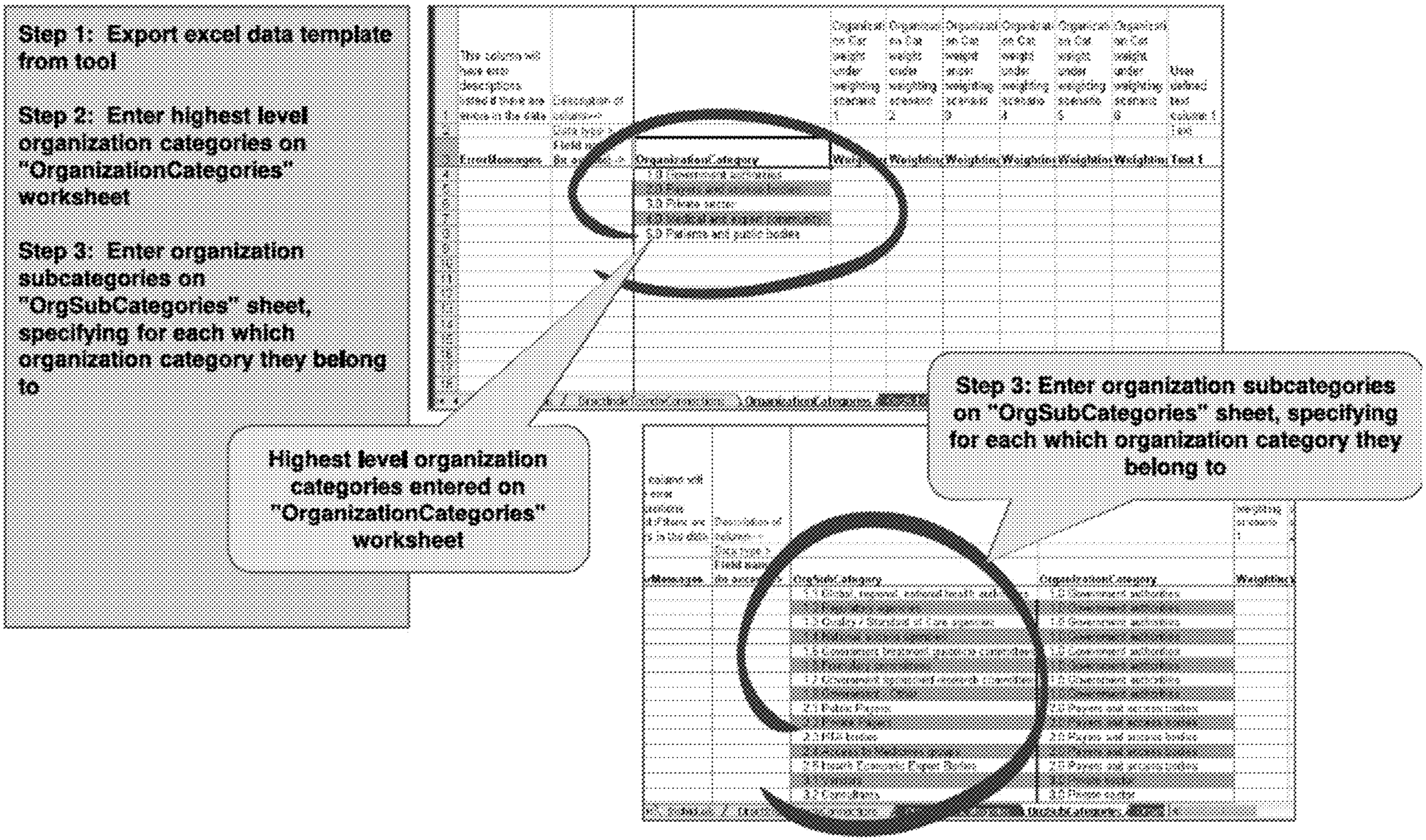

B FIGURE 36 – For defining database structure - define attributes of organizations, individuals, publications
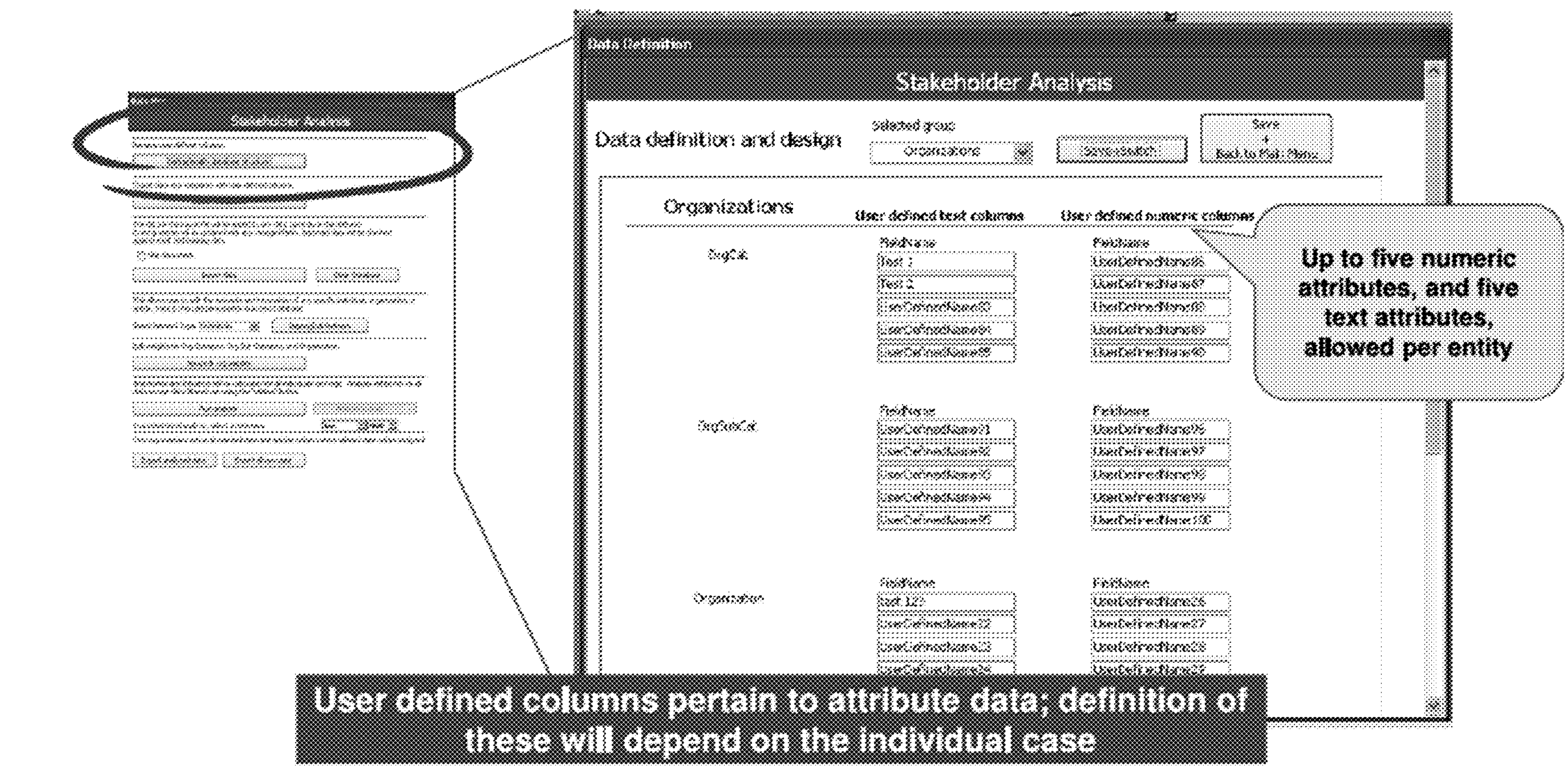

FIGURE 37 - Attribute variables to include depends on the questions needed answering, data cut needs

Organizations

- ✓ Organization name
- ✓ Org. name abbreviation
- ✓ Org. category
- Org. location
- Disease state focus
  - e.g.; menopause
- Knowledge of TA (Y /N)
- MD / Allied / Other
- Specific primary specialty
  - e.g., OBGYNs, Urologists
- Org. size range
- DB includes Board / Top-staff / Subcommittees
- Accept pharma funding (Y / N)
- Parent relationship
- ✓ Org. importance
- ✓ Connectivity strength
- Source of data
  - e.g.; specific client, website, interview

Individuals

- ✓ Individual name
  - standardized ID?
- MD / Allied / Other
- Specific primary specialty
  - e.g., OBGYN, Urologist
- Likely KoL (Y / N)
- Interview (Date)
- Indiv. location
- Disease state focus
  - e.g.; menopause
- Complete bio (Y / N)
- Source of data
  - e.g.; specific client, website

Records

- Individual - Organization
  - e.g.; unique ID
- Indiv. name
- Org. name
- Role name
- Role / record importance ✓ Built into tool in one embodiment

In one embodiment, all others are optional attributes that would be added in the user defined fields

May only include variables that will be of value in the analysis; this allows data gathering to be more streamlined/targeted

B
FIGURE 38 - Once user defined fields created (attribute variables), data entry template can be exported to Excel
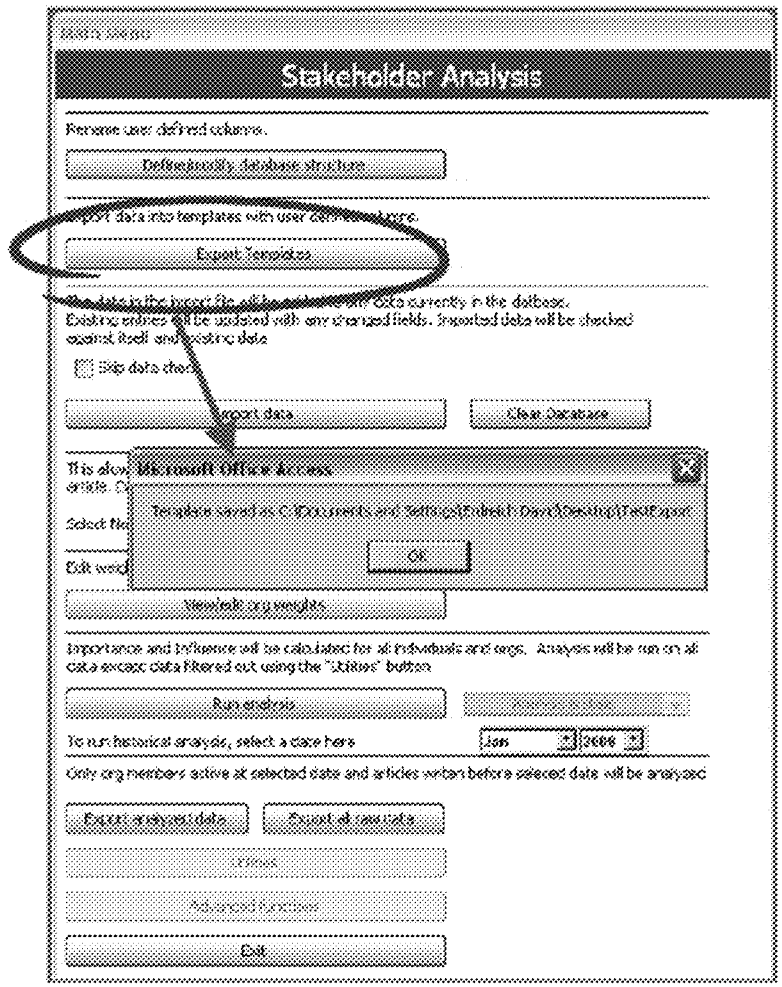

FIGURE 39 - Sheet types can handle any entities or direct connections that affect imp, influence, or connectivity

| Database "Sheet" | Type of information | Examples | Comments |
|---|---|---|---|
| Organizations | • Permanent organizations (components or entire orgs) | • Companies<br>• Non-profits<br>• Government bodies<br>• Clubs | • Unimportant orgs can be added to increase connectivity if their importance is set to zero |
| Articles | • Any one-time event/publication where participants' importance is based on their order | • Journal articles (authors)<br>• Guidelines<br>• Grant proposals<br>• Books<br>• Presentations/lectures (at conferences or otherwise | |
| One time entities | • Any one-time entity where participants' importance is to be distributed based on their role weights | • Temporary task forces<br>• Conferences (attendees)<br>• Conf planning committees<br>• Focus groups<br>• Events | |
| | • Any one-time event that does not give connectivity to participants | • Media mentions | • One-time entity can be created for each article or for classes of articles<br>• Connectivity set to zero |
| | • Assigning inherent importance to individuals | • Indiv importance assigned due to client knowledge<br>• Assigning importance based on level of education | • A one time entity is created for each level of importance to assign<br>• Connectivity is set to zero |
| Indiv-indiv direct connections | • Direct connections between individuals | • Connections from client database, etc | • One-to-one connections<br>• may not affect importance |
| Org-org direct connections | • Direct connections between groups | • Business relationships<br>• Joint ventures<br>• Connections between departments of a larger org | • One-to-one connections<br>• may not affect importance |

FIGURE 40 - Sample data entry sheet

Excel spreadsheets best for adding large amounts of data, copying spreadsheets, etc

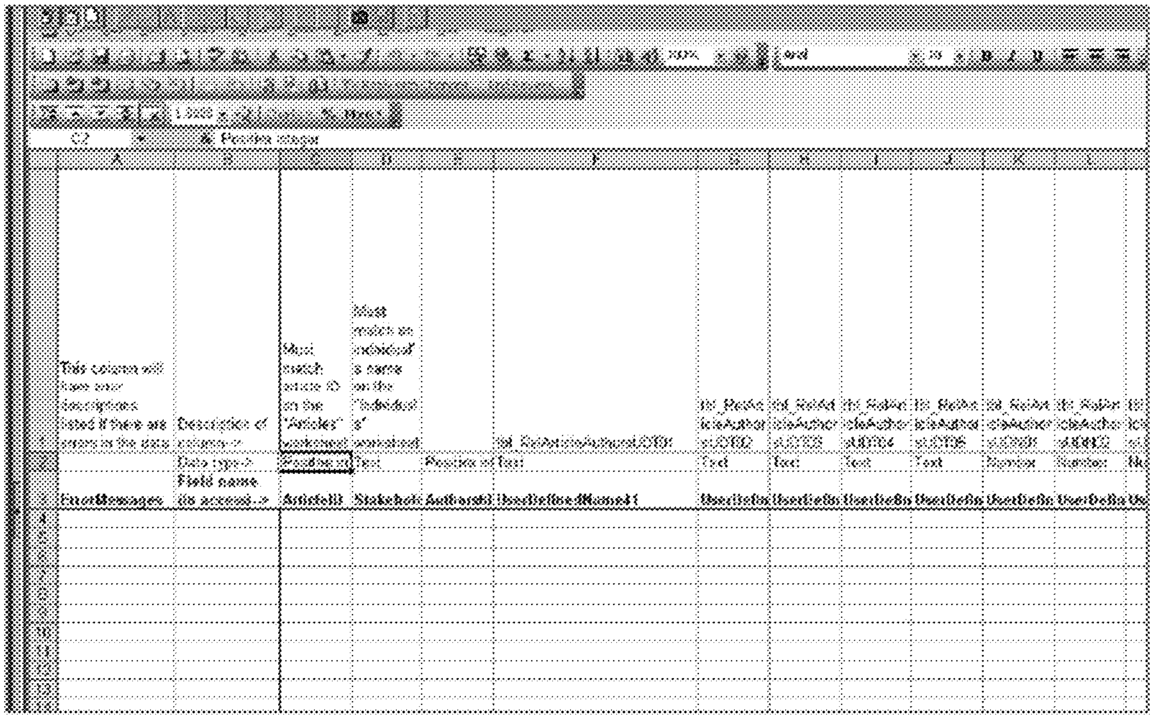

Note:
Editing in excel spreadsheet can have same structure as in database

Each relationship/entity can be represented on a separate tab (see names and descriptions of each worksheet on following page)

Data can also be entered directly in Access tool – depends on amount of data to be entered

FIGURE 41 - At any point in data entry process, data can be imported into the Access tool
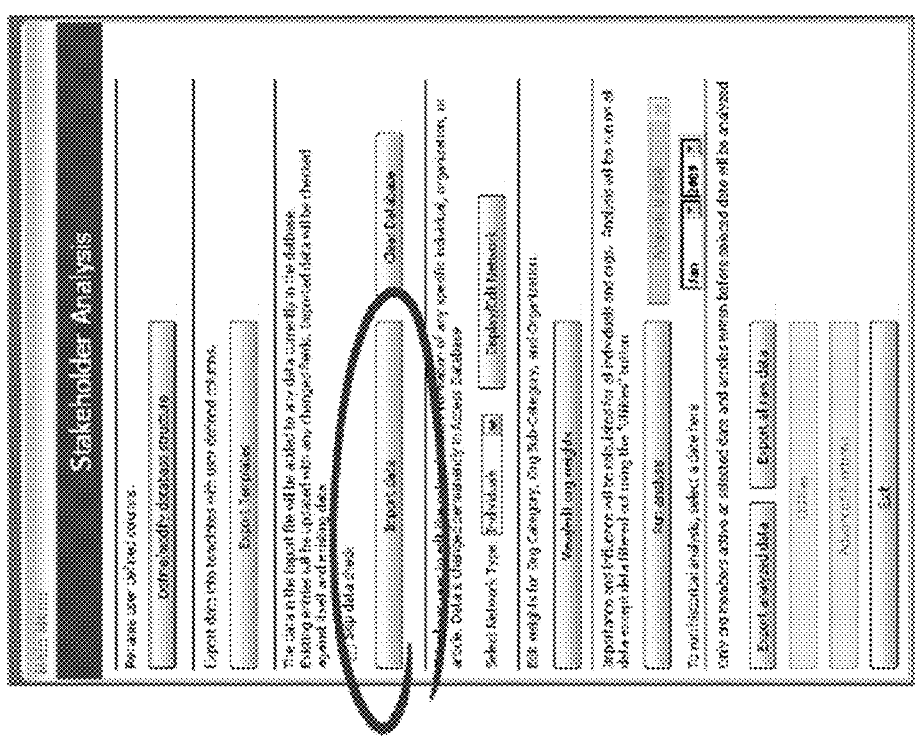

FIGURE 42 - Error checking
How errors are reported out and fixed
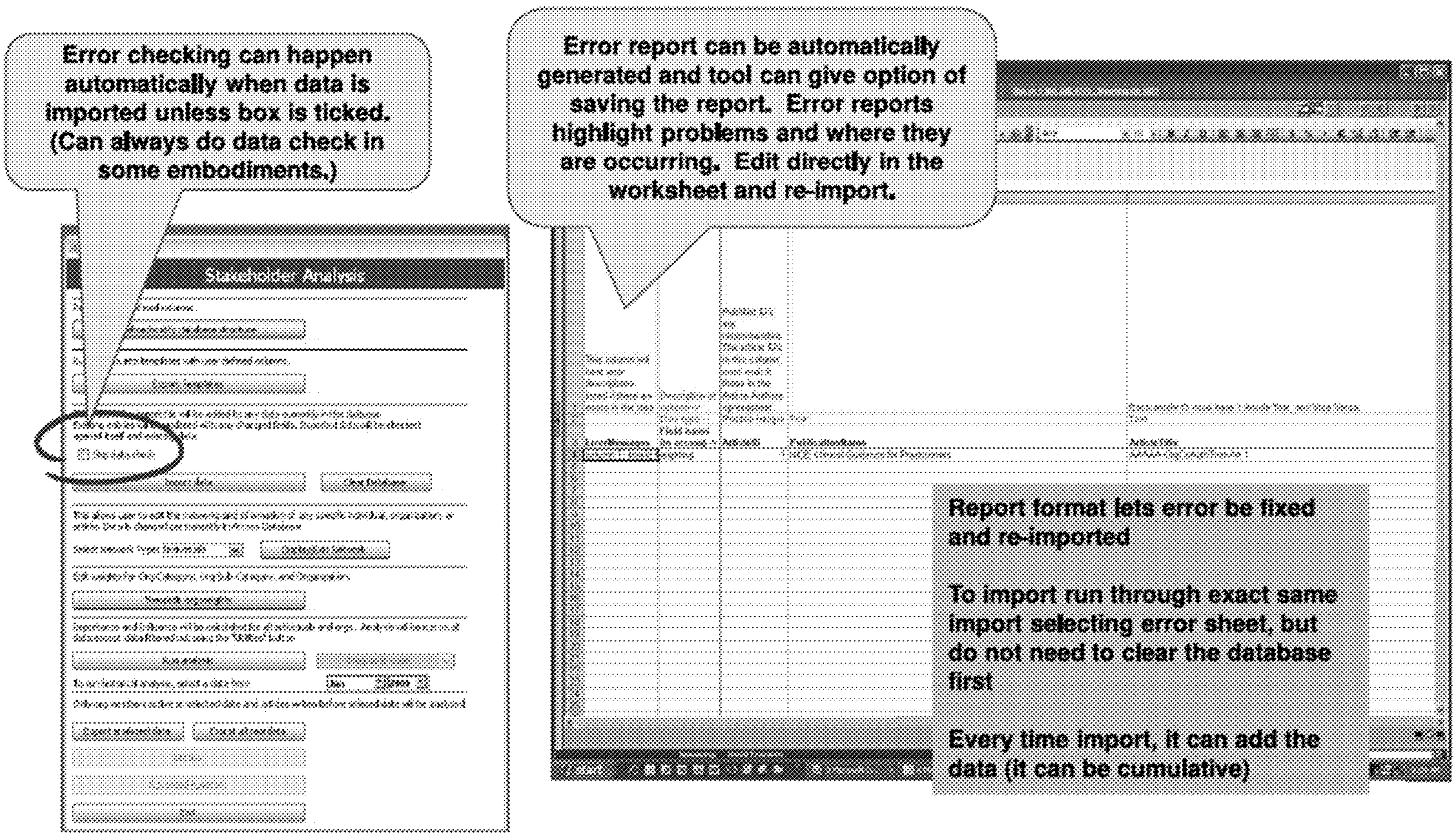

FIGURE 43A - Inputting data into excel template
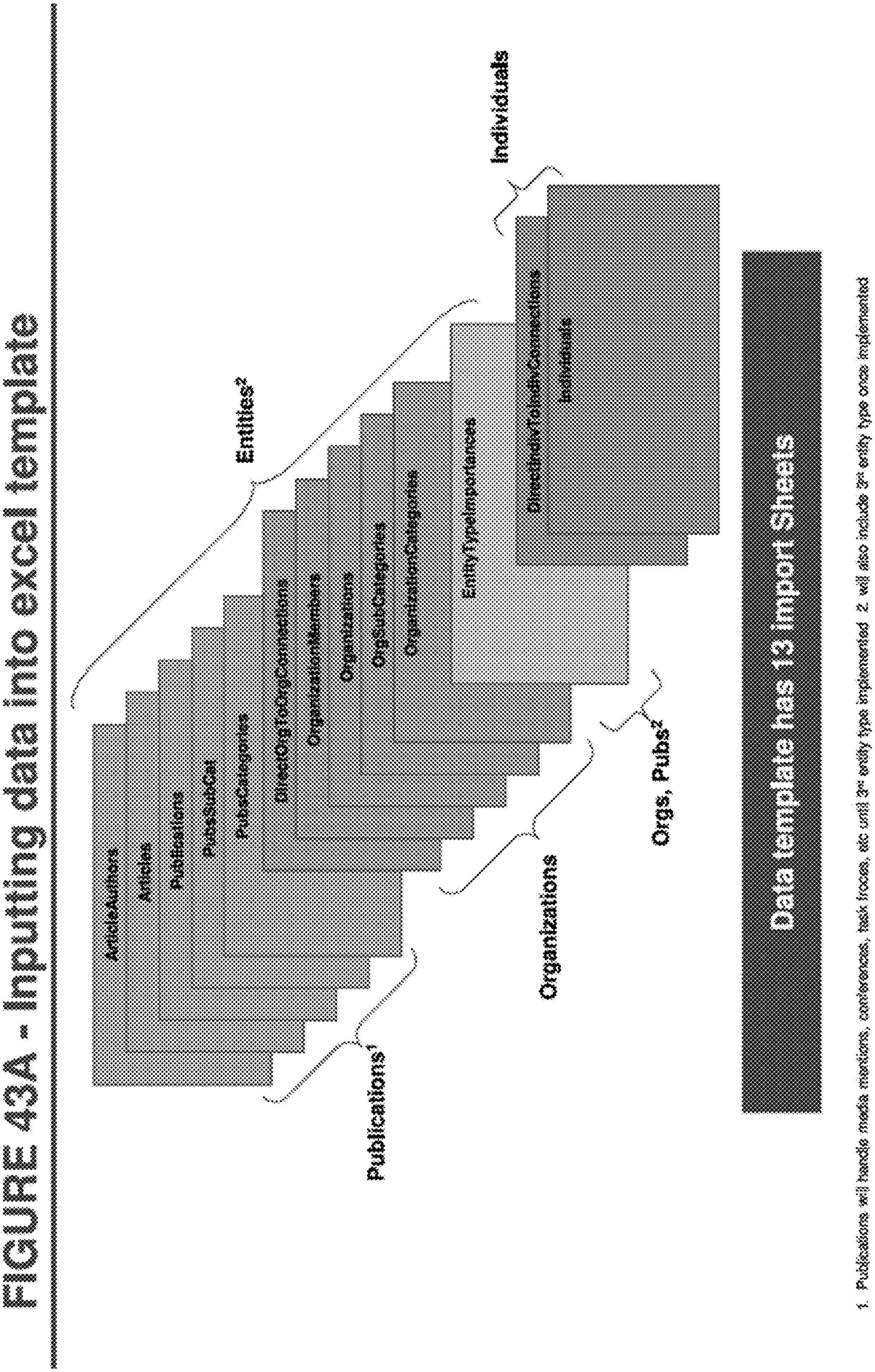

FIGURE 43B - Data template input

Individuals sheet

| | Column letter | Column name | Column definition | Data type | Notes/restrictions |
|---|---|---|---|---|---|
| (Primary Key) | C | StakeholderName | Name of individual | Text <=255 char | • All individuals must be listed here |
| Opt | D-H | tbl_DataIndividualsUDTXX | User defined fields | Text <=255 char | • e.g., location, specialty, degrees |
| Opt | I-M | tbl_DataIndividualsUDNXX | User defined fields | Number (S) | • e.g., age |
| Opt | N | DateRecordEntered | Date that user input this record¹ | Month/Day/Year | • If left blank, then today's date will be used<br>• Not used in calc's for this version of tool |
| Opt | O | ExclFrmImportance | Filters individuals from imp calcs | Y or N | • Temp functionality will be removed once in-database filtering implemented |
| Opt | P | ExclFrmAllAnalysisAndOutput | Filters indiv from all calculations and exporting (except raw data export) | Y or N | • Temp functionality will be removed once in-database filtering implemented |

Primary Key   Opt = Optional   Must match entry on linked table

Byte 0 to 255 (no fractions)
Integer -32,768 to 32,767 (no fractions)
Long integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43C - Data template input

DirectIndivToIndivConnections

| | Column letter | Column name | Column definition | Data type | Notes/restrictions |
|---|---|---|---|---|---|
| Primary Key, Must match | C | StakeholderName | | Text <=255 char | • Must match name on Individuals sheet |
| Primary Key, Must match | D | StakeholderRelatedName | | Text <=255 char | • Must match name on Individuals sheet |
| Primary Key | E | RelationshipType | | Text <=255 char | |
| Opt | F | RelationshipStrength | Strength of con betwn individuals | Number (S) | • If user does not have relationship strengths then every entry should be marked "10" |
| Opt | G | RelationshipStartDate | | Month/Day/Year | • Not used in calc's for this version of tool |
| Opt | H | RelationshipEndDate | | Month/Day/Year | • Not used in calc's for this version of tool |
| Opt | I | Notes | | Text <=64000 char | |
| Opt | J-N | tbl_RelIndivToIndivUDTXX | User defined fields | Text <=255 char | • e.g., connection type |
| Opt | 0-S | tbl_RelIndivToIndivUDNXX | User defined fields | Number (S) | |
| Opt | T | DateRecordEntered | Date that user input this record[1] | Month/Day/Year | • If left blank, then today's date will be used |
| Opt | U | ExclFrmAllAnalysisAndOutput | Filters this entry from all calcs and exporting (except raw data export) | Y or N | • Temp functionality will be removed once in-database filtering implemented |

Primary Key   Opt = Optional   Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
(S) Single -3.402823E38 to -1.401298E-45 (neg. values) 1.401298E-45 to 3.402823E38 (pos. values)
(D) Double -1.79769313486231E308 to -4.94065645841247E-324 (neg. values) 1.79769313486231E308 to 4.94065645841247E-324 (pos. values)

1. Will be useful at distinguishing records when doing a database update

FIGURE 43D - Data template input

OrganizationCategories

| | Column letter | Column name | Column definition | Data type | Notes/restrictions |
|---|---|---|---|---|---|
| | C | OrganizationCategory | | Text <=255 char | |
| Opt | D-I | WeightingScenarioXX | Importance weight of Org Category | Limited options[1] Text <=10 char | • At least one weighting scenario must have data |
| Opt | J-N | tbl_InfOrgCategoriesUDTXX | User defined fields | Text <=255 char | |
| Opt | O-S | tbl_InfOrgCategoriesUDNXX | User defined fields | Number | |
| Opt | T | DateRecordEntered | Date that user input this record[1] | Month/Day/Year | • If left blank, then today's date will be used |
| Opt | U | ExclFrmImportance | | Y or N | • Temp functionality will be removed once in-database filtering implemented |
| Opt | V | ExclFrmAllAnalysisAndOutput | | Y or N | • Temp functionality will be removed once in-database filtering implemented |

Primary Key   Opt = Optional   Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

1. Options are: Zero, VL, L, L-M, M, M-H, H, VH

FIGURE 43E - Data template input

OrgSubCategories

| | Column letter | Column name | Column definition | Data type | Notes/restrictions |
|---|---|---|---|---|---|
| (Primary Key) | C | OrgSubCategory | | Text <=255 char | |
| | D | OrganizationCategory | Category subcat belongs to | Text <=255 char | • Must match OrgCat on OrgCategories sheet |
| Opt | E-J | WeightingScenarioXX | Importance weight of OrgSubCategory | Limited options[1]<br>Text <= 10 char | • At least one weighting scenario must have data |
| Opt | K-O | tbl_InfOrgSubCategoriesUDTXX | User defined fields | Text <=255 char | |
| Opt | P-T | tbl_InfOrgSubCategoriesUDNXX | User defined fields | Number | |
| Opt | U | DateRecordEntered | Date that user input this record[1] | Month/Day/Year | • If left blank, then today's date will be used |
| Opt | V | ExclFrmImportance | | Y or N | • Temp functionality will be removed once in-database filtering implemented |
| Opt | W | ExclFrmAllAnalysisAndOutput | | Y or N | • Temp functionality will be removed once in-database filtering implemented |

Primary Key  Opt = Optional  Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43F - Data template input

Organizations

| | Column letter | Column name | Column definition | Data type | Notes/restrictions |
|---|---|---|---|---|---|
| | C | OrganizationName | | Text <=255 char | • All organizations must be listed here |
| | D | AbbreviatedOrgName | | Text <=255 char | • All organizations must be listed here |
| | E | OrgMemToOrgMemConn Strength | Strength of conn btwn org members | Number | • If user does not have relationship strengths then every entry should be marked "10" |
| | F | OrgSubCategory | Subcat org belongs to | Text <=255 char | • Must match OrgSubCat on OrgSubCats sheet |
| Opt | G | CreationDate | | Month/Day/Year | • Not used in calc's for this version of tool |
| Opt | H | DissolutionDate | | Month/Day/Year | • Not used in calc's for this version of tool |
| Opt | I-N | WeightingScenarioXX | Importance weight of Org | Limited options[1] Text <=10 char | • At least one weighting scenario must have data |
| Opt | O-S | tbl_DataOrganizationsUDTXX | User defined fields | Text <=255 char | • e.g., org location |
| Opt | T-X | tbl_DataOrganizationsUDNXX | User defined fields | Number | • e.g., number of grants given by org |
| Opt | Y | DateRecordEntered | Date that user input this record[1] | Month/Day/Year | • If left blank, then today's date will be used |
| Opt | Z | ExclFrmImportance | | Y or N | • Temp functionality will be removed once in-database filtering implemented |
| Opt | AA | ExclFrmAllAnalysisAndOutput | | Y or N | • Temp functionality will be removed once in-database filtering implemented |

Primary Key Opt = Optional Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43G - Data template input

OrganizationMembers

| | Column letter | Column name | Column definition | Data type | Notes/restrictions |
|---|---|---|---|---|---|
| Primary Key, Must match | C | AbbreviatedOrgName | | Text <=255 char | • Must match abr org name on organizations sheet<br>• Will be the name displayed by TouchGraph |
| Primary Key, Must match | D | StakeholderName | | Text <=255 char | • Must match name on Individuals sheet |
| Primary Key | E | RoleinOrg | Individuals role | Text <=255 char | • e.g., VP, CEO |
| | F | RoleWeight | SH's weight in org due to role | Number (Single) | • Suggested to limit options to 1, 2, or 4 |
| Opt | G | RoleStartDate | | Month/Day/Year | • Not used in calc's for this version of tool |
| Opt | H | RoleEndDate | | Month/Day/Year | • Not used in calc's for this version of tool |
| Opt | I-M | tbl_RelOrganizationMembersUDTXX | User defined fields | Text <=255 char | • User defined columns about the relationship between this individual and this org |
| Opt | N-R | tbl_RelOrganizationMembersUDNXX | User defined fields | Number (Single) | • User defined columns about the relationship between this individual and this org |
| Opt | S | DateRecordEntered | Date that user input this record[1] | Month/Day/Year | • If left blank, then today's date will be used |
| Opt | T | ExclFrmImportance | | Y or N | • Temp functionality will be removed once in-database filtering implemented |
| Opt | U | ExclFrmAllAnalysisAndOutput | | Y or N | • Temp functionality will be removed once in-database filtering implemented |

Primary Key    Opt = Optional    Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43H Data template input

DirectOrgToOrgConnections

| | Column letter | Column name | Column definition | Data type | Notes/restrictions |
|---|---|---|---|---|---|
| | C | AbbreviatedOrgName | | Text <=255 char | • Must match abr org name on organizations sheet |
| | D | AbbreviatedOrgRelatedName | | Text <=255 char | • Must match abr org name on organizations sheet |
| | E | RelationshipType | | Text <=255 char | |
| | F | OrganizationRelationshipStrength | Strength of tie btwn orgs | Number | • If user does not have relationship strengths then every entry should be marked "10" |
| Opt | G | RelationshipStartDate | | Month/Day/Year | • Not used in calc's for this version of tool |
| Opt | H | RelationshipEndDate | | Month/Day/Year | • Not used in calc's for this version of tool |
| Opt | I | Notes | | Text <=64000 char | |
| Opt | J-N | tbl_RelOrgToOrgUDTXX | User defined fields | Text <=255 char | • E.g., connection type (components of same org, trade relationship, joint venture, etc.) |
| Opt | O-S | tbl_RelOrgToOrgUDNXX | User defined fields | Number | |
| Opt | T | DateRecordEntered | Date that user input this record¹ | Month/Day/Year | • If left blank, then today's date will be used |
| Opt | U | ExclFrmAllAnalysisAndOutput | | Y or N | • Temp functionality will be removed once in-database filtering implemented |

Primary Key  Opt = Optional  Must match entry on linked table

Byte 0 to 255 (no fractions)
Integer -32,768 to 32,767 (no fractions)
Long integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43I Data template input

PubsCategories

| | Column letter | Column name | Column definition | Data type | Notes/restrictions |
|---|---|---|---|---|---|
| (Primary Key) | C | PublicationCategory | | Text <=255 char | |
| Opt | D-I | WeightingScenarioXX | Importance weight of Pub Category | Limited options[1] Text <=10 char | • At least one weighting scenario must have data |
| Opt | J-N | tbl_InfPubsCategoriesUDTXX | User defined fields | Text <=255 char | |
| Opt | O-S | tbl_InfPubsCategoriesUDNXX | User defined fields | Number | |
| Opt | T | DateRecordEntered | Date that user input this record | Month/Day/Year | • If left blank, then today's date will be used |
| Opt | U | ExclFrmImportance | | Y or N | • Temp functionality will be removed once in-database filtering implemented |
| Opt | V | ExclFrmAllAnalysisAndOutput | | Y or N | • Temp functionality will be removed once in-database filtering implemented |

Primary Key   Opt = Optional   Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43J - Data template input

PubsSubCat

| | Column letter | Column name | Column definition | Data type | Notes/restrictions |
|---|---|---|---|---|---|
| Primary Key | C | PubsSubCategory | | Text <=255 char | |
| Must match | D | PublicationCategory | Category subcat belongs to | Text <=255 char | • Must match PubCat on PubCats sheet |
| Opt | E-J | WeightingScenarioXX | Importance weight of PubSubCategory | Limited options[1] Text <=10 char | • At least one weighting scenario must have data |
| Opt | K-O | tbl_InfPubsSubCatUDTXX | User defined fields | Text <=255 char | |
| Opt | P-T | tbl_InfPubsSubCatUDNXX | User defined fields | Number | |
| Opt | U | DateRecordEntered | Date that user input this record[1] | Month/Day/Year | • If left blank, then today's date will be used |
| Opt | V | ExclFrmImportance | | Y or N | • Temp functionality will be removed once in-database filtering implemented |
| Opt | W | ExclFrmAllAnalysisAndOutput | | Y or N | • Temp functionality will be removed once in-database filtering implemented |

Primary Key Opt = Optional Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43K - Data template input

Publications

| | Column letter | Column name | Column definition | Data type | Notes/restrictions |
|---|---|---|---|---|---|
| (Primary Key) | C | PublicationName | | Text <=255 char | |
| (Must match) | D | PubSubCategory | SubCat pub belongs to | Text <=255 char | • Must match PubSubCat on PubSubCats sheet |
| Opt | E-J | WeightingScenarioXX | Importance weight of Pub | Limited options[1] Text <=10 char | • At least one weighting scenario must have data |
| Opt | K-O | tbl_DataPublicationsUDTXX | User defined fields | Text <=255 char | • e.g., disease focus, location |
| Opt | P-T | tbl_DataPublicationsUDNXX | User defined fields | Number | • e.g., founding year |
| Opt | U | DateRecordEntered | Date that user input this record | Month/Day/Year | • If left blank, then today's date will be used |
| Opt | V | ExclFrmImportance | | Y or N | • Temp functionality will be removed once in-database filtering implemented |
| Opt | W | ExclFrmAllAnalysisAndOutput | | Y or N | • Temp functionality will be removed once in-database filtering implemented |

Primary Key  Opt = Optional  Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43L - Data template input

Articles

| | Column letter | Column name | Column definition | Data type | Notes/restrictions |
|---|---|---|---|---|---|
| | C | ArticleID | Identifier for article | Positive Integer | • It is a good idea to use PubMed ID<br>• All articles must have ID and must be listed here |
| | D | PublicationName | Name of publisher | Text <=255 char | • Must match name pub name on pubs sheet<br>• e.g., New England Journal of Medicine |
| Opt | E | ArticleTitle | Name of article | Text <=64000 char | |
| Opt | F | ArticleDate | Date published | Month/Day/Year | |
| | G | AuthToAuthConnStrength | Strength of conn btwn authors | Number | • If user does not have relationship strengths then every entry should be marked "10" |
| | H | ImportanceDistributionMethod | | Either "Linear" or "FirstLastSecond" | • Determines how authorship position translates to importance |
| | I | TotalAuthors | # of authors of article | Positive Integer | • Include all authors (even those not in database) |
| Opt | J-N | tbl_DataArticlesUDTXX | User defined fields | Text <=255 char | • e.g., disease focus |
| Opt | O-S | tbl_DataArticlesUDNXX | User defined fields | Number | • e.g., number of citations |
| Opt | T-Y | WeightingScenarioXX | Importance weight of Article | Limited options Text <=10 char | • At least one weighting scenario must have data |
| Opt | Z | DateRecordEntered | Date that user input this record | Month/Day/Year | • If left blank, then today's date will be used |
| Opt | AA | ExclFrmImportance | | Y or N | • Temp functionality will be removed once in-database filtering implemented |
| Opt | AB | ExclFrmAllAnalysisAndOutput | | Y or N | • Temp functionality will be removed once in-database filtering implemented |

Primary Key   Opt = Optional   Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

FIGURE 43M - Data template input

ArticleAuthors

| | Column letter | Column name | Column definition | Data type | Notes/restrictions |
|---|---|---|---|---|---|
| | C | ArticleID | | Positive integer | • Must match Article ID on Articles Sheet |
| | D | StakeholderName | | Text <=255 char | • Must match name on Individuals sheet |
| | E | AuthorshipPosition | Position author's name appears on article | Positive integer | • Must be less than or equal to the number of authors of article |
| Opt | F-J | tbl_RelArticleAuthorsUDTXX | User defined fields | Text <=255 char | • User defined columns about the relationship between this individual and this article |
| Opt | K-O | tbl_RelArticleAuthorsUDNXX | User defined fields | Number | • User defined columns about the relationship between this individual and this article |
| Opt | P | DateRecordEntered | Date that user input this record' | Month/Day/Year | • If left blank, then today's date will be used |
| Opt | Q | ExclFrmImportance | | Y or N | • Temp functionality will be removed once in-database filtering implemented |
| Opt | R | ExclFrmAllAnalysisAndOutput | | Y or N | • Temp functionality will be removed once in-database filtering implemented |

Primary Key   Opt = Optional   Must match entry on linked table

Byte 0 to 255 (no fractions)
Integer -32,768 to 32,767 (no fractions)
Long Integer -2,147,483,648 to 2,147,483,647 (no fractions)
Decimal -10^28 -1 through 10^28 -1
Single -3.402823E38 to -1.401298E-45 (neg. values) 1.401298E-45 to 3.402823E38 (pos. values)
Double -1.79769313486231E308 to -4.94065645841247E-324 (neg. values) 1.79769313486231E308 to 4.94065645841247E-324 (pos. values)

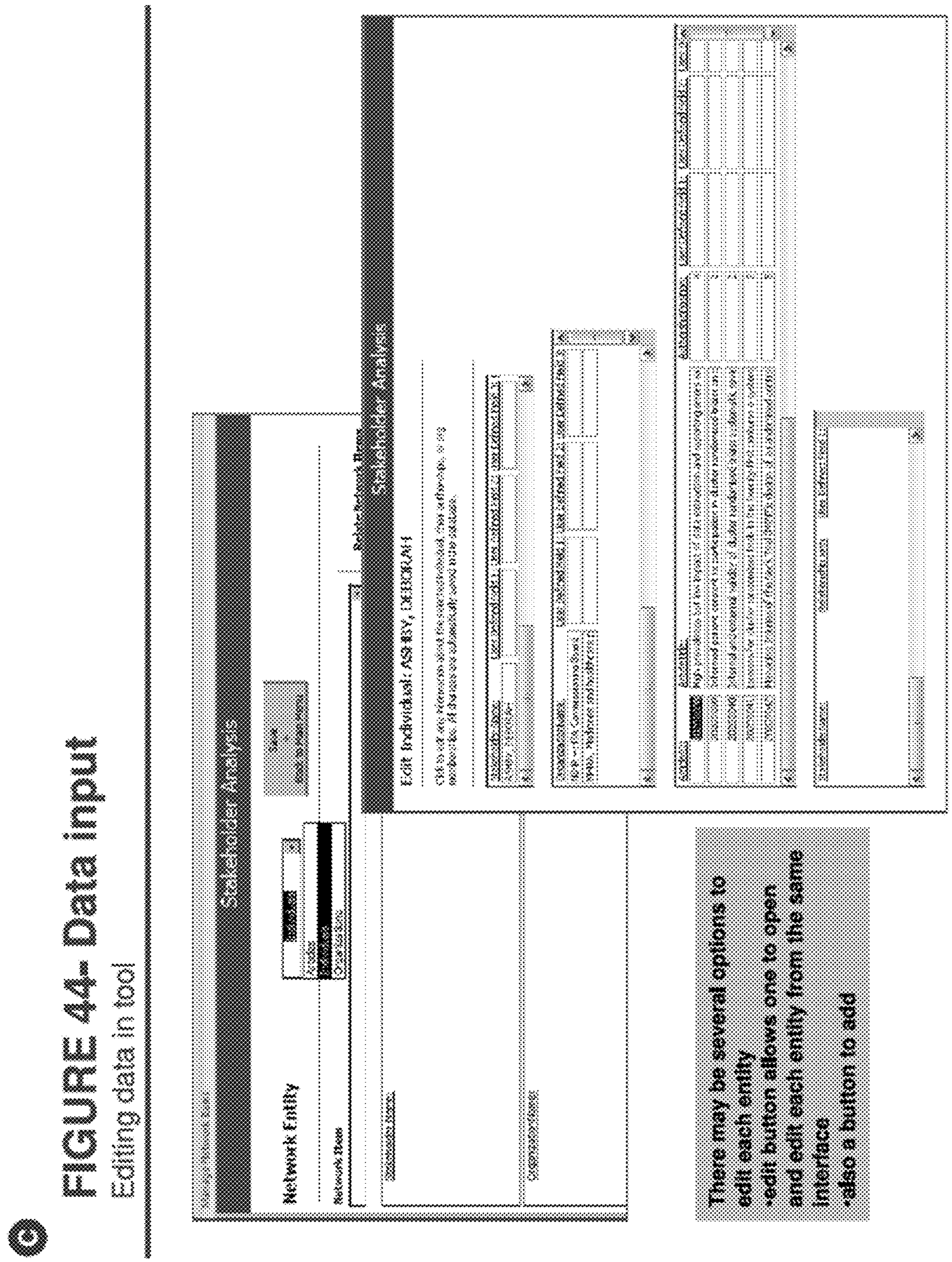
FIGURE 44- Data input
Editing data in tool
Stakeholder Analysis
Network Entity
Network Item
Stakeholder Analysis
Edit Individual: ASHBY, DEBORAH
There may be several options to edit each entity
•edit button allows one to open and edit each entity from the same interface
•also a button to add

FIGURE 45 - Capturing data

1. Standardize formatting conventions early
   - E.g. Names – LAST, FIRST INITIALS
   - Use 'upper' function and 'trim' function
   - Avoid all characters 2. Determine data structure early and make sure all relevant data is captured
   - attribute variables
   - organization categories and subcategories
   - publication categories and subcategories 3. Capture the data source and date

4. Leverage outside data sources, such as EVS (to pull data off a website and a pre-specified format, for example) or Office Tiger to edit/fix spreadsheets. Healthcare KG can also search for data.

D

FIGURE 46 - Assigning importance weights

Importance scores are entered as H, M, L into the database, using the following abbreviations:

VH = 7, very high
H = 6, high
M-H = 5, medium high
M = 4, medium
L-M = 3, low medium
L = 2, low
VL = 1, very low
Zero = not considered in importance score The tool automatically converts the text rankings to numerical scores

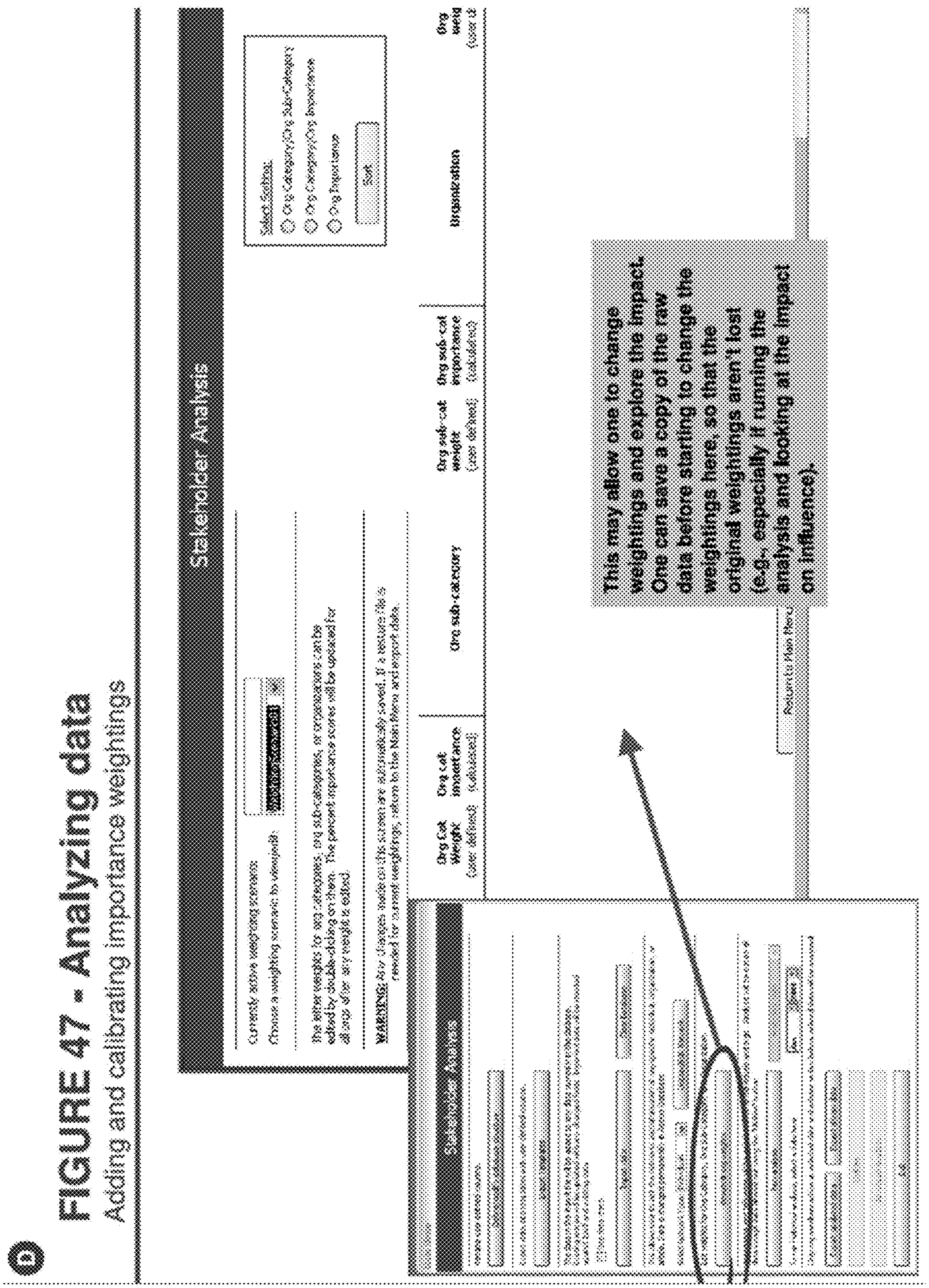
D
FIGURE 47 - Analyzing data
Adding and calibrating importance weightings
Stakeholder Analysis
Org Cat Weight (user defined)
Org cat importance (calculated)
Org sub-category
Org sub-cat weight (user defined)
Org sub-cat importance (calculated)
Organization
Sort
Stakeholder Analysis
This may allow one to change weightings and explore the impact. One can save a copy of the raw data before starting to change the weightings here, so that the original weightings aren't lost (e.g., especially if running the analysis and looking at the impact on influence).

D
FIGURE 48 - Analyzing the data
Six different weighting scenarios possible in this embodiment.
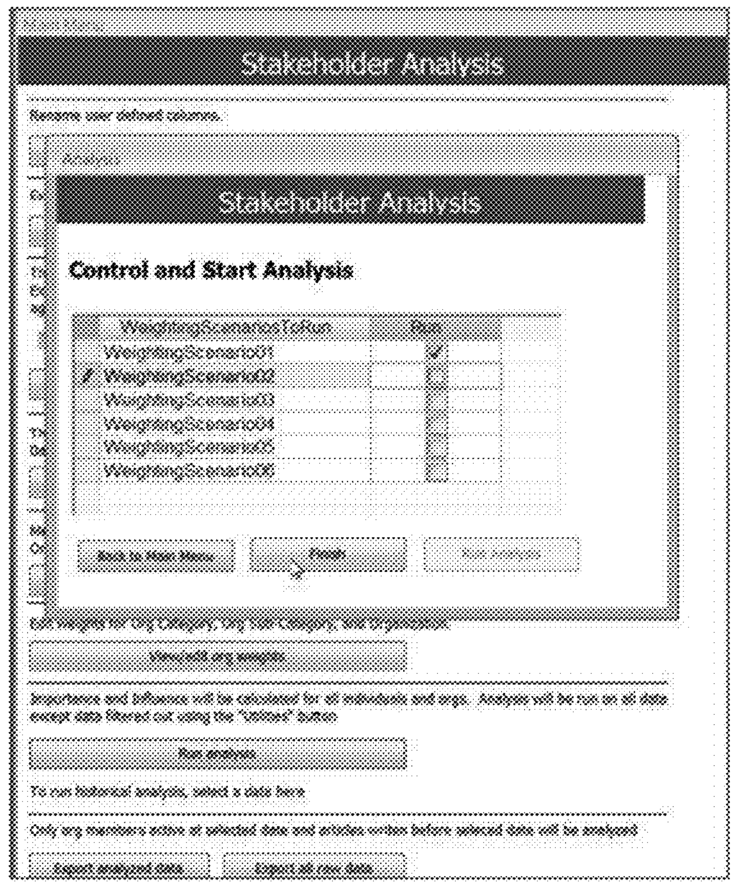

FIGURE 49 - High-level view of Importance, connection strength, and influence methodology
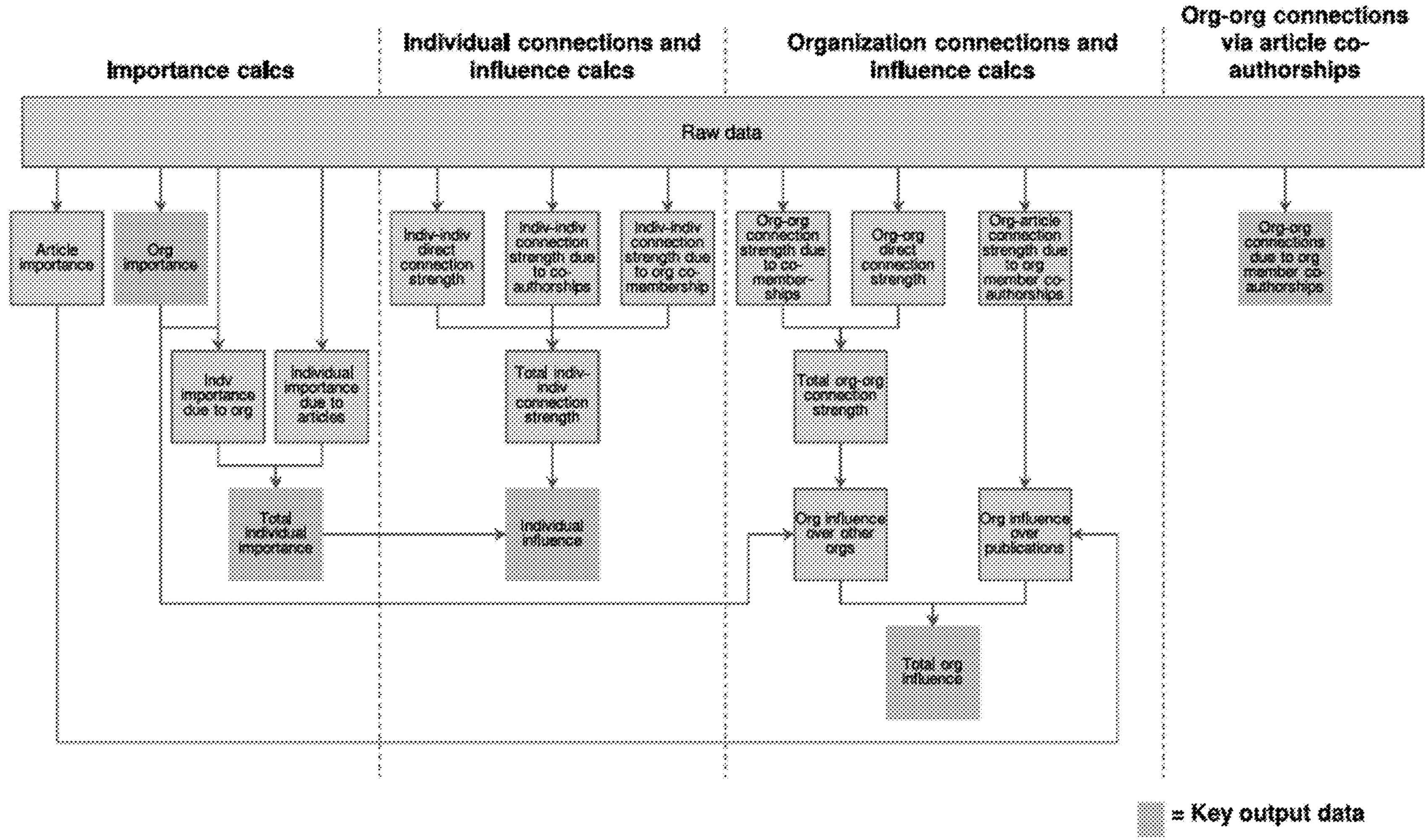

FIGURE 50 - User assigns weights that that will be used for calculations
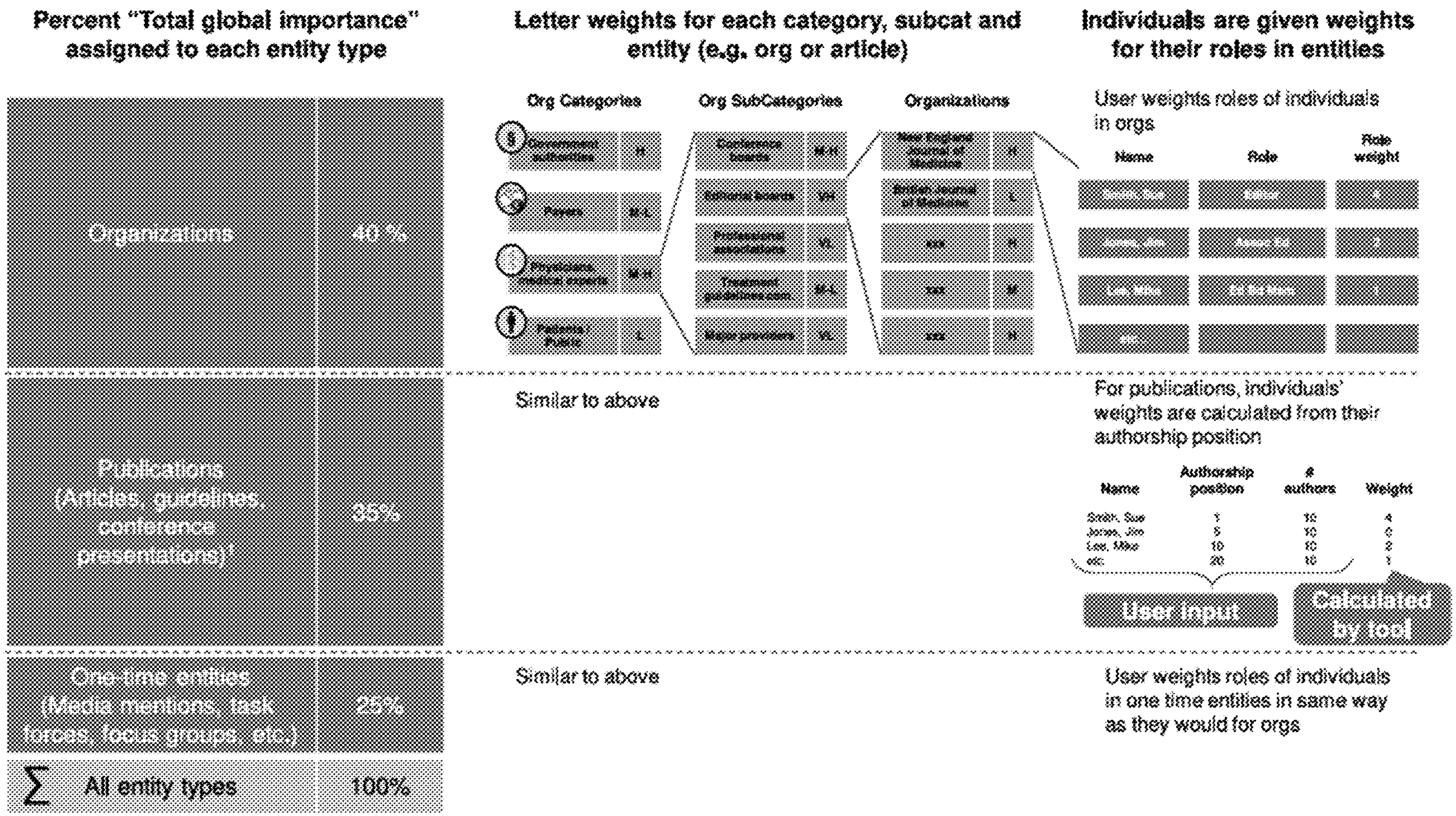
1. Media Mentions, task forces, focus groups can be lumped into "Publications" category unless , for example, "One-Time Entities" are implemented FIGURE 51 - High level view of importance calculations
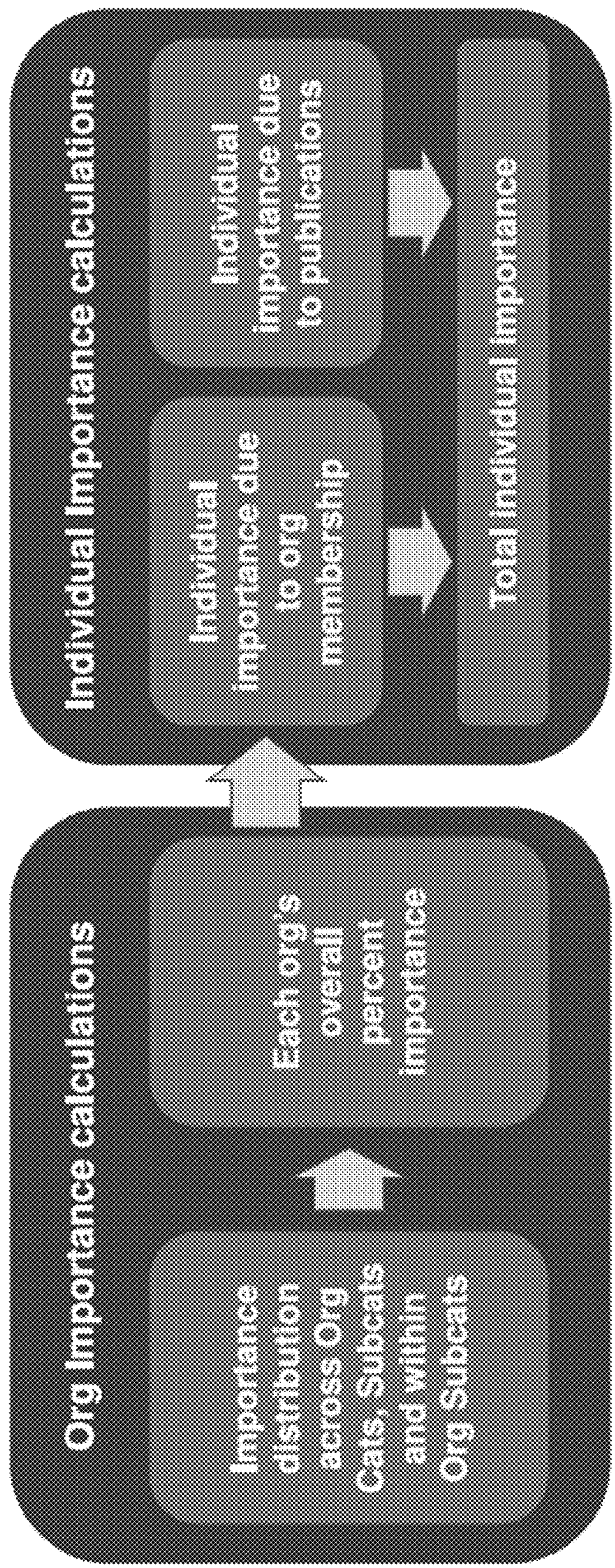

Importance calculations
FIGURE 52- Total importance for all orgs distributed across org cats based on num of orgs in the category and category weight
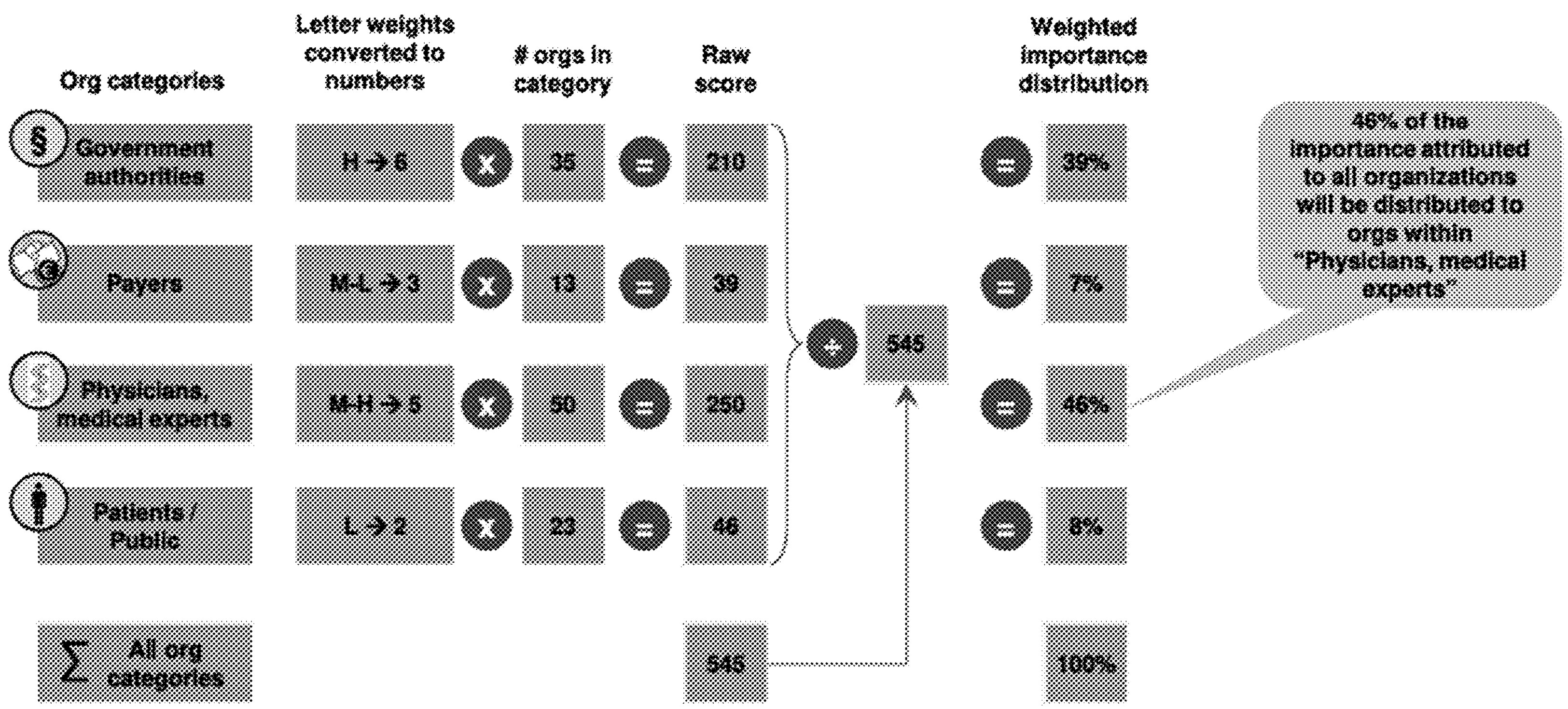

Importance calculations
FIGURE 53 - Org cat importance distributed across subcats based on num of orgs in subcategory and subcategory weight
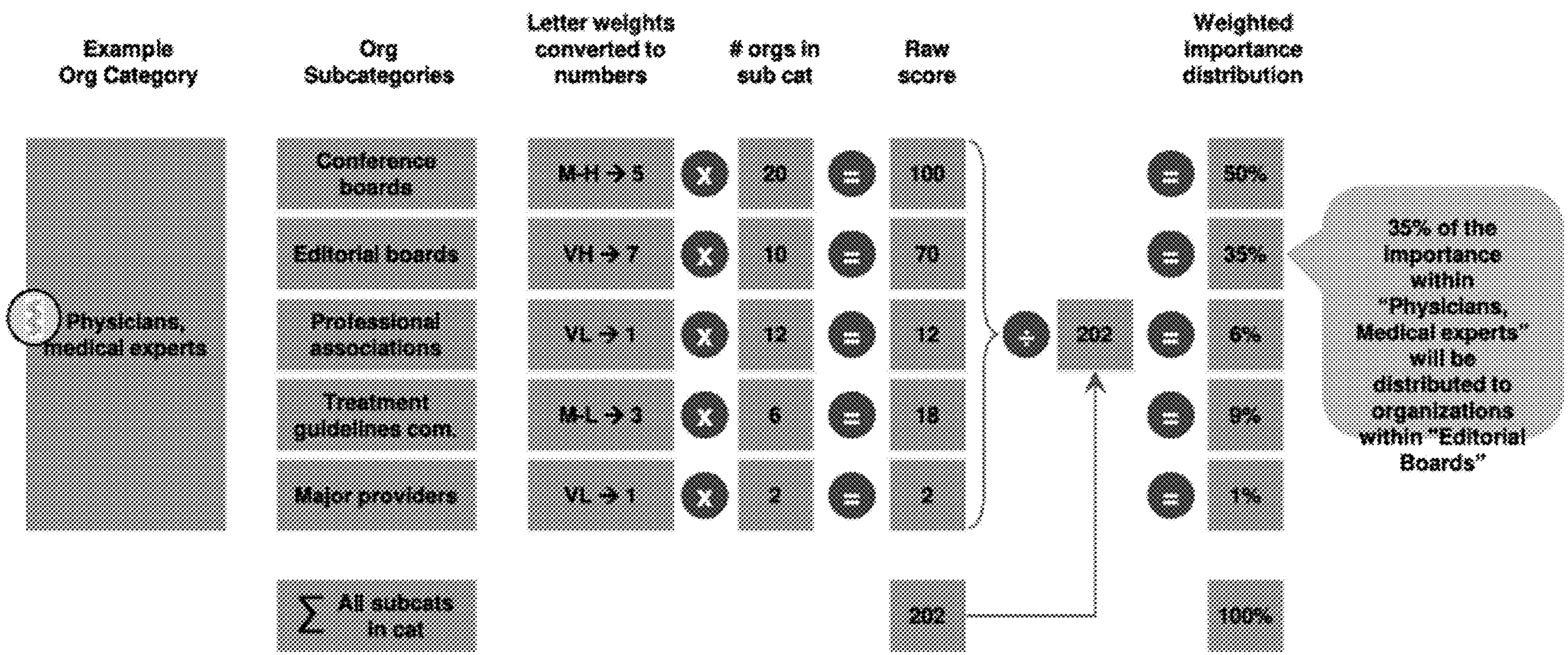

Importance calculations
FIGURE 54 - Importance within org subcats is distributed to organizations based on organization weight
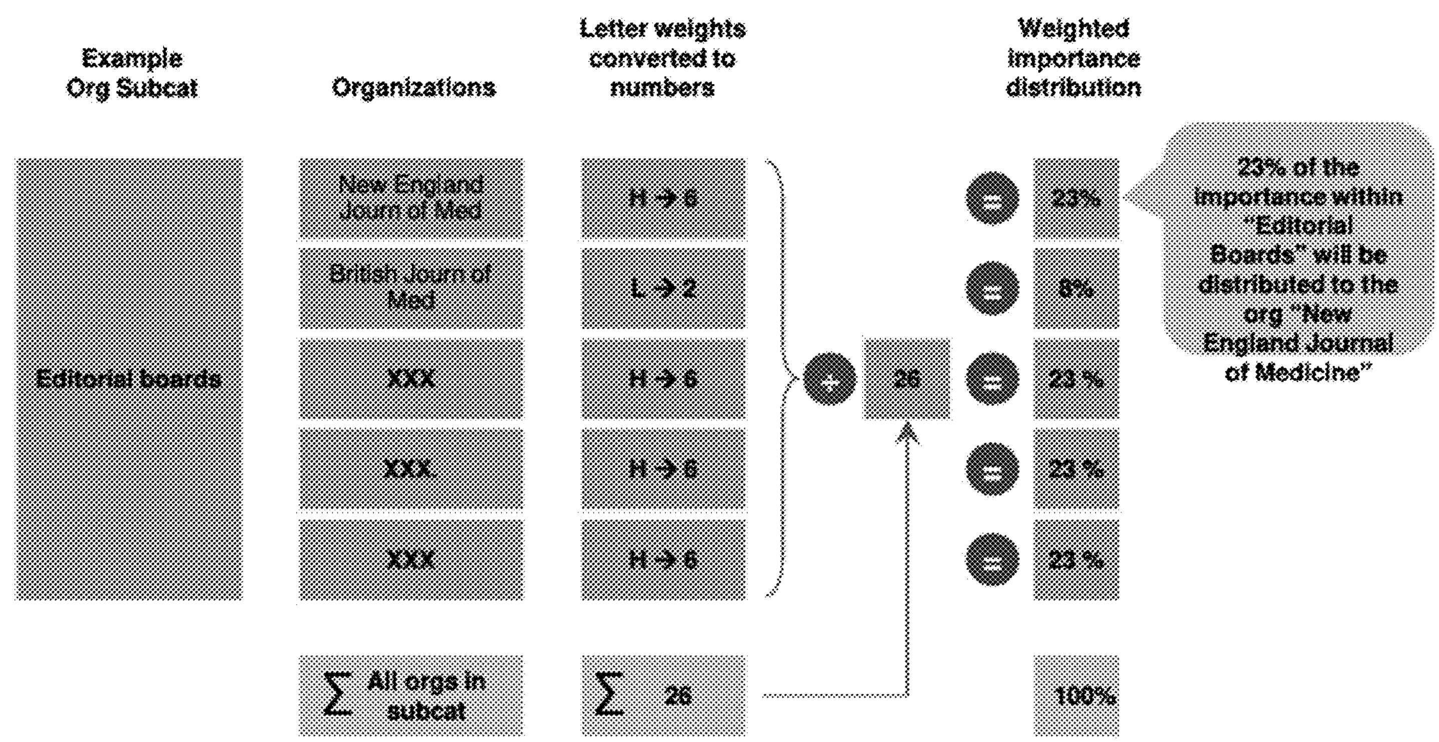

Importance calculations
FIGURE 55 - Overall importance of each org is calculated
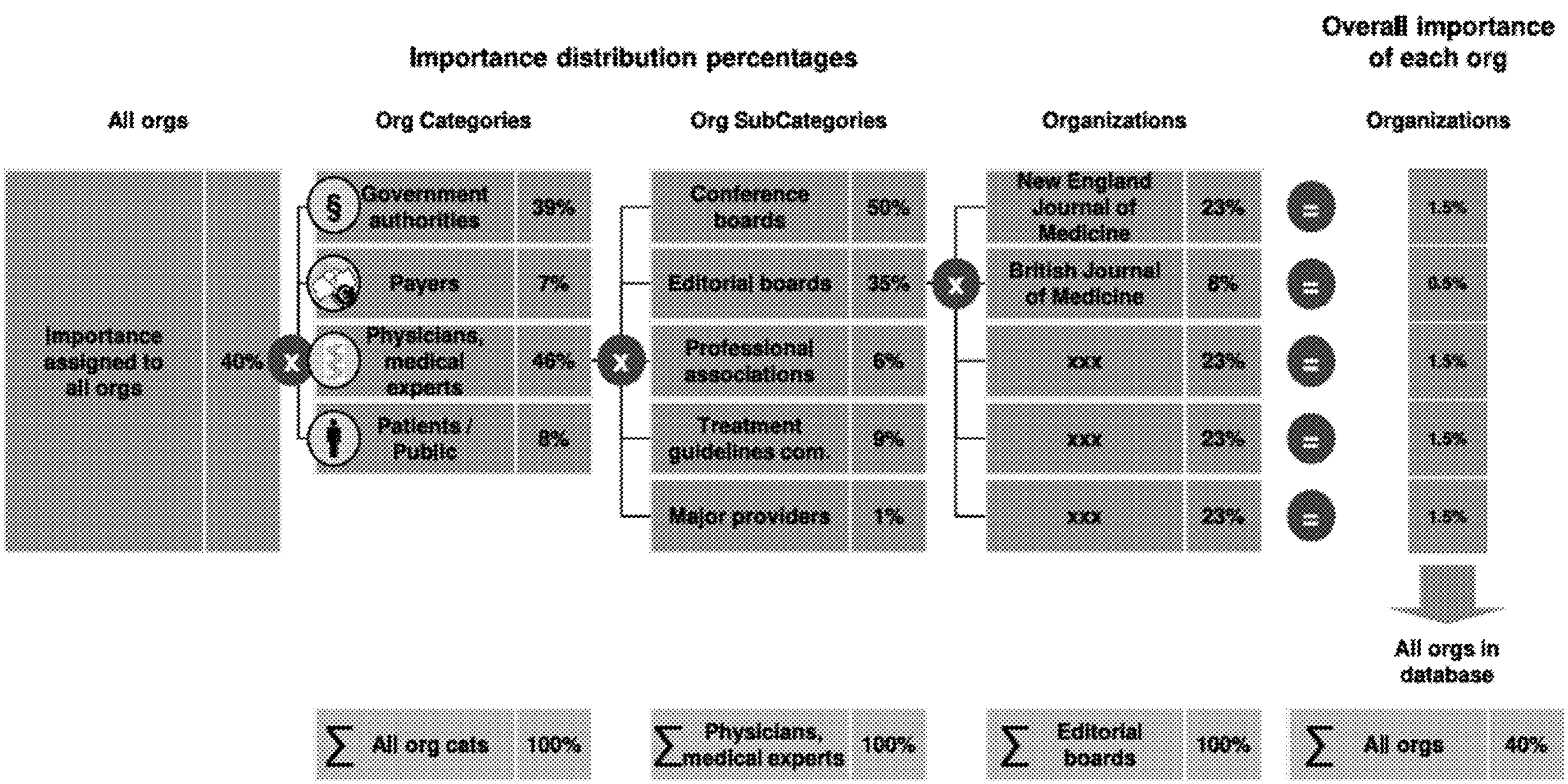

Importance calculations

1. As a result , the individuals' importances due to each org may not sum to the org importance in some embodiments Importance calculations
FIGURE 57 - Importance due to publications is distributed to all individuals
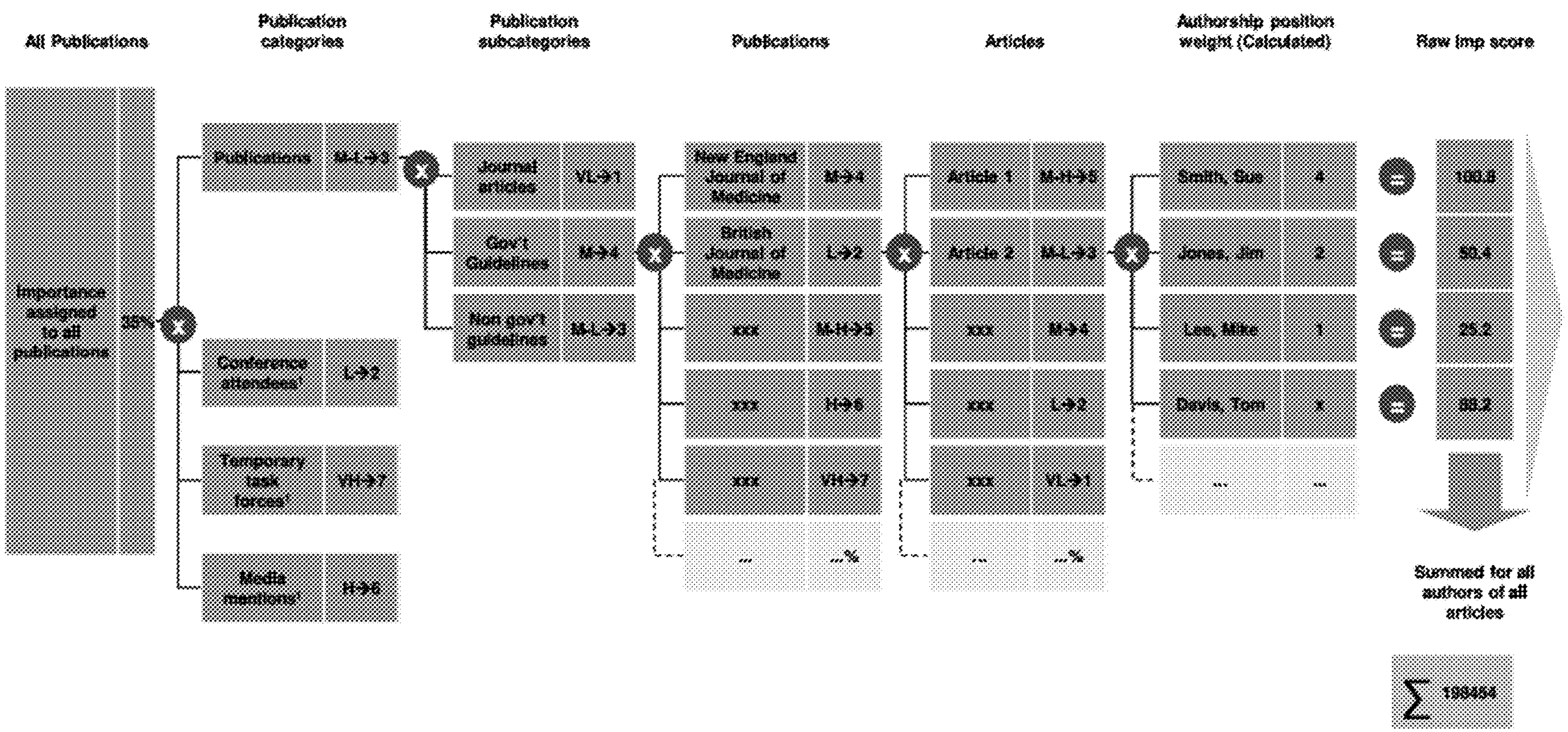

Importance calculations
FIGURE 58 - Importance due to publications is distributed to all individuals
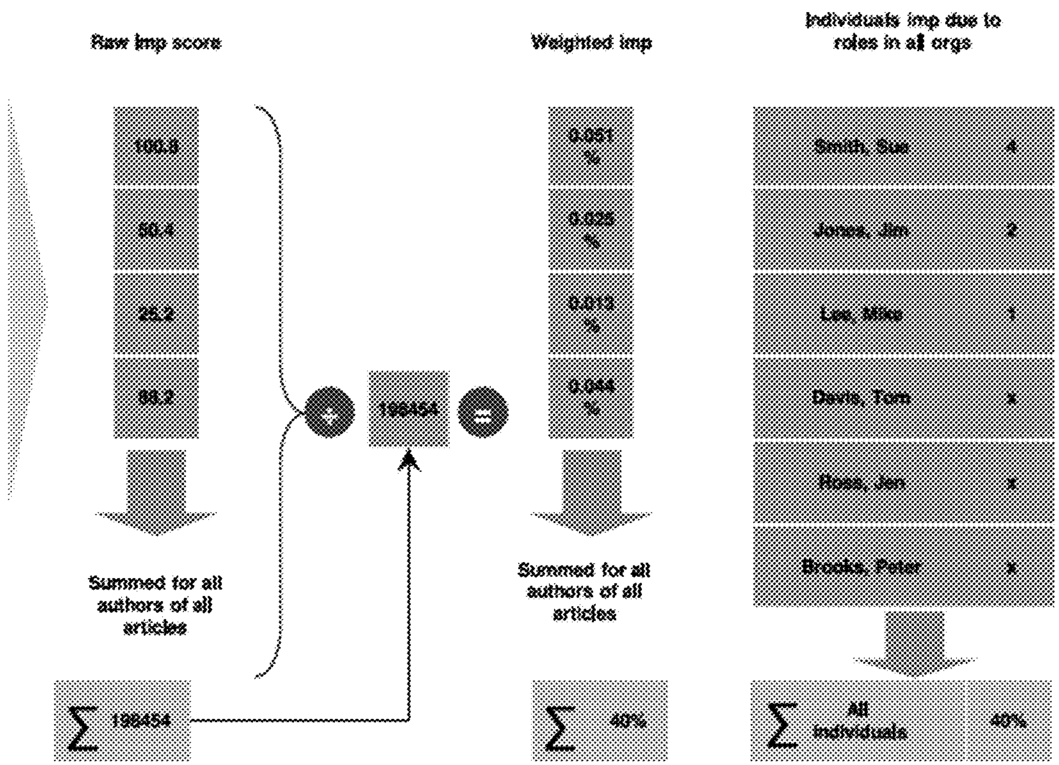
1. In some embodiments, these may be handled by “third entity type” once it is created Org influence calculations

FIGURE 59 - Method of calculating org influence

Overall formula

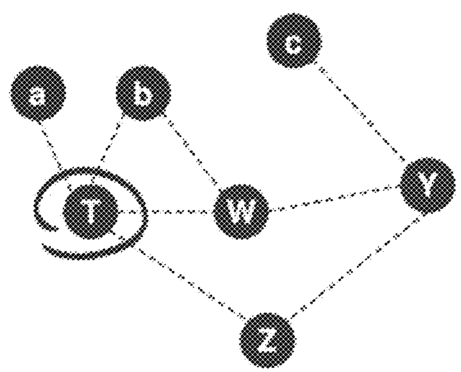

Connection (direct and/or through individuals)

Y Org

1 Individual a Article

Overall org influence calculations

Organizational influence is calculated from two factors

- Probability that the organization will affect another organization's behavior and importance of those organizations
- Probability that the organization will affect material published in the future and importance of those articles
  - Past articles are used to as a proxy for future articles
- When "one-time entities" are allowed, we will also be able to account for influence due to conferences, focus groups, etc.

Weighted Influence of Org T = Influence on other orgs + Influence on articles[1]

Weighted Influence Org T =

[Importance of (Org W) x strength of tie of (Org T to Org W)] +
[Importance of (Org Z) x strength of tie of (Org T to Org Z)]

+

[Importance of (Art a) x strength of tie of (Org T to pub a)] +
[Importance of (Art b) x strength of tie of (Org T to pub b)]

1. In some embodiments, organizations may also exert influence over articles via direct org-article and org-journal relationships

FIGURE 60 - Method of calculating org influence

Calculating strength of tie between two orgs

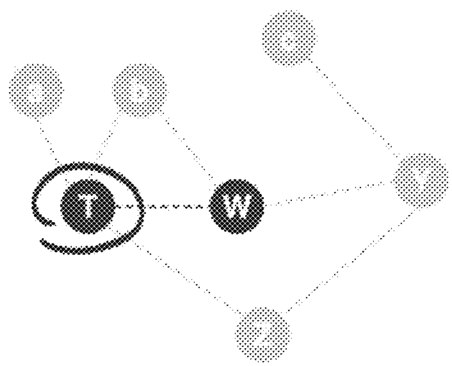

Strength of tie between two orgs

Strength of tie between orgs is based on two types of connections

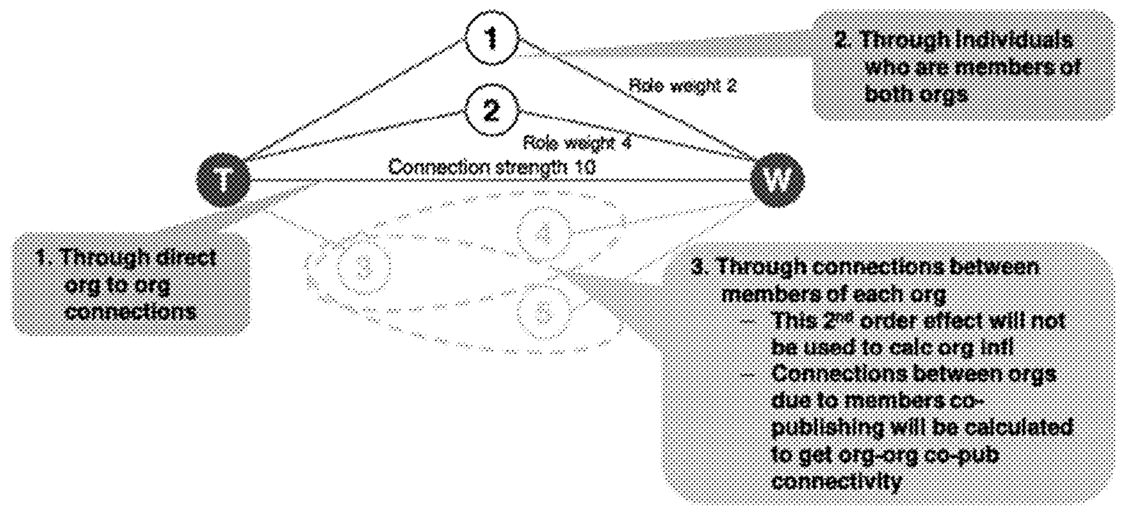

Connection (direct and/or through individuals)

Y Org

1 Individual a Article

Strength of tie of (Org T to Org W)[1]=probability Org T will affect Org W's actions

=BINOMIAL{Strength of direct org-org tie + sum(impact each of the connecting individuals have on org W)[2]}

=BINOMIAL{10 + (2+4)}=BINOMIAL{16}="# between 0 and 1"[3]

1. Org-org strength of tie may be directional in some embodiments.
2. In some embodiments, the impact connecting individuals have on an org may be approximated by the individual's role weight in that org
3. In some embodiments, BINOMIAL{} can mean that the number inside {} will be converted to a probability via the binomial theorem Org influence calculations

FIGURE 61 - Method of calculating org influence

Calculating strength of tie between an org and an article

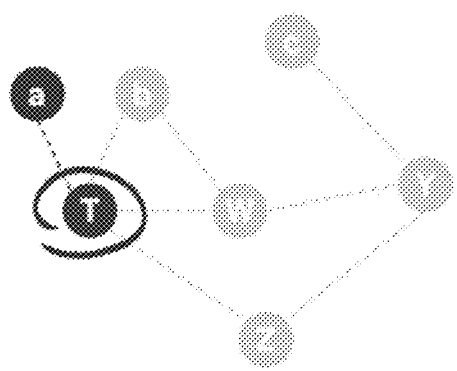

Strength of tie between an org and an article

Strength of tie between an org and an article is based on individuals in the org who authored the article

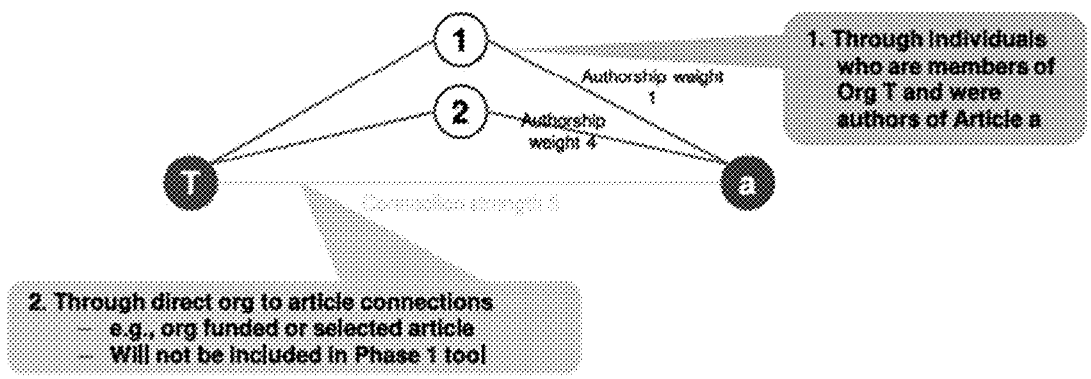

- Connection (direct and/or through individuals)
- Y Org
- 1 Individual
- a Article

Strength of tie of (Org T to Article a)[1]=Amount Org T was able to influence the content of Article a

=BINOMIAL{sum(impact each of the connecting individuals had on Article a)[2]}

=BINOMIAL{(1+4)}=BINOMIAL{5}="# between 0 and 1"[3]

1. In some embodiments, the org-article strength of tie may be directional
2. In some embodiments, the impact connecting authors have on an articles may be approximated by their authorship weight in the article (e.g., calculated from their authorship position)
3. In some embodiments, BINOMIAL{} means that the number inside {} will be converted to a probability via the binomial theorem Note: Organizations can also exert influence over articles via org-article and org-journal relationships in some embodiments.

FIGURE 62 - Organization connection strength due to members' co-publishing articles

Count number of individuals connected to the other org via co-pubs, divide by two, and then multiply by a number between 0 and 1 (determined by number of articles)

**Connection strength between Org X and Org Y = # individuals * Binomial [1](#articles[2]) / 2**

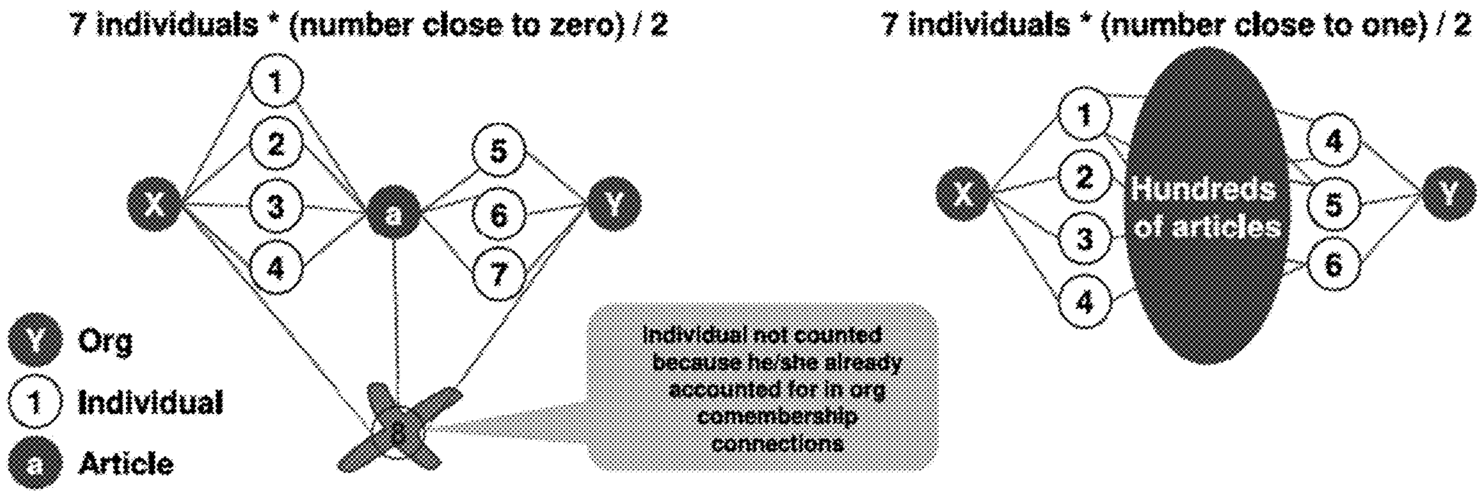

This simplifed method designed to be easy to explain to clients[3]

1. In some embodiments, using [illegible] individuals each article is connected to.
2. In some embodiments, articles with a author connection strength of zero may not be included because they may not cause connections among the authors
3. In some embodiments, other more simplified methods can be rejected because they cause extreme divergences and return very high values in some situations figure63.md

FIGURE 63A

```
class Asset():
    """General Parent Class for Assets"""
    pass class PatentPublication(Asset):
    """Patent-specific Asset class inherited from Asset()"""
    def __init__(self,publication_number):
        self.publication_number = publication_number class ScientificPublication(Asset):
    """Scientific Publication-specific Asset class inherited from Asset()"""

def __init__(self, publication_number):
        self.publication_number = publication_number class Tie():
    """General Parent Class for Ties"""

def __init__(self,tie_value,tie_category_weight):
        self.tie_value = tie_value
        self.tie_category_weight = tie_category_weight class Citation(Tie):
    """One Asset Cites Another"""
    def __init__(self,tie_value,tie_category_weight):
        Tie.__init__(self,tie_value,tie_category_weight)

class SharesPerson(Tie):
    """Two assets have the same people involved, e.g. they share an inventor and/or author"""
    def __init__(self,tie_value,tie_category_weight):
        Tie.__init__(self,tie_value,tie_category_weight)

class MetaTie():
    def __init__(self, asset_1, asset_2):
        self.asset_1 = asset_1
        self.asset_2 = asset_2
        self.meta_tie_value = 0 class Ties():
    """A collection of all ties between two Assets()"""
    def __init__(self,asset_1,asset_2):
        self.asset_1 = asset_1
        self.asset_2 = asset_2
        self.ties_list = []

def add_weighted_tie(self,tie):
        self.ties_list.append(tie)

def generate_meta_tie(self):
        meta_tie = MetaTie(asset_1=self.asset_1,asset_2=self.asset_2)

for tie in self.ties_list:
            meta_tie.meta_tie_value += tie.tie_value * tie.tie_category_weight return meta_tie
```

```
if __name__ == "__main__":

instantiate two Assets
    patent_publication = PatentPublication(publication_number="1235678")
    scientific_publication = ScientificPublication(publication_number="1235678")

instantiate a ties objects
    ties = Ties(asset_1=patent_publication,asset_2=scientific_publication)

add weighted ties to the ties object
    # three citations between the two assets
    ties.add_weighted_tie(Citation(tie_value=3,tie_category_weight=1))
    # one shared person between the two assets
    ties.add_weighted_tie(SharesPerson(tie_value=2, tie_category_weight=2))

generate a meta_tie_value
    meta_tie = ties.generate_meta_tie()

print(meta_tie.meta_tie_value) # prints 7
```

```
class Asset():
    """General Parent Class for Assets"""
    pass class Company(Asset):
    """Company-specific Asset class inherited from Asset()"""

def __init__(self, name, annual_revenue_million_USD, count_of_employees):
        self.name = name feature values
        self.annual_revenue_million_USD = annual_revenue_million_USD
        self.count_of_employees = count_of_employees feature category weights
        self.revenue_relative_importance = 1.8
        self.count_of_employees_relative_importance = 3 def calculate_weighted_revenue_per_employee(self):
        """Example of calculating a meta asset value"""

weighted_annual_revenue = self.annual_revenue_million_USD * self.revenue_relative_importance
        weighted_count_of_employees = self.count_of_employees * self.count_of_employees_relative_importance
        self.weighted_revenue_per_employee = weighted_annual_revenue / weighted_count_of_employees if __name__ == "__main__":

instantiate an asset
    company = Company(name="Acme Corp", annual_revenue_million_USD=100, count_of_employees=50)

generate meta asset value
    company.calculate_weighted_revenue_per_employee()
    print(company.weighted_revenue_per_employee) # prints 1.2
``` figure65.md

FIGURE 65A

```
class Network():
    def __init__(self,network_id):
        self.network_id = network_id
        self.assets = []
        self.meta_ties = []

def add_asset_to_network(self,asset):
        self.assets.append(asset)

def add_meta_tie_to_network(self,asset_1,asset_2,meta_tie):
        self.meta_ties.append({asset_1,asset_2,meta_tie})

def calculate_asset_network_influence(self,asset):
        asset_network_influence = # proprietary algorithm
        return asset_network_influence class Asset():
    """General Parent Class for Assets"""
    pass class PatentPublication(Asset):
    """Patent-specific Asset class inherited from Asset()"""
    def __init__(self,publication_number):
        self.publication_number = publication_number class ScientificPublication(Asset):
    """Scientific Publication-specific Asset class inherited from Asset()"""

def __init__(self, publication_number):
        self.publication_number = publication_number class Company(Asset):
    """Company-specific Asset class inherited from Asset()"""

def __init__(self, name, annual_revenue_million_USD, count_of_employees):
        self.name = name feature values
        self.annual_revenue_million_USD = annual_revenue_million_USD
        self.count_of_employees = count_of_employees feature category weights
        self.revenue_relative_importance = 1.8
        self.count_of_employees_relative_importance = 3 def calculate_weighted_revenue_per_employee(self):
        """Example of calculating a meta asset value"""

weighted_annual_revenue = self.annual_revenue_million_USD * self.revenue_relative_importance
        weighted_count_of_employees = self.count_of_employees * self.count_of_employees_relative_importance
        self.weighted_revenue_per_employee = weighted_annual_revenue / weighted_count_of_employees
```

FIGURE 65B

```
class Tie():
    """General Parent Class for Ties"""

def __init__(self,tie_value,tie_category_weight):
        self.tie_value = tie_value
        self.tie_category_weight = tie_category_weight class Citation(Tie):
    """One Asset Cites Another"""
    def __init__(self,tie_value,tie_category_weight):
        Tie.__init__(self,tie_value,tie_category_weight)

class SharesPerson(Tie):
    """Two assets have the same people involved, e.g. they share an inventor and/or author"""
    def __init__(self,tie_value,tie_category_weight):
        Tie.__init__(self,tie_value,tie_category_weight)

class SharesAddress(Tie):
    """Two assets have the same addresses involved, e.g. author mailing address and company headquarters address"""
    def __init__(self,tie_value,tie_category_weight):
        Tie.__init__(self,tie_value,tie_category_weight)

class MetaTie():
    def __init__(self, asset_1, asset_2):
        self.asset_1 = asset_1
        self.asset_2 = asset_2
        self.meta_tie_value = 0 class Ties():
    """A collection of all ties between two Assets()"""
    def __init__(self,asset_1,asset_2):
        self.asset_1 = asset_1
        self.asset_2 = asset_2
        self.ties_list = []

def add_weighted_tie(self,tie):
        self.ties_list.append(tie)

def generate_meta_tie(self):
        meta_tie = MetaTie(asset_1=self.asset_1,asset_2=self.asset_2)

for tie in self.ties_list:
            meta_tie.meta_tie_value += tie.tie_value * tie.tie_category_weight return meta_tie if __name__ == "__main__":

instantiate a Network
    network = Network()

instantiate three Assets
    patent_publication = PatentPublication(publication_number="1235678")
    scientific_publication = ScientificPublication(publication_number="1235678")
    company = Company(name="Acme Corp", annual_revenue_million_USD=100, count_of_employees=50)

add assets to network
    network.add_asset_to_network(patent_publication)
    network.add_asset_to_network(scientific_publication)
    network.add_asset_to_network(company)

generate meta asset value
```

FIGURE 65C

```
company.calculate_weighted_revenue_per_employee()
print(company.weighted_revenue_per_employee)  # prints 1.2 instantiate a ties objects between patent_publication and scientific_publication
patent_sci_pub_ties = Ties(asset_1=patent_publication,asset_2=scientific_publication)

add weighted ties to the ties object between patent_publication and scientific_publication
three citations between the two assets
patent_sci_pub_ties.add_weighted_tie(Citation(tie_value=3,tie_category_weight=1))
one shared person between the two assets
patent_sci_pub_ties.add_weighted_tie(SharesPerson(tie_value=2, tie_category_weight=2))

generate a meta_tie_value between patent_publication and scientific_publication
patent_sci_pub_meta_tie = patent_sci_pub_ties.generate_meta_tie()

add meta_tie to network
network.add_meta_tie_to_network(asset_1=patent_publication,
                                asset_2=scientific_publication,
                                meta_tie=patent_sci_pub_meta_tie)

instantiate a ties objects between company and scientific_publication
company_sci_pub_ties = Ties(asset_1=company,asset_2=scientific_publication)
company_sci_pub_ties.add_weighted_tie(SharesAddress(tie_value=1,tie_category_weight=10))

generate a meta_tie_value between company and scientific_publication
company_sci_pub_meta_tie = company_sci_pub_ties.generate_meta_tie()

add meta_tie to network
network.add_meta_tie_to_network(asset_1=company,
                                asset_2=scientific_publication,
                                meta_tie=company_sci_pub_meta_tie)

calculate the network influence of company asset
company_network_influence = network.calculate_asset_network_influence(company)
``` figure66.md

FIGURE 66 A

Latent Dirichlet allocation (LDA)

An algorithm for discovering topics in series of documents.

Script parameters

```
TAG_ID = 1335
NUMBER_OF_TOPICS = 5
STOP_WORDS = ['DEVICE', 'APPARATUS', 'SYSTEM', 'METHOD', 'BASED']
```

Advanced parameters

You don't need to change these in most cases

```
WORKERS=3
PASSES=3
ITERATIONS=100
```

Download data from Edison Data Base

```
from edisonpy2 import tagset tag = tagset.Tagset(TAG_ID)
```

```
df = tag.to_dataframe([
    tag.Cols.pubs_publication_number,
    tag.Cols.pubs_title_terms_dwpi
])
```

Convert to list of texts

```
texts = df.pubs_title_terms_dwpi.dropna().str.split(' ')
```

```
texts = [[x for x in text if x not in STOP_WORDS] for text in texts]
```

Create dictionary and corpus from texts

```
import gensim id2word = gensim.corpora.Dictionary(texts)
corpus = [id2word.doc2bow(text) for text in texts]
```

FIGURE 66B

```
C:\Miniconda2\envs\py36\lib\site-packages\gensim\utils.py:855: UserWarning: detected Windows; aliasing chunkize to chunkize_serial
  warnings.warn("detected Windows; aliasing chunkize to chunkize_serial")
```

Create LDA model

```
%%time lda_model = gensim.models.ldamulticore.LdaMulticore(
    corpus=corpus,
    id2word=id2word,
    num_topics=NUMBER_OF_TOPICS,
    workers=WORKERS,
    passes=PASSES,
    iterations=ITERATIONS
)
```

```
Wall time: 3.94 s
```

Associate topics back to patents

```
%%time
import pandas as pd topic2patents = pd.DataFrame(
    {'topics': [sorted(lda_model[id2word.doc2bow(text)], key=lambda x: x[1]) for text in texts] }
)
```

FIGURE 63 (CONTINUED)

```
Wall time: 37.5 ms
```

```
topic2patents = topic2patents.reset_index().merge(
    df.pubs_publication_number.reset_index(),
    on='index').drop('index', axis=1)
```

```
topic2patents = pd.DataFrame(topic2patents['topics'].tolist(), index=topic2patents['pubs_publication_number']).\
    stack().\
    reset_index().\
    drop('level_1', axis=1)

topic2patents.columns = ['pubs_publication_number', 'Topic Tuple']
```

```
%%time topic2patents[['Topic','Probability']] = topic2patents['Topic Tuple'].apply(pd.Series)
```

```
Wall time: 121 ms
```

FIGURE 66C

```
topic2patents.head(3)
```

| | pubs_publication_number | Topic Tuple | Topic | Probability |
|---|---|---|---|---|
| 0 | US20130305142A1 | (4, 0.0133673457823) | 4.0 | 0.013367 |
| 1 | US20130305142A1 | (0, 0.0135025210515) | 0.0 | 0.013503 |
| 2 | US20130305142A1 | (2, 0.0135649305078) | 2.0 | 0.013565 |

```
topic2patents.to_clipboard()
```

Pivot Topics

```
pivot = topic2patents.pivot_table(index='Topic', values='Publication Number', aggfunc='count').reset_index()
```

```
topics = [(x, [x[0] for x in lda_model.show_topic(x)]) for x in range(NUMBER_OF_TOPICS)]
```

```
pivot['Topic Terms'] = pivot['Topic'].apply(lambda x: topics[int(x)])
```

```
pivot
```

| | Topic | Topic Terms |
|---|---|---|
| 0 | 0.0 | (0, [COMPUTER, CAUSE, VIEW, PERFORMANCE, CLIEN... |
| 1 | 1.0 | (1, [VIRTUAL, DATA, SPACE, MULTI, ENVIRONMENT,... |
| 2 | 2.0 | (2, [VIRTUAL, DATA, WORLD, APPLY, COMPUTER, OP... |
| 3 | 3.0 | (3, [VIRTUAL, WORLD, THROUGH, SPACE, DETERMINE... |
| 4 | 4.0 | (4, [DISPLAY, DATA, VIRTUAL, OBJECT, IMAGE, SP... |

```
pivot.to_clipboard()
``` figure67.md

FIGURE 67 A

An example of using a set of keyword rules to extract sentances based on topic

```
import pandas as pd
import spacy
import warnings
import pandas as pd class Extractor:
    def __init__(self):
        self.nlp = spacy.load('en_core_web_sm')
        self.max_characters = 999999  # spacy can only deal with text less than 1m characters
        warnings.filterwarnings("ignore", message="numpy.dtype size changed")
        warnings.filterwarnings("ignore", message="numpy.ufunc size changed")

def extract_sentances_by_rules(self, row, text_col_index, unique_id_index, rules):

clean_text = self.clean_text(row[text_col_index])
        doc = self.nlp(clean_text)
        sentences = list(doc.sents)

results = []

for index, sentence in enumerate(sentences):
            for rule in rules:
                rule_results = rule.test_rule(sentence.text.upper())
                if rule.passed == True:
                    results.append({'doc_id': row[unique_id_index], 'doc_text': row[text_col_index],
                                    'identified_sentence': sentence.text, 'rule_name': rule.name,
                                    'rules_results': rule_results})

return results def extract_paragraphs_by_rules(self, row, text_col_index, unique_id_index, rules):
        clean_text = self.clean_text(row[text_col_index])
        doc = self.nlp(clean_text)
        paragraphs = list(doc.paragraphs)

results = []

for index, paragraph in enumerate(paragraphs):
            for rule in rules:
                rule_results = rule.test_rule(paragraph.text.upper())
                if rule.passed == True:
                    results.append({'doc_id': row[unique_id_index], 'doc_text': row[text_col_index],
                                    'identified_paragraph': paragraph.text, 'rule_name': rule.name,
                                    'rules_results': rule_results})

def identify_documents_by_rule(self, list_of_documents, row, text_col_index, unique_id_index, rules):

clean_documents = [self.clean_text(document) for document in list_of_documents]

results = []

for index, document in enumerate(clean_documents):
            for rule in rules:
```

FIGURE 67B

```
                rule_results = rule.test_rule(document.text.upper())
                if rule.passed == True:
                    results.append({'doc_id': row[unique_id_index], 'doc_text': row[text_col_index],
                                    'identified_document': document.text, 'rule_name': rule.name,
                                    'rules_results': rule_results})

def clean_text(self, text):
        """ Method for cleaning text based on specific case needs Parameters
        ----------
        text : str
            dirty text Returns
        -------
        clean text
        """
        return text def results_to_df(self, results):
        """

Parameters
        ----------
        results :
            a pandas series where each row is a list of dicts representing the rule passage results
        Returns
        -------
            a pandas dataframe with one row for each rule passage result
        """
        results_list = [item for sublist in list(results) for item in sublist]
        df_results = pd.DataFrame(results_list)
        return df_results class TopicRule:
    """The base Topic Rule class
    Attributes
    ----------
    name : the name of the rule
    passed : current state of the rule Methods
    -------
    test_rule(document)
        Tests the document for the given rule, switches `passed` flag to True if test was passed """
    def __init__(self):
        self.name = "GenericRule"
        self.passed = False def test_rule(self,document):
        """

Parameters
        ----------
        document: string
            document over which the test is to be run Notes
        -----
        Intended to be over written with a custom rule
        """
        raise Exception('Context rule has not been defined')
```

FIGURE 67C

```
class KeywordRule(TopicRule):
    """A Topic rule to test if one or more keywords is in text Attributes
    ----------
    name : the name of the rule
    passed : current state of the rule """
    def __init__(self,keywords):
        TopicRule.__init__(self)
        self.name = "KeywordRule"
        self.keywords = [word.upper() for word in keywords]

def test_rule(self, document):
        """Tests whether a document contains one or more of the provided keywords.

Parameters
        ----------
        document : str
            document over which the test is to be run
        Returns
        -------
        the identified keywords as a semicolon delimited string
        """
        self.passed = False
        identified_words_in_document = []
        for keyword in self.keywords:
            if keyword in document:
                self.passed = True
                identified_words_in_document.append(keyword)

return ";".join(identified_words_in_document)

An example of using a set of keyword rules to extract sentances based on topic if __name__ == '__main__':
    #  generate a dataframe of documents
    df_docs = pd.DataFrame([['1','I prefer to get a plate of fruit at a hotel breakfast.'],
                            ['2','A Moscow Mule is typically served in a copper mug with a slice of lime.'],
                            ['3','Broccoli is a good source of calcium and iron. Diet Coke is only good for sodium.'],
                            ['4','Pineapples typically grow in tropical regions whereas apples grow in cold regions.']
                           columns=['doc_id','doc_text'])

provide lists of desired keywords
    fruit_keywords = ['apples', 'oranges', 'pears', 'pineapples','lime']
    metals_keywords = ['steel','copper','iron','zinc','sodium']
    vegetables_keywords = ['broccoli', 'carrots', 'celery']

instantiate a few keyword rules
    fruits_keyword_rule = KeywordRule(keywords=fruit_keywords)
    vegetables_keyword_rule = KeywordRule(keywords=vegetables_keywords)
    metals_keyword_rule = KeywordRule(keywords=metals_keywords)

optionally rename each rule instances
    fruits_keyword_rule.name = 'FruitsKeyWord'
    vegetables_keyword_rule.name = 'VegetablesKeyWord'
    metals_keyword_rule.name = 'MetalsKeyWord' create list of all rules to be tested
    rules = [fruits_keyword_rule, vegetables_keyword_rule, metals_keyword_rule]

ex = Extractor()
```

FIGURE 67D

```
results = df_docs.apply(lambda row: ex.extract_sentances_by_rules(row=row,
                                                                  text_col_index=1,
                                                                  unique_id_index=0,
                                                                  rules=rules), axis=1)
df_results = ex.results_to_df(results)
df_results.to_csv('example_test_results.csv')
``` figure68.md

FIGURE 68

Example output of key word based topic extraction

| row | doc_id | identified_sentence | rule_name | rules_results |
|---|---|---|---|---|
| 0 | 2 | A Moscow Mule is typically served in a copper mug with a slice of lime. | FruitsKeyWord | LIME |
| 1 | 2 | A Moscow Mule is typically served in a copper mug with a slice of lime. | MetalsKeyWord | COPPER |
| 2 | 3 | Broccoli is a good source of calcium and iron. | VegetablesKeyWord | BROCCOLI |
| 3 | 3 | Broccoli is a good source of calcium and iron. | MetalsKeyWord | IRON |
| 4 | 3 | Diet Coke is only good for sodium. | MetalsKeyWord | SODIUM |
| 5 | 4 | Pineapples typically grow in tropical regions whereas apples grow in cold regions. | FruitsKeyWord | APPLES;PINEAPPLES | figure69.md

FIGURE 69 A

Neo4J Patent Network Builder

```
from neo4j.v1 import GraphDatabase
import pandas as pd
```

Read in patents records

```
records = pd.read_csv(
    'derwent.zip',
    index_col=False,
    skiprows=1,
    encoding='utf-8',
    low_memory=False)
```

Read in and merge clean names

```
clean_names = pd.read_excel('clean-names.xlsx')
```

```
records.shape
```

```
(8584, 39)
```

```
records = records.merge(
    clean_names,
    on='Publication Number',
    how='left',
    validate='one_to_one'
)
```

```
records['Topmost Resolved Assignee'].fillna('unknown', inplace=True)
```

```
records.shape
```

```
(8584, 40)
```

Load to Nodes to neo4j

FIGURE 69B

```
with driver.session() as session:
    with session.begin_transaction() as tx:
        for i, row in records.iterrows():
            tx.run(f"""CREATE (
                n:patent {{
                pub_number: '{row['Publication Number']}',
                assignee: '{row['Topmost Resolved Assignee']}',
                status: '{row['Dead/Alive']}'
                }})""")
```

```
records.shape
```

```
(8584, 40)
```

Create edge list

```
def split_to_rows(frame, column, delimiter=None, strip=True, save=None):
    """Splits values in given column to rows.

Rows with NaN in given column to split will be dropped.

Parameters
    ----------
        frame : pandas DataFrame
        column : string
            Name of column to split
        delimiter : string
            String or regular express to split on (Default is None,
            implies values are already list-like)
        strip : bool
            Strips leading and trailing whitespace from new column
            values (Default is True)
        save : list of strings
            Names of additional columns to include in new DataFrame Returns
    -------
    pandas DataFrame
        xxx """
    new_frame = frame[column].dropna()
    if delimiter:
        new_frame = new_frame.str.split(delimiter, expand=True)
    else:
        new_frame = new_frame.apply(pd.Series)
    new_frame = new_frame.stack().dropna()
    new_frame.index = new_frame.index.droplevel(-1)
    if strip:
        new_frame = new_frame.str.strip()
    new_frame = new_frame.to_frame()
    new_frame.columns = [column]
    if save:
        if isinstance(save, str):
            raise ValueError('Save must be list-like, not a string.')
        new_frame = new_frame.reset_index()
        new_frame = new_frame.merge(frame[save].reset_index(), on='index', how='left')
        new_frame = new_frame.drop('index', axis=1)
    return new_frame
```

FIGURE 69C

```
edges = split_to_rows(records, 'Citing Patents', '|', save=['Publication Number'])
```

```
edges.head()
```

| | Citing Patents | Publication Number |
|---|---|---|
| 0 | CN100534379C | US4836670A |
| 1 | CN101872237B | US4836670A |
| 2 | CN102824160A | US4836670A |
| 3 | CN102824160B | US4836670A |
| 4 | CN104271031A | US4836670A |

Create edges

```
with driver.session() as session:
    with session.begin_transaction() as tx:
        for i, row in edges.iterrows():
            tx.run(f"""
            MATCH (a:patent),(b:patent)
            WHERE a.pub_number = '{row['Citing Patents']}' AND b.pub_number = '{row['Publication Number']}'
            CREATE (a)-[r:RELTYPE {{ name: a.pub_number + '->' + b.pub_number }}]->(b)
            """)
```

75 primarily industry-agnostic variables were tested for their predictive value Opportunity to bring in more industry specific variables in future efforts

| Patents | Scientific literature | Funding | Financial | Founders | Other | Media |
|---|---|---|---|---|---|---|
| Count | Count | Amounts | R&D spend | Experience | Employee count | Volume |
| Growth spikes | Growth spikes | Stages | Revenue | Relationships | Products in clinical trial | Media spikes |
| Quality | Quality | Timeline | Profit | Collaboration networks | Sub-technology ranking | Sentiment over time |
| Citation patterns | Collaboration networks | | | | | |
| Productization | Impact score | | | | | |

Industry specific

FIG. 72A

Independent variables (1/5)

| | | Variable | Source | Feature importance | Imputed[1] |
|---|---|---|---|---|---|
| Intellectual Property Data Trends | Quantity | # of patents | Derwent Innovation | | |
| | | Avg. # of patents per year | Derwent Innovation | | |
| | | # of patents per R&D spend | Derwent Innovation | | Yes |
| | | # of patents per years from founding | Derwent Innovation | | |
| | | # of patents at founding year | Derwent Innovation | | |
| | Growth | CAGR of patent filings for the last 3 years | Derwent Innovation | | |
| | | # of patent filings growth spikes > 30% | Derwent Innovation | | |
| | BCG Quality Index | Average BCG Quality Index | Derwent Innovation | | |
| | | Average Top 10% BCG Quality Index | Derwent Innovation | | |
| | | Median BCG Quality Index | Derwent Innovation | | |
| | | Maximum BCG Quality Index | Derwent Innovation | | |
| | Patent networks (Citation Patterns) | In_Degree | Derwent Innovation | | |
| | | Out_Degree | Derwent Innovation | | |
| | | Eigenvector | Derwent Innovation | | |
| | | Between-ness | Derwent Innovation | | |
| | | Closeness | Derwent Innovation | | |
| | | Harmonic | Derwent Innovation | | |
| | | Clustering (low scores should rank well) | Derwent Innovation | | |
| | | Self_references | Derwent Innovation | | |

1. More than 30% of data is imputed
Source: BCG Center for Innovation Analytics

FIG. 72B

Independent variables (2/5)

| | | Variable | Source | Feature importance | Imputed[1] |
|---|---|---|---|---|---|
| Intellectual Property Data Trends | Forward citations | Average count of adjusted forward citations | Derwent Innovation | | |
| | Backward citations | Average count of backward citations patent | Derwent Innovation | | |
| | | Average count of backward citations non-patent | Derwent Innovation | | |
| | Freshness | Freshness for last 3 years | Derwent Innovation | | |
| | Novelty | Novelty for last 3 years | Derwent Innovation | | |
| | Univ. co-assignment | Ratio of patents having university co-assignments | Derwent Innovation | | |
| | Inventor count | Average number of inventors per patent | Derwent Innovation | | |
| | Granted patents | Ratio of granted patents | Derwent Innovation | | |
| | Remaining life | Average remaining life of patents | Derwent Innovation | | |
| | Family size | Average family size | Derwent Innovation | | |
| | Product correlation | % of patents in orange book | Derwent Innovation | | |
| | CPC First Occurrence | # of patents having new CPC codes in the last 3 years | Derwent Innovation | | |
| Scientific Literature Data Trends | Quantity | # of publications | Web of Science | | |
| | | Average # published per year | Web of Science | | |
| | | # of publications per R&D spend | Web of Science | | Yes |
| | | # of publications per years from founding | Web of Science | | |
| | | # of publications at founding year | Web of Science | | |
| | Growth | CAGR of scientific publications for last 3 years | Web of Science | | |
| | | # of growth spikes > 30% since 2006 | Web of Science | | |

1. More than 30% of data is imputed
Source: BCG Center for Innovation Analytics

FIG. 72C

Independent variables (3/5)

| | | Variable | Source | Feature importance | Imputed[1] |
|---|---|---|---|---|---|
| Scientific Literature Data Trends | Freshness | Freshness for last 3 years | Web of Science | | |
| | Forward Citations | H-Index | Web of Science | | |
| | | Average # of adjusted citations | Web of Science | | |
| | Backward Citations | Average # of cited references | Web of Science | | |
| | External Funding | (# non empty funding text) / (total # of publications) | Web of Science | | |
| | Collaboration Networks | Number of collaborating institutions | Web of Science | | |
| | | Number of collaborating authors | Web of Science | | |
| | Journal Impact | Journal Impact Score | SJR (Scopus) | | |
| Funding Data Trends | ($) Funding | # of funding amounts | Capital IQ | | |
| | (#) Funding | # of funding rounds | Capital IQ | | |
| | Cancelled PI | No Cancelled PI Event | Capital IQ | | |
| | Deviation b/w PI | Deviation between last two PI rounds > 2 years | Capital IQ | | |
| | Acceleration Rate | Rate at which time decreases between PI rounds | Capital IQ | | Yes |
| | (#) Investors | # of investors | Capital IQ | | |
| | Investor Stage | Investor Stage | Capital IQ | | |
| | ($) Growth | Growth of funding values between rounds | Capital IQ | | |
| | Smart Investors | Count of times a "smart investor" has invested | Forbes Midas List | | |
| | Large first funding | $ of Angel, Seed or Series A being > Median(Dataset) | Capital IQ | | |

1. More than 30% of data is imputed
Source: BCG Center for Innovation Analytics

FIG. 72D

Independent variables (4/5)

| | | Variable | Source | Feature importance | Imputed[1] |
|---|---|---|---|---|---|
| Financial Data Trends | Latest Revenue | Latest available operating revenue normalised by number of years since founding | Capital IQ | | |
| | Growth | CAGR of revenue for the last 3 years | Capital IQ | | Yes |
| | | CAGR of gross profit for the last 3 years | Capital IQ | | Yes |
| Founder Data Trends | Quantity | # of patents | Derwent Innovation | | |
| | | # of publications | Derwent Innovation | | |
| | H-Index | H-Index | Web of Science | | |
| | Collaboration Networks | Number of collaborating institutions | Web of Science | | |
| | | Number of collaborating authors | Web of Science | | |
| | Founder Experience | Number of times founder has experience as founder | Capital IQ | | |
| Other Non-Conventional Data Trends | Employee data | No of employees in the latest available year normalised by the number of years since founding | Capital IQ | | |
| | | CAGR of number of employees for the last 3 years | Capital IQ | | Yes |
| | Phase of clinical trial | No of products in clinical trials | Capital IQ | | |
| | | No of products registered, launched or approved | Capital IQ | | |
| | Rank of sub-technology | Rank of sub-technology by $ of investment | Quid | | |
| | | Rank of sub-technology by # of investment | Quid | | |

1. More than 30% of data is imputed
Source: BCG Center for Innovation Analytics

FIG. 72E

Independent variables (5/5)

| | Variable | Source | Feature importance | Imputed[1] |
|---|---|---|---|---|
| Media mentions | | | | |
| | | | | |
| | | | | |
| | | | | |
| | | | | |
| | | | | |
| | | | | |
| | | | | |

FIG. 72F

<u>Measurement Year is the year from which we will be predicting the success.</u>

<u>Pre-requisite data files that need to be converted at the measurement year</u>
1. Patent Records Collated Data File
2. Patent Families Collated Data File
3. Scientific Literature Collated Data File
4. Scientific Literature Collated Data File-Hindex
5. Quid Raw Data File of 100 M&A Targets <u>Logic steps for conversion of Patent Records Collated Data File at measurement year</u>
Step1: Delete all patent records whose Application Year > Measurement Year (Not doing by publication year, as for those enteries who were filed before measurement year, and published after measurement year, will anyways complete the 18month gap data before measurement year)
Step2: Save as, the step 1 file with remaining values as "Patent Records Collated Data File - converted at Measurement Year"
Step3: Below is the list of columns that needs to be modified for "Patent Records Collated Data File - converted at Measurement Year"
(This list of colums only encounters those that will be needed for independent metric calculations)
1. Citing Patents
2. Count of Citing Patents
3. DWPI Family Members
Step4: Pull all the forward citations of the remaining patent records from Thomson Innovation, having publication year > Measurement Year, name the file as "Forward citations after measurement year"
---- (The analyst will have to perform this step manually. Collect all the citing patent column values. Count 60k |, divide into batches. Replace | by space per batch. Run in publication number search.
Then apply sub-search for publication year > measurement year. This condition will limit the forwrad cites data to a manageable number.)
Step5: For every remaining patent record in "Patent Records Collated Data File - converted at Measurement Year",
delimit the | separated citing patents column into temp file
Apply vlookup of temp file with Publication Number Column of "Forward citations after measurement year" file
Delete the matched enteries in the temp file
re-parse the temp file remaining values into pipe separated value, and overwrite in the "Citing Patents" column
Step6: Count the pipe separated values of the modified "Citing Patents" column of "Patent Records Collated Data File - converted at Measurement Year", and overwrite the number under "Count of Citing Patents"
Step7: Pull all the DWPI Family Members of the remaining patent records from Thomson Innovation, having publication year > Measurement Year, name the file as "DWPI Family members after measurement year"
Step8: For every patent record in "Patent Records Collated Data File - converted at Measurement Year",
delimit the | separated DWPI Family Members column into temp file
Apply vlookup of temp file with Publication Number Column of "DWPI Family Members after measurement year" file
Delete the matched enteries in the temp file
re-parse the temp file remaining values into pipe separated value, and overwrite in the "DWPI Family Members" column <u>Logic steps for conversion of Patent Families Collated Data File at measurement year</u>
Step1: Dedupe the file "Patent Records Collated Data File - converted at Measurement Year" using DWPI Accession Number, sorted by BCG Quality Index Largest to Smallest <u>Logic steps for conversion of Scientific Literature Collated Data File</u>
Step1: Delete all publications whose Publication Year > Measurement Year
Step2: Save the file as "Scientific Literature Collated Data File - converted at Measurement Year"

<u>Logic steps for conversion of Scientific Literature Collated Data File-Hindex</u>
Step1: Delete all publications whose Publication Year > Measurement Year
Step2: Delete all the years (total citations) which are > Measurement Year
Step2: Save the file as "Scientific Literature Collated Data File Hindex- converted at Measurement Year"

<u>Logic steps for conversion of Quid Raw Data File of 100 M&A Targets</u>
Step 1: Delete all enteries having Column F (Founding Year) value > Measurement Year

FIG. 73A

| S.No | Data Files | Quantity | Filetype | Worksheets | Whom to provide | Additional fields apart from default | Additional Comments | Detailed instructions for data file creation |
|---|---|---|---|---|---|---|---|---|
| 1 | Quid Raw Data File of 100 M&A Targets | 1 | .xlsx | Quid Raw Data - Discovery | Innovation Analytics | | Columns F, L, Q are used from this file for independent variables calculation | |
| 2 | Raw data files for 100 M&A Targets | 91 | .xlsx | Financial Data - Valuescience / Financial Data - Orbis / Financial Data - Factiva<br>Factiva<br>Funding Data<br>Patent Records (company)<br>Patent Families (company)<br>Patent Records (founder)<br>Patent Families (company)<br>Scientific Literature (company)<br>H-index (company)<br>Scientific Literature (founder)<br>H-index (founder) | Innovation Analytics | | Only 91 files are provided, as the rest of 9 are dropped due to unavailability of financial data | |
| 3 | Capital IQ Data Files of 100 M&A Targets | 74 | .xlsx | Key Stats<br>Income Statement<br>Balance Sheet<br>Cash Flow<br>Multiples<br>Historical Capitalization<br>Capital Structure Summary<br>Capital Structure Details<br>Ratios<br>Supplemental<br>Industry Specific<br>Pension OPEB<br>Segments | Innovation Analytics | | | |
| 4 | Instructions for Financial data integration_v3 | 1 | .xlsx | Data to be picked from<br>Financial Metrics & Mapping<br>Procedural Steps | Innovation Analytics | | | |
| 5 | Patent Records Collated Data File | 1 | .xlsx | | Innovation Analytics | Exclusive Bucket<br>BCG Quality Index<br><br>Remaining life of patent<br>US Patent Numbers without country code & kind code | | |
| 6 | Patent Families Collated Data File | 1 | .xlsx | | Innovation Analytics | Exclusive Bucket<br>Count of adjusted forward citations by application year<br>BCG Quality Index<br><br>Count of adjusted external forward citations by application year<br>Family size<br>Co-assignment with universities (Yes/No) | Patent Families are obtained by deduping patent records, with the highest quality family member being the family representative. | Refer detailed patent metric sheet |
| 7 | Company Level Patent Data - IA | 1 | .xlsx | | Innovation Analytics | | This file will contain all the company level metrics for patent data calculated through Innovation Analytics scripts | |
| 8 | Company Level Patent Data - Gamma | 1 | | | Gamma | | This file name is used as a reference in the detailed calculation sheets, where after the gamma scripts are run, the independent variable values will be stored. | |

FIG. 73B

| S.No | Data Files | Quantity | Filetype | Worksheets | Whom to provide | Additional fields apart from default | Additional Comments | Detailed instructions for data file creation |
|---|---|---|---|---|---|---|---|---|
| 9 | Scientific Literature Collated Data File | 1 | .xlsx | | Gamma | Rank of Journal (highest - most impactful) | To be created by gamma | Literature Collated Data File.xlsx file with column headers as of Any M&A Target raw data file.Worksheet"Sci. Lit. Data (company)"<br>Step2: Add column, Exclusive Bucket<br>Step 3: For every M&A Target (Sample: Company 2_Alder Biopharmaceuticals).<br>{<br>Add Worksheet"Sci. Lit. Data (company)" enteries to Scientific Literature Collated Data File.xlsx file<br>Add Worksheet"Sci. Lit. Data (founder)" enteries to Scientific Literature Collated Data File.xlsx file<br>Remove duplicates on the basis of column "UT"<br>}<br>Assign value to exclusive bucket column using bucketing function:<br>If a publictaion belongs to a company only, then |
| 10 | Scientific Literature Collated Data File-Hindex | 1 | .xlsx | | Gamma | Count of adjusted forward citations by publication year | To be created by gamma | data of the scientific literature data of compnay / founder Hindex. No need to collate that data.<br><br>Step 1: Create Scientific Literature Collated Data File Hindex.xlsx file with column headers as of Any M&A Target raw data file.Worksheet"Sci. Lit. Data (company) Hindex"<br>Step2: Add column, Exclusive Bucket<br>Step 3: For every M&A Target (Sample: Company 2_Alder Biopharmaceuticals),<br>{<br>Add Worksheet"Sci. Lit. Data (company) Hindex" enteries to Scientific Literature Collated Data File Hindex.xlsx file<br>Add Worksheet"Sci. Lit. Data (founder) Hindex" enteries to Scientific Literature Collated Data File Hindex.xlsx file |
| 11 | Rank of Journals | 1 | .xlsx | Impactful Journals | Innovation Analytics | | This file is used for Metric Number - 41 of the Independent Variables | |
| 12 | Company Level Patent Data - SNA (AANmetics_YEAR.csv) | 3 | .csv | | SNA | | This file name is used as a reference, where after the SNA scripts are run, the independent variable values will be stored. | One file for each measurement year |
| 13 | Collaboration Networks - Sci. Lit. | 1 | .txt | | Gamma | | | Detailed instrutcions on sheet, Collaboration Networks |
| 13b | Collaboration Networks - Sci Lit | 1 (3 worksheets) (ERROR PRONE DATA) - needs to be calucated from vna files or data split into small sets | .xlsx | | Innovation Analytics | | Exported output from WOK Navigator loaded from R13 | One tab for each measurement year. Detailed instructions on sheet, Collaboration Networks Step 7 |
| 14 | Prerequisite File 14_Quid raw data - investor event report | 1 | .xlsx | | Innovation Analytics | | | |

FIG. 73B Continued

Step 1: Create tab delimited txt files from each worksheet where scientific literare is stored in Company xlsx files and add two new columns of data (tabs are called Sci. Lit. Data ...)

a) one new column should be called "Company", for each row of data insert the respective company name or founder for which the file is related to (eg. Zymogenetics, or Zymogenetics-F for founder)

b) second new column called "CoAuthor Type", for each row of data concatenate "CoAuthor: ", (article identifier (column header is UT) found in column BI)

Step 2: Either merge into one txt file or keep as separate files and send to IA team Step 3: IA team loads data into WOK Navigator using Wizard and input tgnp file "Literature test-Company.tgnp"

Step 4: IA team resolves Affiliation and Authors using "Conservative Autoresolve"

Step 5: IA team spends ~1h using suggest groups to further clean Affiliation data (may be too time consuming to go to completion)

Step 6: IA team loads the network and exports the data to Excel

Step 7: Gamma - collect data for Affiliation Collaboration and Author Collaboration from following locations ("Company" tab of above noted export)

a) Rows will show Company or Company-F (founder data)

b) Author Collaboration = Column titled "Author-Company CoAuthor Co-occurrence #"

c) Affiliation Collaboration = Column titled "Affiliation-Company CoAuthor Co-occurrence #"-1

FIG. 73C

Dependent Variable Metrics Calculation

Metric 1 : Is current NPV of > $1 bn at measurement year?
Definition: This metric reflects the historic valuation of an enterprise.

Input Data Files
Integrated financial data by Gamma Team

Logic Steps for Gamma Script

Metric 2 : Positive Revenue at measurement year

Input Data Files
Integrated financial data by Gamma Team

Logic Steps for Gamma Script
Step1: If Present Year = Measurement Year, then Measurement Year = Meausrment Year - 1, as the data will be unavaiable for full year
Step2: For every company,
If Total revenue for measuremnt year > 0, then Positive Revenue at measurement year = Yes, else No

Metric 3 : Positive Revenue Growth at measurement year

Input Data Files
Integrated financial data by Gamma Team

Logic Steps for Gamma Script
Step1: If Present Year = Measurement Year, then Measurement Year = Meausrment Year - 1, as the data will be unavaiable for full year
Step2: For every company,
If (Growth over prior year - total revenue for Measurment Year) > 0, then Positive Revenue Growth at measurement year = Yes, else No

Metric 4 : Positive cash flow Growth at measurement year

Input Data Files
Integrated financial data by Gamma Team

Logic Steps for Gamma Script
Step1: If Present Year = Measurement Year, then Measurement Year = Meausrment Year - 1, as the data will be unavaiable for full year
Step2: For every company,
If (Growth over prior year - Cash from Ops. for Measurment Year) > 0, then Positive cash flow Growth at measurement year = Yes, else No

Metric 5 : Positive Gross Profit at measurement year

Input Data Files
Integrated financial data by Gamma Team

Logic Steps for Gamma Script
Step1: If Present Year = Measurement Year, then Measurement Year = Meausrment Year - 1, as the data will be unavaiable for full year
Step2: For every company,
If Gross Profit for measuremnt year > 0, then Positive Gross Profit at measurement year = Yes, else No

Metric 6 : Positive Gross Profit Growth at measurement year

Input Data Files
Integrated financial data by Gamma Team

Logic Steps for Gamma Script
Step1: If Present Year = Measurement Year, then Measurement Year = Meausrment Year - 1, as the data will be unavaiable for full year
Step2: For every company,
If (Growth over prior year - Gross Profit for Measurment Year) > 0, then Positive Gross Profit Growth at measurement year = Yes, else No

Metric 7 : Acquired between start of funding data pull and measurement year

Input Data Files
Integrated funding data by Gamma Team

Logic Steps for Gamma Script
Step1: For every company,
If ( for any funding event uptill measurement year = "merger & acquisition") , then Acquired between start of funding data pull and measurement year = Yes, else No

Metric 8 : Is Market capital>1Bn at measurement year?

Input Data Files
Integrated financial data by Gamma Team

Logic Steps for Gamma Script
Step1: If Present Year = Measurement Year, then Measurement Year = Meausrment Year - 1, as the data will be unavaiable for full year
Step2: For every company,
If Market Capitalisation for measuremnt year > = 1Bn, then success = Yes, else No

Basket of success measures used to create binary dependent variable

| | | | | | | |
|---|---|---|---|---|---|---|
| Priority[1]: | 1 | 2 | 3 (2016 Revenue) | | | 4 |
| | Failed | Acquired | < $1M | $1M - 10M | > $10M | Relative TSR |
| Successful | NA | All | NA | Rev CAGR >= 20% | Rev CAGR >=10% | > 0 |
| Not-successful | All | NA | All | Rev CAGR < 20% | Rev CAGR < 10% | <= 0 |

Metric 47 : Latest Available Financial Year Operating Revenue
Definition: Latest Available Financial Year Operating Revenue / ((No of years since founding) * (Measurement Year – Latest Available Financial Year + 1))

Input Data Files
Capital IQ Raw Data Files
Raw Data Files of 100 M&A Targets
Quid raw data file of 100 M&A Targets Logic Steps for Gamma Script
Step 1: No of years since founding = Measurement year - column F (founding year) of Quid raw data file of 100 M&A Targets
Step 2: For every M&A target raw data file (Sample: Company 2_Alder Biopharmaceuticals),
Integrate the financial data from Sample: Company 2_Alder Biopharmaceuticals_Raw Data_All Lenses_170526.xlsx AND Capital IQ Alder Biopharmaceuticals Inc NasdaqGM ALDR Financials.xls
Latest Available Year = Measurement Year if available, else latest year available just less than measurement year
Latest Available Financial Year Operating Revenue = Total revenue of the latest available financial year (Total Revenue - Capital IQ / Operating revenue (Turnover) - Orbis / Sales - Factiva)

Calculate, Latest Available Financial Year Operating Revenue / ((No of years since founding year) * (Measurement Year – Latest Available Year + 1))
Store in Company Level Patent Data file - Gamma

Metric 48 : CAGR of revenue over the past 3 years from measurement year

Input Data Files
Capital IQ Raw Data Files
Raw Data Files of 100 M&A Targets
Quid raw data file of 100 M&A Targets Logic Steps for Gamma Script
Step 1: Founding Year = column F (founding year) of Quid raw data file of 100 M&A Targets
Step 2: IF (Founding Year < (Measurement-3)), then TIME PERIOD = (Measurement Year-3) TO Measurement Year, else TIME PERIOD = (Founding Year) TO MEASUREMENT YEAR
Step 3: For every M&A target raw data file (Sample: Company 2_Alder Biopharmaceuticals),
Integrate the financial data from Sample: Company 2_Alder Biopharmaceuticals_Raw Data_All Lenses_170526.xlsx AND Capital IQ Alder Biopharmaceuticals Inc NasdaqGM ALDR Financials.xls
Calculate CAGR of revenue over TIME PERIOD from Field Name "Total revenue" (Total Revenue - Capital IQ / Operating revenue (Turnover) - Orbis / Sales - Factiva)
Store in Company Level Patent Data file - Gamma

Metric 49 : CAGR of Gross Profit over the past 3 years from measurement year

Input Data Files
Capital IQ Raw Data Files
Raw Data Files of 100 M&A Targets
Quid raw data file of 100 M&A Targets Logic Steps for Gamma Script
Step 1: Founding Year = column F (founding year) of Quid raw data file of 100 M&A Targets
Step 2: IF (Founding Year < (Measurement-3)), then TIME PERIOD = (Measurement Year-3) TO Measurement Year, else TIME PERIOD = (Founding Year) TO MEASUREMENT YEAR
Step 3: For every M&A target raw data file (Sample: Company 2_Alder Biopharmaceuticals),
Integrate the financial data from Sample: Company 2_Alder Biopharmaceuticals_Raw Data_All Lenses_170526.xlsx AND Capital IQ Alder Biopharmaceuticals Inc NasdaqGM ALDR Financials.xls
Calculate CAGR of gross profit over TIME PERIOD from Field Name "Gross Profit" (Gross Profit - Capital IQ / Gross Profit - Orbis )
Store in Company Level Patent Data file - Gamma

FIG. 74A

Metric 50 : # of patents
Definition: This metric is the count of unique patents filed by a company's inventor(s) / founder uptill measurement year. This metric is a company level metric, and is absolute in its calculation.

Input Data Files
Patent Families Collated Data File (This file needs to be converted uptill measurment year)

Logic Steps for Gamma Script
Step 1: For every M&A Target (Sample: Company 2_Alder Biopharmaceuticals) founder patents in Patent Families Collated Data File.
# of patents = (# of enteries for Company 2_Alder Biopharmaceuticals founder uptill measurement year)
Store # of patents for founder data metrics in Company Level Patent Data file - Gamma

Metric 51 : # of publications
Definition: This metric is the count of publications published by a company's inventor(s) / founder uptill measurment year. This metric is a company level metric, and is absolute in its calculation.

Input Data Files
Scientific Literature Collated Data File (This file needs to be converted uptill measurment year)

Logic Steps for Gamma Script
Step 1: For every M&A target (Sample: Alder Biopharmaceuticals) founder publications in Scientific Literature Collated Data File
# of publications = (# of publications Alder Biopharmaceuticals-founder uptill measuremenr year)
Store # of publications for founder data metrics in Company Level Patent Data file - Gamma

Metric 52 : H-Index
The h-index count that is based on the list of publications ranked in descending order by the Times Cited count uptill measurement year. Sum of the Times Cited/ # of publications Input Data Files
Scientific Literature Collated Data File Hindex (This file needs to be converted uptill measurment year)

Logic Steps for Gamma Script
Step 1: For every M&A target (Sample: Alder Biopharmaceuticals) founder publications in Scientific Literature Collated Data File Hindex
Calculate the sum of times cited (add up all values from 2006 uptill measurement year)
Calculate sum of times cited / # of publications - founder metrics from Company Level Patent Data - Gamma
Store H-Index founder data metrics in the Company Level Patent Data - Gamma Help Note: To calculate number of publications published for a company's founder, a filter may be applied on the Exclusive Bucket column of Scientific Literature Collated Data Hindex File which has Alder Biopharmaceuticals-founder

FIG. 74B

Funding data metrics

Metric 42 : # of funding amounts
Definition: This metric is the total sum of funding amounts the company has received since measurement year Input Data Files
Raw Data Files of 100 M&A Targets Logic Steps for Gamma Script
Step 1: For every M&A target,
# of funding amounts = (Sum of "Size($mm)" for Transaction Type =(Private Placement OR Merger/Acquisition), Role = target / seller uptill measurement year) Union (Sum of "Size($mm)" for all Primary Transaction Types for public offerings uptill measurement year)
Store # of funding amounts in Company Level Patent Data file - Gamma

Metric 43 : # of funding rounds
Definition: This metric is the total number of funding rounds the company has received since measurement year Input Data Files
Raw Data Files of 100 M&A Targets Logic Steps for Gamma Script
Step 1: For every M&A target raw data file (Sample: Company 2_Alder Biopharmaceuticals_Raw Data_All Lenses_170526.xlsx),
# of funding rounds = (No. of enteries for Transaction Type =(Private Placement OR Merger/Acquisition), Role = target / seller uptill measurement year) Union (No. of enteries for all Primary Transaction Types for public offerings uptill measurement year)
Store # of funding rounds in Company Level Patent Data file - Gamma

Metric 44: Deviation between funding rounds
Definition: Not received funding: don't include in analysis for this metric. Funding cycle typically 18 months +- 6 months. Only look at companies with more than one round of funding, look at most recent funding events. If time between is less than two years, gets positive rating (+1). Otherwise '0'

Step 1: Merge & sort the funding events at the Closed Date OR registration effective as below:
Transaction ID , Closed Date, Transaction Type (Private Placement, Merger/Acquisition), Size ($mm) for Role = Target OR Seller
Union
Transaction ID, Registration Effective, Primary Transaction feature (IPO), Size ($mm)

Step 2: Not received funding: don't include in analysis for this metric. Funding cycle typically 18 months +- 6 months.
Only look at companies with more than one round of funding, look at most recent funding events. If time (Closed Date OR Registration Effective) between is less than two years, gets positive rating (+1). Otherwise '0'

Metric 45 : # of investors
Definition: This metric is the total number of investors invested in a company.

Input Data Files
Prerequisite File 14_Quid raw data - investor event report

Logic Steps for Gamma Script
Step 1: For every M&A target (Sample: Company 2_Alder Biopharmaceuticals),
# of investors = (No. of unique investors separated by ; for Transaction Type =(Private Placement OR Merger/Acquisition), Role = target / seller uptill measurement year)
Store # of investors in Company Level Patent Data file - Gamma

FIG. 74C

Patenting activity metrics

Metric 1 : # of patents
Definition: This metric is the total count of unique patents filed by a company or its associated inventor(s) / founder uptill measurement year. This metric is a company level metric, and is absolute in its calculation.

Input Data Files
Patent Families Collated Data File (this data file will be updated with data only uptill measurement year)

Logic Steps for IA- Python Script
Step 1: For every M&A Target (Sample: Company 2_Alder Biopharmaceuticals) patents in Patent Families Collated Data File,
  # of patents = (# of enteries for Company 2_Alder Biopharmaceuticals) Union (# of enteries for Company 2_Alder Biopharmaceuticals founder), with application year from 1995 uptill measurement year
  Store # of patents in Company Level Patent Data file - IA

Metric 2 : # of patents per R&D spend
Definition: This metric is the count of unique patents filed by a company or its associated inventor(s) / founder (uptill measurement year) divided by the total $ of R&D spent by the company. This metric is a company level metric, and is normalised by the total $ R&D spend of a company.

Input Data Files
Raw data files of 100 M&A Targets
Company Level Patent Data - IA Logic Steps for Gamma Script
Step 1: For every M&A target raw data file (Sample: Company 2_Alder Biopharmaceuticals_Raw Data_All Lenses_170526.xlsx),
  create variable "Total R&D spend of Company 2_Alder Biopharmaceuticals"
  Integrate the financial data from Sample: Company 2_Alder Biopharmaceuticals_Raw Data_All Lenses_170526.xlsx AND Capital IQ Alder Biopharmaceuticals Inc NasdaqGM ALDR Financials.xls
  Total R&D spend of Company 2_Alder Biopharmaceuticals = Summation of all values of all years uptil Measurement Year of R & D Exp. + Supplemental Operating Expense Items - R&D Exp.

Step 2: For every M&A target,
  # of patents per R&D spend = ( # of patents from Company Level Patent Data IA for Company 2_Alder Biopharmaceuticals)/ (Total R&D spend of Company 2_Alder Biopharmaceuticals)
  Store, # of patents per R&D spend in Company Level Patent Data - Gamma file

Metric 3 : Quantity - # of patents per years from founding
Definition: This metric is the count of unique patents filed by a company or its associated inventor(s) / founder (uptil measurement year) divided by the number of years the company was founded. This metric is a company level metric, and is normalised by the number of years the company was founded.

Input Data Files
Company Level Patent Data - IA
Quid raw data of 100 M&A Targets (this data file will be updated with data only uptill measurement year)

Logic Steps for Gamma Script
Step 1: For every M&A Target (Sample: Company 2_Alder Biopharmaceuticals),
  Create variable, No. of years since founded
  No. of years since founded = (Measurement Year - Founding year (Column F of Quid raw data of 100 M&A Targets file))
  # of patents per years from founding = (# of patents from Company Level Patent Data for Company 2_Alder Biopharmaceuticals)/ (No. of years since founded)
  Store, # of patents per years from founding in Company Level Patent Data - Gamma file

Metric 4 : # of patents at founding year
Definition: This metric is the count of unique patents filed by a company or its associated inventor(s) / founder at the founding year of a company. This metric is a company level metric.

Input Data Files
Patent Families Collated Data File (this data file will be updated with data only uptill measurement year)
Quid raw data of 100 M&A Targets (this data file will be updated with data only uptill measurement year)

Logic Steps for Gamma Script
Step 1: For every M&A Target (Sample: Company 2_Alder Biopharmaceuticals),
  Create and read variable founding year = Column F of Quid raw data of 100 M&A Targets for Company 2_Alder Biopharmaceuticals
  # of patents at founding year = # of patents where application year = founding year, exclusive bucket = (Alder Biopharmaceuticals OR Alder Biopharmaceuticals - founder OR both)
  Store, # of patents at founding year in Company Level Patent Data - Gamma file

Metric 5 : Growth (time bounded) - CAGR last 3 years from Measurement Year
Definition: This metric is the compounded annual growth rate of the patent filing by company or its founder for the past 3 years from Measurement year. This metric is a company level metric, and is absolute in its calculation.
  Patent Data is incomplete for the last 18 months. Hence, if Measurement Year = Present Year, then CAGR to be calculated from (Measurement Year - 5) upto (measurement year -2), elseif Measurement Year = Present Year-1, then CAGR to be calculated from (Measurement Year - 4) upto (measurement year - 1), else CAGR to be calculated from (Measurement Year - 3) upto (Measurement Year)

Input Data Files
Patent Families Collated Data File (this data file will be updated with data only uptill measurement year)
Quid raw data of 100 M&A Targets (this data file will be updated with data only uptill measurement year)

Logic Steps for IA- Python Script
Step 1: Create variable Time Period
Step1: IF (Measurement Year = Present Year), then CAGR to be calculated for TIME PERIOD = (Measurement Year - 5) TO (Measurement year - 2)
  ELSE IF Measurement Year = Present Year-1, then CAGR to be calculated for TIME PERIOD = (Measurement Year - 4) TO (MEASUREMENT YEAR - 1)
  ELSE CAGR to be calculated for TIME PERIOD = (Measurement Year - 3) TO Measurement Year Step2: For every M&A Target (Sample: Company 2_Alder Biopharmaceuticals),
  Create Variable, Founding Year
  Read file, Quid raw data of 100 M&A Targets
  Founding Year = Column F of Quid raw data of 100 M&A Targets for Company 2_Alder Biopharmaceuticals IF ( Founding Year < Lower(Time Period))
    Calculate CAGR of patents filed by company or founder for Time Period
  ELSE
    Calculate CAGR of patents filed by company or founder from founding year-Upper Bound(Time Period)

Store Growth (time bounded) - CAGR in Company Level Patent Data - IA file

Metric 6 : Growth (time bounded) - # of growth spikes > 30% since 1995 uptill Measurement Year
Definition: This metric is the total count of patent filing spikes (growth of > 30 %) over previous year. This metric is a company level metric, and is absolute in its calculation.

Input Data Files
Patent Families Collated Data File (this data file will be updated with data only uptill measurement year)

Logic Steps for Gamma Script
Step1: For every M&A Target (Sample: Company 2_Alder Biopharmaceuticals),
  Create variable, # of growth spikes > 30%
  Calculate YoY growth for the number of patents filed by a company or its founders since the application year uptill Measurement Year
  # of growth spikes > 30% = number of times the YoY is (> = 30%)
  Store # of growth spikes > 30% in Company Level Patent Data - Gamma file Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both

Metric 7 : Average BCG Quality Index
Definition: This metric is the average BCG Quality Index for a company's patent portfolio. A company's patent portfolio consists of patents filed in its name or patents filed by its inventors/founders.

Input Data Files
Patent Families Collated Data File (this data file will be updated with data only uptill measurement year)

Logic Steps for IA - Python Script
Step1: For every M&A Target (Sample: Company 2_Alder Biopharmaceuticals)
  Calculate Average BCG Quality Index for a companys' patent portfolio

FIG. 74D

Store Average BCG Quality Index in the Company Level Patent Data - IA

Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both

Metric 8 : Average Top 10% BCG Quality Index
Definition: This metric is the average BCG Quality index for a company's top 10% patent portfolio based on bcg quality index. A company's patent portfolio consists of patents filed in its name or patents filed by its inventors/founders Input Data Files
Patent Families Collated Data File (this data file will be updated with data only uptill measurement year)

Logic Steps for IA - Python Script
Step1: For every M&A Target (Sample: Company 2_Alder Biopharmaceuticals),
    Sort the patents with BCG Quality Index Largest - Smallest
    Select Top 10 % of the patents
    Calculate Average BCG Quality Index for the top 10% patents
    Store Average Top 10% BCG Quality Index in the Company Level Patent Data - IA Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both

Metric 9 : Median BCG Quality Index
Definition: This metric is the Median BCG Quality Index for a company's patent portfolio based on bcg quality index. A company's patent portfolio consists of patents filed in its name or patents filed by its inventors/founders.

Input Data Files
Patent Families Collated Data File (this data file will be updated with data only uptill measurement year)

Logic Steps for IA - Python Script
Step1: For every M&A Target (Sample: Company 2_Alder Biopharmaceuticals),
    Sort the patents with BCG Quality Index Largest - Smallest
    Calculate median BCG Quality Index
    Store median BCG Quality Index in the Company Level Patent Data - IA Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both

Metric 10 : Maximum BCG Quality Index
Definition: This metric is the maximum BCG Quality index out of the company's patent portfolio. A company's patent portfolio consists of patents filed in its name or patents filed by its inventors/founders.

Input Data Files
Patent Families Collated Data File (this data file will be updated with data only uptill measurement year)

Logic Steps for IA - Python Script
Step1: For every M&A Target (Sample: Company 2_Alder Biopharmaceuticals),
    Sort the patents with BCG Quality Index Largest - Smallest
    Maximum BCG Quality Index = value of the BCG Quality Index for first patent entry
    Store Maximum BCG Quality Index in the Company Level Patent Data - IA Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both

Metric 11 : Average count of adjusted forward citations by application year
Definition: This metric is the average count of adjusted forward citations by application year of a company's patent portfolio. A company's patent portfolio consists of patents filed in its name or patents filed by its inventors/founders.

Input Data Files
Patent Families Collated Data File (this data file will be updated with data only uptill measurement year)

Logic Steps for IA - Python Script
Step1: For every M&A Target (Sample: Company 2_Alder Biopharmaceuticals),
    Average count of adjusted forward citations by application year = average (count of adjusted forward citations by application year)
    Store Average count of adjusted forward citations by application year in the Company Level Patent Data - IA Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both Help note to calculate count of adjusted forward citations by application year at patent data level
Step1: For every patent, divide count of citing patents by (Measurement year - application year)
OR
Step1: Run Editor - Adjusted forward citations - linear on Patent Families Collated Data File

Metric 12 : Average count of adjusted external forward citations by application year
Definition: This metric is the average count of adjusted external forward citations by application year of a company's patent portfolio. A company's patent portfolio consists of patents filed in its name or patents filed by its inventors/founders.

Input Data Files
Patent Families Collated Data File (this data file will be updated with data only uptill measurement year)

Logic Steps for IA - Python Script
Step1: For every M&A Target (Sample: Company 2_Alder Biopharmaceuticals),
    Average count of adjusted external forward citations by application year = average (count of adjusted external forward citations by application year)
    Store Average count of adjusted external forward citations by application year in the Company Level Patent Data - IA Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both Help note to calculate adjusted external forward citations by application year at patent data level
Step1: For every patent,
    delimit citing patent 1st Assignee column
    Resolve the delimited data (with the table of subsidiaries of the target company)
    count of external forward citations of a patent = # of enteries with non-target company names (step 2)
    adjusted external forward citations by application year = count of external forward citations of a patent / (Measurement Year - Application year)

Metric 13 : Average count of backward citations patent
Definition: This metric is the average count of backward citations of a company's patent portfolio. A company's patent portfolio consists of patents filed in its name or patents filed by its inventors/founders.

Input Data Files
Patent Families Collated Data File (this data file will be updated with data only uptill measurement year)

Logic Steps for IA - Python Script
Step1: For every M&A Target (Sample: Company 2_Alder Biopharmaceuticals)
    Average count of backward citations patent = average (count of cited - patents)
    Store Average count of backward citations patent in the Company Level Patent Data - IA Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both

Metric 14 : Leading edge
Definition: This metric is the average count of backward citations non-patent of a company's patent portfolio. A company's patent portfolio consists of patents filed in its name or patents filed by its inventors/founders Input Data Files
Patent Families Collated Data File (this data file will be updated with data only uptill measurement year)

Logic Steps for IA - Python Script
Step1: For every M&A Target (Sample: Company 2_Alder Biopharmaceuticals),
    Leading edge = average (count of backward citations non-patent)

FIG. 74E

Input Data Files
Patent Families Collated Data File (this data file will be updated with data only uptil measurement year)
Quid raw data of 100 M&A Targets (this data file will be updated with data only uptil measurement year)

Logic Steps for IA – Python Script
Step1: For every M&A Target (Sample, Company 2_Alder Biopharmaceuticals)
Create variable freshness year
If (Measurement Year = Present Year), then Freshness Year = (Measurement Year - 4)
ELSEIF Measurement Year = Present Year-1, then Freshness Year = (Measurement Year - 3)
ELSE Freshness Year = (Measurement Year - 2)

If (freshness year > founding year (column F) of Quid raw data of 100 M&A Targets file)
Freshness = (Sum of # of patents filed on or after Freshness Year) / (Total Sum of # of patents filed)
ELSE
Freshness = 100%
Store Freshness in the Company Level Patent Data - IA Help Note: To calculate number of patents filed for a company or its founder, a filter may be applied on the Exclusive Bucket column of Patent Families Collated Data File which have either Alder Biopharmaceuticals company OR Alder Biopharmaceuticals founder OR both.

Metric 16 : Novelty for 3 years prior to measurment year
Definition: This metric defines % of IPC codes which are only appearing after a certain year and not present previously as a share of total IPC codes. This is a company level metric and is absolute in its calculation.

Input Data Files
Patent Families Collated Data File (this data file will be updated with data only uptil measurement year)
Quid raw data of 100 M&A Targets (this data file will be updated with data only uptil measurement year)

Logic Steps for IA – Python Script
Step1: For every M&A Target (Sample, Company 2_Alder Biopharmaceuticals) patents in Patent Families Collated Data File,
Create variable Novelty year
If (Measurement Year = Present Year), then Novelty Year = (Measurement Year - 4)
ELSEIF Measurement Year = Present Year-1, then Novelty Year = (Measurement Year - 3)
ELSE Novelty Year = (Measurement Year - 2)

If (Novelty year > founding year (column F) of Quid raw data of 100 M&A Targets file)
Novelty = (Sum of # of patents having unique IPC after Novelty Year) / (Total Sum of # of patents filed)
ELSE
Novelty = 100%
Store Novelty in the Company Level Patent Data - IA Help Note:
1. To calculate number of patents filed for a company or its founder, a filter may be applied on the Exclusive Bucket column of Patent Families Collated Data File which have either Alder Biopharmaceuticals company OR Alder Biopharmaceuticals founder OR both
2. Define the patent data of a company by IPC-Current Column
3. Filter out patents that had unique IPC not filed for before the novelty year

Metric 20 : Average remaining life of patents
Definition: This metric defines the average remaining life remaining of patents for a company's portfolio (company & founder).

Input Data Files
Patent Records Collated Data File (this data file will be updated with data only uptil measurement year)

Logic Steps for IA – Python Script
Step1: For every M&A Target (Sample: Company 2_Alder Biopharmaceuticals) patents in Patent Record Collated Data File,
Step 1. Filter out cells containing E (Expired) OR W (Withdrawn) from US Maintenance Code field
Step 2. Filter out cells containing (expire, cease) from INPADOC Legal Status field
Step 3. Calculate tentative expiry date using the formula: =DATE(YEAR(B3)+N,MONTH(B4),DAY(B3)-1); where N is the number of years that will vary as below
1. Add 20 years to APPLICATION DATE for the US patents filed after June 8, 1995
2. Add 17 years to PUBLICATION DATE for US patents filed before June 8, 1995
Step 4. Calculate Remaining Life of patent = (Expiry Date - Measurement Date)

Deduce the record data to family by DWPI Accession Number, and largest to smallest remaining life
Calculate the average remaining life of patents for a company
Store in Company Level Patent Data - IA Help Note: To calculate number of patents filed for a company or its founder, a filter may be applied on the Exclusive Bucket column of Patent Families Collated Data File which have either Alder Biopharmaceuticals company OR Alder Biopharmaceuticals founder OR both

Metric 21 : Average Family size
Definition: This metric defines the average family size of a company's patent portfolio. Absolute calculation.

Input Data Files
Patent Families Collated Data File (this data file will be updated with data only uptil measurement year)

Logic Steps for IA – Python Script
Step1: For every M&A Target (Sample, Company 2_Alder Biopharmaceuticals) patents in Patent Families Collated Data File,
Calculate the average of family size
Store in Company Level Patent Data - IA Help Note: To calculate number of patents filed for a company or its founder, a filter may be applied on the Exclusive Bucket column of Patent Families Collated Data File which have either Alder Biopharmaceuticals company OR Alder Biopharmaceuticals founder OR both.

At patent level for Patent Families Collated Data File:
Step 1: calculate the family size of each patent as number of ; in DWPI Family Members column + 1

Metric 22 : Ratio ((# of patents having co-assignments) / (Total # of patents))
Definition: This metric defines the ratio of co-assignment patents developed by a company/founder with schools/universities.

Input Data Files
Patent Families Collated Data File (this data file will be updated with data only uptil measurement year)
Company Level Patent Data - IA Logic Steps for IA – Python Script
Step1: For every M&A Target (Sample: Company 2_Alder Biopharmaceuticals) patents in Patent Families Collated Data File,
a = Sum the number of "Yes" for the "Co-assignment with universities (Yes/No)" Column
Calculate b = a / # of patents of company2_Alder Biopharmaceuticals
Store b in Company Level Patent Data - IA Help Note: To calculate number of patents filed for a company or its founder, a filter may be applied on the Exclusive Bucket column of Patent Families Collated Data File which have either Alder Biopharmaceuticals company OR Alder Biopharmaceuticals founder OR both At patent-level for Patent Families Collated Data File:
Step 0: For every patent,
If (Assignee related fields have (univ, university, school, college, research AND institute, res & dev, res centre, technology AND institute))
then, Co-assignment with universities (Yes/No) = Yes

FIG. 74F

ELSE
Co-assignment with universities (Yes/No) = No

Help Note: Assignee related fields of Patent Families Collated Data File are Assignee - Standardized, Assignee - Original w/address, Assignee Code - DWPI

Metric 23 : (# of granted patents/ # of pending applications)
Definition: This metric defines the ratio of granted versus pending applications Input Data Files
Patent Records Collated Data File Logic Steps for Gamma script
Step 1: For every M&A Target (Sample: Company 2_Alder Biopharmaceuticals) patents in Patent Records Collated Data File,
Dedupe the data on the basis of DWPI Accession Number, second level on the basis of granted
Calculate (# of unique granted patents/ # of unique pending applications)
Store in Company Level Patent Data - Gamma Help Note: To calculate number of patents filed for a company or its founder, a filter may be applied on the Exclusive Bucket column of Patent Families Collated Data File which have either Alder Biopharmaceuticals-company OR Alder Biopharmaceuticals-founder OR both

Metric 24 : # of patents having new CPC codes in the last 5 years from Measurement Year
Definition: This metric is the count of patents of a company or its founder, with new CPC codes appearing after cut-off year Input Data Files
Patent Families Collated Data File (this data file will be updated with data only until measurement year)

Logic Steps for Gamma Script
Step 1: Create variable cut-off year
Step 2: IF (Measurement Year = Present Year), then Cut-off Year = (Measurement Year - 4)
ELSEIF Measurement Year < Present Year-3, then Cut-off Year = (Measurement Year - 3)
ELSE Cut-off Year = (Measurement Year - 2)
Step 3: Insert new column "New CPC Code (Yes/No)" in Patent Families Collated Data File.
Step 3: Filter all the data of file, Patent Families Collated Data, by Application Year Column having values less than Cut-off Year
Step 4: Copy Column Values of "CPC - Current" in a new worksheet
Step 5: Delimit the pipe separated values of Step 4
Step 6: Remove Duplicates.
Step 7: Save all the deduped delimited CPC-Current values for Master lookup
Step 8: Filter all the data of file, Patent Families Collated Data, by Application Year Column having values = or > Cut-off Year
Step 9: For each patent, Compare all the pipe separated values of Column "CPC - Current" with the Master lookup Column of the new worksheet. If no match for any of the pipe separated values in Master Lookup, then New CPC Code = Yes else New CPC Code = No
Step 10: For every M&A Target (Sample: Company 2_Alder Biopharmaceuticals) patents in Patent Families Collated Data File,
Calculate # of patents having new CPC codes = Sum of Yes in "New CPC Code (Yes/No)" column
Store in Company Level Patent Data - Gamma Help Note: To calculate number of patents filed for a target/company or its founder, a filter may be applied on the Exclusive Bucket column of Patent Families Collated Data File which have either Alder Biopharmaceuticals-company OR Alder Biopharmaceuticals-founder OR both

Metric 25 : # of unique patents in orange book
Definition: This metric is the count of patents of a company or its founder, found in orange book. Orange book relates to the patents being productised. The search interface of orange book allows to search for US patents by patent numbers without country code and kind code.

Input Data Files
Patent Records Collated Data File (this data file will be updated with data only until measurement year)

Logic Steps for Gamma Script
Step 1: For every M&A Target (Sample: Company 2_Alder Biopharmaceuticals) patents in Patent Records Collated Data File,
For each non-empty entry of column US Patent Numbers without country code & kind code
Run orange book search portal: https://www.accessdata.fda.gov/scripts/cder/ob/
[illegible]
if (search successful)
then flag = 1

Sort the data on the basis of DWPI Accession Number, and Level 2 as Flag = 1
Dedupe the data
# of unique patents for a company in orange book = (# of enteries with flag = 1)

Help Note: To calculate number of patents filed for a target/company or its founder, a filter may be applied on the Exclusive Bucket column of Patent Records Collated Data File which have either Alder Biopharmaceuticals-company OR Alder Biopharmaceuticals-founder OR both

Metric 25: # of unique patents in orange book

From the Orange Book portal, I have downloaded the dump of the patent database (Orange Book Patent Database.txt / Orange Book Patent Database.xls),
which lists all the patents against products having exclusivity in the drug market. Below are the steps that will need to be conducted for calculating Metric 25

Step 1: Sanitize the Orange Book Patent Database.xls. Dig out the Patent Number as the first 7 digits starting the 3rd
Step 2: Apply a VLOOKUP in the Patent Records Collated Data File column "US Patent Numbers without country code & kind code" with step 1 derived orange book patent number
Step 3: For every company, the # of entries found in orange book is Metric 25

Metric 25.1: Average or median number of inventors per patent
Definition: This metric is the average number of inventors per patent for a company Input Data Files
Patent Families Collated Data File (this data file will be updated with data only until measurement year)

Logic Steps for IA Script

FIG. 74G

Metric 26 : # of publications
Definition: This metric is the count of publications published by a company or its associated inventor(s) / founder uptill measurement year. This metric is a company level metric, and is absolute in its calculation.

Input Data Files
Scientific Literature Collated Data File (This file needs to be converted uptill measurement year)

Logic Steps for Gamma Script
Step 1: For every M&A target (Sample: Alder Biopharmaceuticals OR Alder Biopharmaceuticals-founder OR Both ),
# of publications = (# of publications for Alder Biopharmaceuticals OR Alder Biopharmaceuticals-founder OR Both)
Store # of publications in Company Level Patent Data file - Gamma

Metric 27 : # of publications per R&D spend
Definition: This metric is the count of unique publications published by a company or its associated inventor(s) / founder (uptill measuremnt year) divided by the total $ of R&D spent by the company. This metric is a company level metric, and is normalised by the total $ R&D spend of a company.

Input Data Files
Raw data files of 100 M&A Targets
Company Level Patent Data - Gamma Logic Steps for Gamma Script
Step 1: For every M&A target (Sample: Company 2_Alder Biopharmaceuticals),
create variable "Total R&D spend of Company 2_Alder Biopharmaceuticals"
Integrate the financial data from Sample: Company 2_Alder Biopharmaceuticals_Raw Data_All Lenses_170526.xlsx AND Capital IQ Alder Biopharmaceuticals Inc NasdaqGM ALDR Financials.xls
Total R&D spend of Company 2_Alder Biopharmaceuticals = Summation of all values of all years uptill Measurement Year of R & D Exp. + Supplemental Operating Expense Items - R&D Exp.

Step 2: For every M&A target raw data file (Sample: Company 2_Alder Biopharmaceuticals_Raw Data_All Lenses_170526.xlsx),
# of publications per R&D spend = (# of publications from Company Level Patent Data-Gamma for Company 2_Alder Biopharmaceuticals)/ (Total R&D spend of Company 2_Alder Biopharmaceuticals)
Store, # of publications per R&D spend in Company Level Patent Data - Gamma file

Metric 28 : Quantity - # of publications per years from founding
Definition: This metric is the count of unique publications published by a company or its associated inventor(s) / founder (uptill measurement year) divided by the number of years the company was founded. This metric is a company level metric, and is normalised by the number of years the company was founded.

Input Data Files
Company Level Patent Data - Gamma
Quid raw data of 100 M&A Targets (This file needs to be converted uptill measurement year)

Logic Steps for Gamma Script
Step 1: For every M&A target (Sample: Alder Biopharmaceuticals OR Alder Biopharmaceuticals-founder OR Both ),
Create variable, No. of years since founded
No. of years since founded = (Measurement Year - Founding year (Column F of Quid raw data of 100 M&A Targets file))
# of publications per years from founding = ( # of publications from Company Level Patent Data - Gamma for Company 2_Alder Biopharmaceuticals)/ (No. of years since founded)
Store, # of publications per years from founding in Company Level Patent Data - Gamma file

Metric 29 : # of publications at founding year
Definition: This metric is the count of unique publications published by a company or its associated inventor(s) / founder at the founding year of a company. This metric is a company level metric.

Input Data Files
Scientific Literature Collated Data File (This file needs to be converted uptill measurement year)
Quid raw data of 100 M&A Targets (This file needs to be converted uptill measurement year)

Logic Steps for Gamma Script
Step 1: For every M&A target (Sample: Alder Biopharmaceuticals OR Alder Biopharmaceuticals-founder OR Both ),
Create and read variable founding year = Column F of Quid raw data of 100 M&A Targets for Company 2_Alder Biopharmaceuticals
# of publications at founding year = # of publications where publication year (PY) = founding year, Exclusive Bucket = Alder Biopharmaceuticals OR Alder Biopharmaceuticals-founder OR Both
Store, # of publications at founding year in Company Level Patent Data - Gamma file

Metric 30 : Growth (time bounded) - CAGR last 3 years from Measurement Year
Definition: This metric is the compunded annual growth rate of the publications published by company or its founder for the past 3 years from the measurement year. This metric is a company level metric, and is absolute in its calculation.

Time Period of CAGR = Last 3 years from Measurement Year

Input Data Files
Scientific Literature Collated Data File (This file needs to be converted uptill measurement year)
Quid raw data of 100 M&A Targets (This file needs to be converted uptill measurement year)

Logic Steps for Gamma Script
Step 1: For every M&A target (Sample: Alder Biopharmaceuticals OR Alder Biopharmaceuticals-founder OR Both ),
Create Variable, Founding Year
Read file, Quid raw data of 100 M&A Targets

FIG. 74H

Logic Steps for Gamma Script
Step 1: For every M&A target (Sample: Alder Biopharmaceuticals OR Alder Biopharmaceuticals-founder OR Both ),
Create Variable, # of growth spikes > 30%
Calculate YoY growth for the number of publications published by a company or its founders since 2006
# of growth spikes > 30% = number of times the YoY is (> = 30%)
Store # of growth spikes > 30% in Company Level Patent Data - Gamma file Help Note: To calculate number of sci. lit. published for a company or its founder, a filter may be applied OR Alder Biopharmaceuticals-founder OR both Time Period of Freshness = Last 3 years from Measurement Year Input Data Files
Scientific Literature Collated Data File (This file needs to be converted uptill measurement year)
Quid raw data of 100 M&A Targets (This file needs to be converted uptill measurement year)

Logic Steps for Gamma Script
Step 1: For every M&A target (Sample: Alder Biopharmaceuticals OR Alder Biopharmaceuticals-founder OR Both ), Freshness = 100%
Store Freshness in the Company Level Patent Data - Gamma Help Note: To calculate number of publications published for a company or its founder, a filter may be applied on the Exclusive Bucket column of Scientific Literature Collated Data File which have either Alder Biopharmaceuticals-company OR Alder Biopharmaceuticals-founder OR both

Metric 33 : H-Index
The h-index count that is based on the list of publications ranked in descending order by the Times Cited count. Sum of the Times Cited/ # of publications Input Data Files
Scientific Literature Collated Data File Hindex (This file needs to be converted uptill measurement year)

Logic Steps for Gamma Script
Step 1: For every M&A target (Sample: Alder Biopharmaceuticals OR Alder Biopharmaceuticals-founder OR Both ),
Calculate the sum of times cited (add up all values from 2006 uptill measurement year)
Calculate sum of times cited / # of publications from Company Level Patent Data - Gamma
Store in the Company Level Patent Data - Gamma Help Note: To calculate number of publications published for a company or its founder, a filter may be applied on the Exclusive Bucket column of Scientific Literature Collated Data Hindex File which have either Alder Biopharmaceuticals-company OR Alder Biopharmaceuticals-founder OR both

Metric 34 : Average # of adjusted citations
Definition: This metric is the average count of adjusted forward citations by publication year of a company's scientific literature portfolio. A company's scientific literature portfolio consists of publications published in its name or by its inventors/founders.

Input Data Files
Scientific Literature Collated Data File Hindex (This file needs to be converted uptill measurement year)

FIG. 74I

Help Note: To calculate number of publications published for a company or its founder, a filter may be applied on the Exclusive Bucket column of Scientific Literature Collated Data File which have either Alder Biopharmaceuticals-company OR Alder Biopharmaceuticals-founder OR both Help note to calculate count of adjusted forward citations by publication year at scientific data level (Scientific Literature Collated Data File Hindex)
Step1: For every publication, divide Total Citations by (Measurement year - publication year)
Store as count of adjusted forward citations by publication year

Metric 37 : Leading edge
Definition: This metric is the average count of backward citations of a company's sci lit portfolio. A company's sci. lit. portfolio consists of publications published in its name or by its inventors/founders.

Input Data Files
Scientific Literature Collated Data File (This file needs to be converted uptill measurement year)

Logic Steps for Gamma Script
Step 1: For every M&A target (Sample: Alder Biopharmaceuticals OR Alder Biopharmaceuticals-founder OR Both ),
Leading edge = average (count of Number of Cited References (NR))
Store Leading edge in the Company Level Patent Data - Gamma Help Note: To calculate number of publications published for a company or its founder, a filter may be applied on the Exclusive Bucket column of Scientific Literature Collated Data File which have either Alder Biopharmaceuticals-company OR Alder Biopharmaceuticals-founder OR both

Metric 38: (# non empty funding text) / (total # of publications)
Definition: This metric keeps into acocunt the number of projects/publications of a company/founder got externally funded.

Input Data Files
Scientific Literature Collated Data File (This file needs to be converted uptill measurement year)
Company Level Patent Data - Gamma Logic Steps for Gamma Script
Step 1: For every M&A target (Sample: Alder Biopharmaceuticals OR Alder Biopharmaceuticals-founder OR Both ),
Create variable # of non-empty funding text
# of non-empty funding text = No. of times FX is non-blank
Calculate # of non-empty funding text / # of publications from Company Level Patent Data - Gamma
Store in the Company Level Patent Data - Gamma Help Note: To calculate number of publications published for a company or its founder, a filter may be applied on the Exclusive Bucket column of Scientific Literature Collated Data File which have either Alder Biopharmaceuticals-company OR Alder Biopharmaceuticals-founder OR both

Metric 41: # of publications in high impact journals / # of publications
Definition: This metric keeps into acocunt the number of publications published in high impact journals Input Data Files
Scientific Literature Collated Data File (This file needs to be converted uptill measurement year)

Logic Steps for Gamma Script
Step 1: For every M&A target (Sample: Alder Biopharmaceuticals OR Alder Biopharmaceuticals-founder OR Both ),
Calculate Journal Score = sum of Highest Rank - Most Impactful
Store in the Company Level Patent Data - Gamma Help Note: To calculate number of publications published for a company or its founder, a filter may be applied on the Exclusive Bucket column of Scientific Literature Collated Data File which have either Alder Biopharmaceuticals-company OR Alder Biopharmaceuticals-founder OR both

FIG. 74J

Other data metrics

**Metric 55 : No of employees in the latest available year / ((No of years since founding year) * (Measurement Year – Latest Available Year + 1))**
Definition: This is normalised strength of employees in the lastest available year Input Data Files
Raw Data Files of 100 M&A Targets
Quid raw data file of 100 M&A Targets (This file needs to be converted uptill measurment year)

Logic Steps for Gamma Script
Step 1: No of years since founding = Measurement year - column F (founding year) of Quid raw data file of 100 M&A Targets
Step 2: For every M&A target (Sample: Company 2_Alder Biopharmaceuticals),
Integrate the financial data from Sample: Company 2_Alder Biopharmaceuticals_Raw Data_All Lenses_170526.xlsx AND Capital IQ Alder Biopharmaceuticals Financials.xls
Latest Available Year = Measurement Year if available, else latest year available less than measurement year
No of employees in the latest available year = Total Employees (Valuescience) of Latest Available Year / Number of employees (Orbis) of Latest Available Year/ Employees (Factiva) of Latest Available Year Calculate, No of employees in the latest available year / ((No of years since founding year) * (Measurement Year – Latest Available Year + 1))
Store in Company Level Patent Data file - Gamma

Metric 56 : CAGR of employee data for the last 3 years from the Measurement Year
Definition: This is CAGR of employees in the last 3 years from the measurement year.

Input Data Files
Raw Data Files of 100 M&A Targets

Logic Steps for Gamma Script
Step 1: For every M&A target (Sample: Company 2_Alder Biopharmaceuticals),
Integrate the financial data from Sample: Company 2_Alder Biopharmaceuticals_Raw Data_All Lenses_170526.xlsx AND Capital IQ Alder Biopharmaceuticals Financials.xls
Calculate CAGR of Total Employees FIELD from Measurement Year -3 uptill Measurement Year / Founding Year uptill Measurment Year if founding year > measurement -3
Store in Company Level Patent Data file - Gamma

Metric 57 : No of products in clinical trials uptill measurement year
Definition: This is the count of products of a company which are in clinical trials and are most likely to enter the market Input Data Files
Capital IQ Raw Data Files of 100 M&A Targets Logic Steps for Gamma Script
Step 1: For every M&A target Capital IQ Raw Data File,
In Worksheet "Industry Specific", calculate No of products in clinical trials uptill measurement year = Sum of (Number of Products in Discovery Research + Number of Products in Pre-Clinical Trials + Number of Products in Phase I + Number of Products in Phase II + Number of Products in Phase III) for all the years uptill measurement year
Store in Company Level Patent Data file - Gamma

Metric 58 : No of products registered, launched or approved uptill measurment year
Definition: This is the count of products of a company which are ready to be launched in the market Input Data Files
Capital IQ Raw Data Files of 100 M&A Targets Logic Steps for Gamma Script
Step 1: For every M&A target Capital IQ Raw Data File,
In Worksheet "Industry Specific", calculate No of products registered, launched or approved uptill measurment year = Sum of (Number of Products in Pre-Registration + Number of Products Approved During the Period + Number of Products Launched During the Period) for all the years uptill measurement year
Store in Company Level Patent Data file - Gamma

```
class Model(luigi.WrapperTask):
    def requires(self):
        yield PrepModelData()
        # yield TrainPOC2Model()
        yield TrainPOC2ModelAllData()

class PrepModelData(luigi.WrapperTask):
    def requires(self):
        yield PrepFullPOC2DataSet()
        yield SaveFeatureLabelsAsNpy()
        yield SaveFeatureLabelsAsDF()
        yield SaveTrainTestData()

class PrepFullPOC2DataSet(luigi.Task):
    def output(self):
        return luigi.LocalTarget(model_data_location + os.sep + "FullData-POC2-
v2.csv")

def requires(self):
        return [etl_IV_prep.ConsolidateIVs()]

def run(self):
        data_set = DataSet.POC2DateSet()
        data_set.save_full_to_file(model_data_location + os.sep + "FullData-POC2-
v2.csv")

class TrainPOC2Model(luigi.Task):
    def __init__(self):
        luigi.Task.__init__(self)
        self.model = PredictiveModel.POC2Model()

def output(self):
        return luigi.LocalTarget(ont.TRAINED_MODELS_LOCATION + os.sep + 'POC2-v2-
GradientBoostingClassifier.pkl')

def requires(self):
        return PrepModelData()

def run(self):
        X_train_path = ont.MODEL_DATA + os.sep + "X_train-POC2-v2.npy"
        Y_train_path = ont.MODEL_DATA + os.sep + "Y_train-POC2-v2.npy"
        self.model.fit_model(X_train_path=X_train_path,
Y_train_path=Y_train_path)
        self.model.save_model(
            save_model_name_path=ont.TRAINED_MODELS_LOCATION + os.sep + 'POC2-v2-
GradientBoostingClassifier.pkl')

class TrainPOC2ModelAllData(luigi.Task):
```

FIG. 75A (Continued)

```
    def __init__(self):
        luigi.Task.__init__(self)
        self.model = PredictiveModel.POC2Model()

def output(self):
        return luigi.LocalTarget(ont.TRAINED_MODELS_LOCATION + os.sep + 'POC2-v2-
GradientBoostingClassifier-all-data.pkl')

def requires(self):
        return [PrepModelData(),etl_DV_prep.AllDVPrep()]

def run(self):
        X_path = ont.MODEL_DATA + os.sep + "X-POC2-v2.npy"
        Y_path = ont.MODEL_DATA + os.sep + "Y-POC2-v2.npy"
        self.model.fit_model_all_data(X_path=X_path, Y_path=Y_path)
        self.model.save_model(
            save_model_name_path=ont.TRAINED_MODELS_LOCATION + os.sep + 'POC2-v2-
GradientBoostingClassifier-all-data.pkl')
```

FIG. 75B

```
import os
import warnings
from matplotlib import pyplot as plt
import pandas as pd
import numpy as np
import ontologies as ont
from sklearn.model_selection import train_test_split
from sklearn.externals import joblib
from sklearn.model_selection import cross_val_predict,cross_val_score
from sklearn.metrics import roc_curve, roc_auc_score, accuracy_score,
confusion_matrix
from sklearn.ensemble import GradientBoostingClassifier
from sklearn.ensemble.partial_dependence import plot_partial_dependence class Diagnostics:
    """Predictive Modeling Diagnostics Object.

This object comprises various methods required to assess the
predictive quality of the given model Attributes
            ----------
            related_model : str
                The standard_name of the PredictiveModel class it relates to.
Used to maintain provenance.
            version : str
                The version number of the PredictiveModel class it relates to.
Used to maintain provenance.
            model: PredictiveModel
                The PredictiveModel class for which this class is to perform
diagnostics

"""

def __init__(self):
        self.model_type = None class GradientBoostedClassifierDiagnostics(Diagnostics):
    def __init__(self):
        Diagnostics.__init__(self)
        self.model_type = 'GradientBoostedClassifier' def load_model(self, trained_model_path):
        gs = joblib.load(trained_model_path)
        # best_parameters = gs.best_params_
```

FIG. 75B (CONTINUE)

```
        # best_parameters_clean_names = {}
        # for k in best_parameters:
        #     best_parameters_clean_names[k[5:]] = best_parameters[k]
        #
        # if len(best_parameters) == 1:
        #     clf =
GradientBoostingClassifier(n_estimators=best_parameters_clean_names['n_estimators
'])
        # else:
        #     clf =
GradientBoostingClassifier(max_depth=best_parameters_clean_names['max_depth'],
        #
max_features=best_parameters_clean_names['max_features'],
        #
min_samples_leaf=best_parameters_clean_names[
        #
'min_samples_leaf'],
        #
n_estimators=best_parameters_clean_names['n_estimators'],
        #
random_state=ont.RND_STATE)

return gs def write_cross_validate_predict(self, trained_model_path, X_path, Y_path,
save_target):
        gs = joblib.load(trained_model_path)
        X = np.load(X_path)
        Y = np.load(Y_path)
        # gs = self.load_model(trained_model_path)
        y_probas = cross_val_predict(gs.best_estimator_, X, Y, cv=10,
method='predict_proba')
        np.save(save_target,y_probas)
        y_probas_df = pd.DataFrame(y_probas)
        y_probas_df.to_csv('test_y_probs.csv')

def write_scored_vs_reality(self,Y_path, Y_probs_path,full_data_path):
        Y = np.load(Y_path)
        Y_probs = np.load(Y_probs_path)
        Y_scores = Y_probs[:, 1]
        # print(Y_scores)

name = pd.read_csv(full_data_path, index_col=0)
        names = name['Company']
        # print(names)
        final = pd.DataFrame({'Company': names, 'confidence_score': Y_scores})

def write_accuracy_summary(self, Y_path, Y_probs_path):
```

FIG. 75B (CONTINUE)

```
        Y = np.load(Y_path)
        Y_probs = np.load(Y_probs_path)
        Y_scores = Y_probs[:, 1]

calc_predictions = np.vectorize(lambda x: 1 if x >= .5 else 0)
        Y_predictions = calc_predictions(Y_scores)

accuracy  = accuracy_score(y_true=Y , y_pred=Y_predictions)
        confusion_mat = confusion_matrix(y_true=Y, y_pred=Y_predictions)

auc_score = roc_auc_score(Y, Y_scores)

with open(ont.DIAGNOSTICS_RESULTS + os.sep + 'accuracy.txt', 'w') as
outfile:
            outfile.write(f'Accuracy: {accuracy}\n')
            outfile.write(f'Confusion Matrix: \n {confusion_mat}\n')
            outfile.write(f'Area of Curve: \n {auc_score}\n')

def write_accuracy_summary_all_data(self, trained_model_path, X_train_path,
X_test_path, Y_train_path, Y_test_path):
        X_train = np.load(X_train_path)
        X_test = np.load(X_test_path)
        Y_train = np.load(Y_train_path)
        Y_test = np.load(Y_test_path)
        gs = self.load_model(trained_model_path)
        # gs.fit(X_train,Y_train)
        y_pred_train = gs.predict(X_train)
        y_pred_train_df = pd.DataFrame(y_pred_train)
        y_pred_train_df.to_csv(ont.DIAGNOSTICS_RESULTS + os.sep +
'y_pred_train_df.csv')
        y_pred_prob_train = gs.predict_proba(X_train)
        y_pred_prob_train = pd.DataFrame(y_pred_prob_train)
        y_pred_prob_train.to_csv(ont.DIAGNOSTICS_RESULTS + os.sep +
'y_pred_prob_train.csv')

y_pred_log_prob = gs.predict_log_proba(X_train)
        y_pred_log_prob_df = pd.DataFrame(y_pred_log_prob)
        y_pred_log_prob_df.to_csv(ont.DIAGNOSTICS_RESULTS + os.sep +
'y_pred_log_prob_df.csv')

y_pred_test = gs.predict(X_test)

accu_train = accuracy_score(y_true=Y_train, y_pred=y_pred_train)
        accu_test = accuracy_score(y_true=Y_test, y_pred=y_pred_test)
```

FIG. 75B (CONTINUE)

```
        confusion_matrix_train = confusion_matrix(y_true=Y_train,
y_pred=y_pred_train)
        confusion_matrix_test = confusion_matrix(y_true=Y_test,
y_pred=y_pred_test)

auc_score_train = roc_auc_score(Y_train, y_pred_train)
        auc_score_test = roc_auc_score(Y_test, y_pred_test)

with open(ont.DIAGNOSTICS_RESULTS + os.sep + 'accuracy.txt', 'w') as
outfile:
            outfile.write(f'Accuracy(train): {accu_train}\n')
            outfile.write(f'Accuracy(test): {accu_test}\n')
            outfile.write(f'Confusion Matrix (train): \n
{confusion_matrix_train}\n')
            outfile.write(f'Confusion Matrix (test): \n
{confusion_matrix_test}\n')
            outfile.write(f'Area of Curve(train): \n {auc_score_train}\n')
            outfile.write(f'Area of Curve(test): \n {auc_score_test}\n')

def compare_importance_to_missing(self):
        pass def plot_roc(self, feature_labels_path, Y_path, Y_probs_path,
save_chart_path):
        label = np.load(feature_labels_path)
        Y = np.load(Y_path)
        Y_probs = np.load(Y_probs_path)
        Y_scores = Y_probs[:, 1]
        fpr, tpr, threshold = roc_curve(Y, Y_scores)

auc_score = roc_auc_score(Y, Y_scores )

plt.plot(fpr, tpr, linewidth=2, label=label)
        plt.title(f'AUC Score:{auc_score: 0.4f}')
        plt.plot([0, 1], [0, 1], 'k--')
        plt.axis([0, 1, 0, 1])
        plt.xlabel('False Positive Rate')
        plt.ylabel('True Positive Rate')
        # plt.legend(loc='lower right')
        plt.savefig(save_chart_path)
        plt.clf()
        plt.cla()
        plt.close()

def plot_lift(self, Y_path, Y_probs_path, save_chart_path):

Y = np.load(Y_path)

Y_probs = np.load(Y_probs_path)
```

FIG. 75B (CONTINUE)

```
        Y_scores = Y_probs[:, 1]

y_conc = np.stack([Y_scores, Y], axis=-1)
        y_conc = y_conc[np.lexsort(np.fliplr(y_conc).T)]

current_border = 0.1
        current_group = 0
        group_count = np.zeros(10)
        group_pos = np.zeros(10)

fh = open(ont.DIAGNOSTICS_RESULTS + os.sep + 'lift_' + 'all_data' +
'.txt', 'w')
        for i in range(y_conc.shape[0]):
            fh.write(str(y_conc[i][0]) + ';' + str(y_conc[i][1]) + os.linesep)
            if y_conc[i][0] >= current_border and current_border < 0.99:  # avoid
problems with rounding & conf == 1.0
                current_border += 0.1
                current_group += 1
            group_count[current_group] += 1
            if y_conc[i][1] == 1.:
                group_pos[current_group] += 1
        lift = np.zeros(11)
        for i in range(lift.shape[0] - 1):
            # print(group_count[i], group_pos[i])
            if group_count[i] > 0:
                lift[i] = group_pos[i] / group_count[i]
        ind = np.arange(11)  # the x locations for the groups
        width = 0.95  # the width of the bars
        plt.bar(ind + width / 2 + 0.01, lift, width)
        plt.xticks(ind, ['0.0', '0.1', '0.2', '0.3', '0.4', '0.5', '0.6', '0.7',
'0.8', '0.9', '1.0'])
        plt.xlabel('Groups')
        plt.ylabel('Success rate')
        plt.savefig(save_chart_path)
        # plt.show()
        plt.clf()
        plt.cla()
        plt.close()
        fh.close()

def calc_feature_importances(self,trained_model_path,feature_labels_path):

feature_labels = np.load(feature_labels_path)
        model = self.load_model(trained_model_path)
        print(type(model))
        importances =
model.best_estimator_.named_steps["clf"].feature_importances_
```

FIG. 75B (CONTINUE)

```
        # indices = np.argsort(importances)[::-1]
        # df_importances = np.vstack((feature_labels, importances))

df_importances =
pd.DataFrame({'feature_label':feature_labels,'importance':importances})
        df_importances.sort_values('importance',ascending=False,inplace=True)
        return df_importances def
plot_partial_dependences_charts(self,trained_model_path,feature_labels_path,X_pat
h,save_files_folder):
        X = np.load(X_path)
        feature_labels = np.load(feature_labels_path)
        model = self.load_model(trained_model_path)
        importances =
model.best_estimator_.named_steps["clf"].feature_importances_
        feat = []
        indices = np.argsort(importances)[::-1]
        fh = open('importances.txt', 'w')
        for f in range(len(importances)):
            if (f % 9) == 0 and f != 0:  # plot every 9 IVs
                fig, axs =
plot_partial_dependence(model.best_estimator_.named_steps["clf"], X, feat,
feature_names=feature_labels, n_jobs=3)
                fig.suptitle('Partial dependence for most important IVs')
                fig.set_size_inches(15, 10)
                plt.subplots_adjust(top=0.9)
                plt.savefig(save_files_folder + os.sep + 'partial_dependences' +
str(f - 8) + '.png')
                feat.clear()
            fh.write(str(feature_labels[indices[f]]) + ';' +
str(importances[indices[f]]) + ';' + str(
                indices[f]) + os.linesep)
            feat.append(indices[f])
        fh.close()

def plot_lift_training(self, trained_model_path, X_train_path,Y_train_path,
save_chart_path):
        X_train = np.load(X_train_path)
        Y_train = np.load(Y_train_path)
        gs = self.load_model(trained_model_path)
        gs.fit(X_train, Y_train)

Y_probs = gs.predict_proba(X_train)
        Y_probs = cross_val_predict(gs, X_train, Y_train, cv=10,
method='predict_proba')
        np.save(ont.MODEL_DATA + os.sep + "Y_probs_training.npy", Y_probs)
        Y_probs_df = pd.DataFrame(Y_probs)
```

FIG. 75B (CONTINUE)

```
        Y_probs_df.to_csv(ont.MODEL_DATA + os.sep + "Y_probs_training.csv")

Y_train_df = pd.DataFrame(Y_train)
        Y_train_df.to_csv(ont.MODEL_DATA + os.sep + "Y_train_training.csv")

Y_scores = Y_probs[:, 1]

label = 'train'
        y_conc = np.stack([Y_scores, Y_train], axis=-1)
        y_conc = y_conc[np.lexsort(np.fliplr(y_conc).T)]

current_border = 0.1
        current_group = 0
        group_count = np.zeros(10)
        group_pos = np.zeros(10)

fh = open('lift_' + label + '.txt', 'w')
        for i in range(y_conc.shape[0]):
            fh.write(str(y_conc[i][0]) + ';' + str(y_conc[i][1]) + os.linesep)
            if y_conc[i][0] >= current_border and current_border < 0.99:  # avoid
problems with rounding & conf == 1.0
                current_border += 0.1
                current_group += 1
            group_count[current_group] += 1
            if y_conc[i][1] == 1.:
                group_pos[current_group] += 1
        lift = np.zeros(11)
        for i in range(lift.shape[0] - 1):
            # print(group_count[i], group_pos[i])
            if group_count[i] > 0:
                lift[i] = group_pos[i] / group_count[i]
        ind = np.arange(11)  # the x locations for the groups
        width = 0.95  # the width of the bars
        plt.bar(ind + width / 2 + 0.01, lift, width)
        plt.xticks(ind, ['0.0', '0.1', '0.2', '0.3', '0.4', '0.5', '0.6', '0.7',
'0.8', '0.9', '1.0'])
        plt.xlabel('Groups')
        plt.ylabel('Success rate')
        plt.savefig(save_chart_path)
        # plt.show()
        plt.clf()
        plt.cla()
        plt.close()
        fh.close()

def plot_lift_testing(self,trained_model_path,X_test_path, Y_test_path,
save_chart_path):
        X_test= np.load(X_test_path)
        Y_test = np.load(Y_test_path)
```

FIG. 75B (CONTINUE)

```
        gs = self.load_model(trained_model_path)
        gs.fit(X_test,Y_test)

Y_probs = gs.predict_proba(X_test)
        Y_probs =cross_val_predict(gs, X_test, Y_test, cv=10,
method='predict_proba')
        np.save(ont.MODEL_DATA + os.sep + "Y_probs_testing.npy", Y_probs)
        Y_probs_df = pd.DataFrame(Y_probs)
        Y_probs_df.to_csv(ont.MODEL_DATA + os.sep + "Y_probs_testing.csv")

Y_test_df = pd.DataFrame(Y_test)
        Y_test_df.to_csv(ont.MODEL_DATA + os.sep + "Y_test.csv")

Y_scores = Y_probs[:, 1]

label = 'test'
        y_conc = np.stack([Y_scores, Y_test], axis=-1)
        y_conc = y_conc[np.lexsort(np.fliplr(y_conc).T)]

current_border = 0.1
        current_group = 0
        group_count = np.zeros(10)
        group_pos = np.zeros(10)

fh = open('lift_' + label + '.txt', 'w')
        for i in range(y_conc.shape[0]):
            fh.write(str(y_conc[i][0]) + ';' + str(y_conc[i][1]) + os.linesep)
            if y_conc[i][0] >= current_border and current_border < 0.99:  # avoid
problems with rounding & conf == 1.0
                current_border += 0.1
                current_group += 1
            group_count[current_group] += 1
            if y_conc[i][1] == 1.:
                group_pos[current_group] += 1
        lift = np.zeros(11)
        for i in range(lift.shape[0] - 1):
            # print(group_count[i], group_pos[i])
            if group_count[i] > 0:
                lift[i] = group_pos[i] / group_count[i]
        ind = np.arange(11)  # the x locations for the groups
        width = 0.95  # the width of the bars
        plt.bar(ind + width / 2 + 0.01, lift, width)
        plt.xticks(ind, ['0.0', '0.1', '0.2', '0.3', '0.4', '0.5', '0.6', '0.7',
'0.8', '0.9', '1.0'])
        plt.xlabel('Groups')
        plt.ylabel('Success rate')
        plt.savefig(save_chart_path)
        # plt.show()
```

FIG. 75B (CONTINUE)

```
        plt.clf()
        plt.cla()
        plt.close()
        fh.close()

def calc_class_probabilities(self,trained_model_path, X_train_path,
X_test_path, Y_train_path):
        X_train = np.load(X_train_path)
        Y_train = np.load(Y_train_path)
        X_test = np.load(X_test_path)
        print(X_test)
        gs = self.load_model(trained_model_path)
        gs.fit(X_train, Y_train)
        class_probs = gs.predict_proba(X_test)
        # TODO: need to recombine class predictions with company names.  This is
not possible yet, see https://git.sourceai.io/jessen-reed/POC/issues/54
        class_probabilities = pd.DataFrame(class_probs,index=X_test.index())
        print(class_probabilities)

return class_probabilities def calc_cohens_kappa(self):
        pass def write_company_catgorizations(self,Y_path, Y_probs_path,
full_data_path,save_target):
        Y = np.load(Y_path)
        Y_probs = np.load(Y_probs_path)
        Y_scores = Y_probs[:, 1]
        # print(Y_scores)

name = pd.read_csv(full_data_path,index_col=0)
        names = name['Company']
        # print(names)
        final = pd.DataFrame({'Company': names, 'score':
Y_scores,'true_catagory':Y})
        final['predicted_catagory'] =  np.where(final['score']>.5,
'success','failure' )
        final['true_catagory'] = np.where(final['true_catagory'] == 1, 'success',
'failure')
        final.to_csv(save_target,index=True)

if __name__ == '__main__':
    trained_model_path = ont.TRAINED_MODELS_LOCATION + os.sep + 'POC2-v2-
GradientBoostingClassifier-all-data.pkl'
    feature_labels_path = ont.MODEL_DATA + os.sep + "feature_labels-POC2-v2.npy"
    X_path = ont.MODEL_DATA + os.sep + "X-POC2-v2.npy"
    d = GradientBoostedClassifierDiagnostics()
```

FIG. 75B (CONTINUE)

```
    d.plot_partial_dependences_charts(trained_model_path=trained_model_path,
feature_labels_path=feature_labels_path,
                                                              X_path=X_path,
save_files_folder=ont.DIAGNOSTICS_RESULTS)
```

FIG. 75C

```
import os
import numpy as np
import ontologies as ont
from sklearn.externals import joblib
from sklearn.model_selection import cross_val_predict class PredictiveModel:

def __init__(self):
        self.standard_name = None
        self.version = None
        self.model_type = None
        self.included_companies = []
        self.included_IVs = []
        self.trained_models_save_location = ont.TRAINED_MODELS_LOCATION def __repr__(self):
        return str(self.standard_name) + ' Version: ' + str(self.version)

def save_model(self,save_model_name_path):
        print('Saving model to {}'.format(save_model_name_path))
        joblib.dump(self.trained_model, save_model_name_path)

def parse_model_file_name(self,save_model_name_path):
        model_file_name = os.path.basename(save_model_name_path)
        values = model_file_name.split('-')
        self.standard_name = values[0]
        self.version = values[1]
        self.model_type = values[2]

class POC2Model(PredictiveModel):

def __init__(self):
        PredictiveModel.__init__(self)

Model Params
        self.standard_name = 'POC2'
        self.version = '2'
        self.model_type = 'classifier' def fit_model(self,X_train_path,Y_train_path):
        from sklearn.preprocessing import RobustScaler
        from sklearn.pipeline import Pipeline
        from sklearn.model_selection import GridSearchCV
        from sklearn.ensemble import GradientBoostingClassifier X_train = np.load(X_train_path)
```

FIG. 75C (CONTINUED)

```
        Y_train = np.load(Y_train_path)
        pipe_gb = Pipeline([('scl', RobustScaler()), ('clf',
GradientBoostingClassifier(random_state=ont.RND_STATE))])
        param_grid_gb = [{'clf__max_features': ['sqrt', 'log2'],
'clf__max_depth': [1, 2, 3, 4, 5],
                          'clf__min_samples_leaf': [1, 2, 3, 4, 5, 6],
'clf__n_estimators': [10, 30, 100, 300]}]

self.trained_model = GridSearchCV(estimator=pipe_gb,
param_grid=param_grid_gb, scoring='accuracy', cv=10, n_jobs=3,
                                          verbose=10)
        self.trained_model.fit(X_train, Y_train)

def fit_model_all_data(self, X_path, Y_path):
        from sklearn.preprocessing import RobustScaler
        from sklearn.pipeline import Pipeline
        from sklearn.model_selection import GridSearchCV
        from sklearn.ensemble import GradientBoostingClassifier X_train = np.load(X_path)
        Y_train = np.load(Y_path)
        pipe_gb = Pipeline([('scl', RobustScaler()), ('clf',
GradientBoostingClassifier(random_state=ont.RND_STATE))])
        param_grid_gb = [{'clf__max_features': ['sqrt', 'log2'],
'clf__max_depth': [1, 2, 3, 4, 5],
                          'clf__min_samples_leaf': [1, 2, 3, 4, 5, 6],
'clf__n_estimators': [10, 30, 100, 300]}]

self.trained_model = GridSearchCV(estimator=pipe_gb,
param_grid=param_grid_gb, scoring='accuracy', cv=10, n_jobs=3,
                                          verbose=10)
        self.trained_model.fit(X_train, Y_train)
```

FIG. 75D

```
class CalcCrossValidate(luigi.Task):
    def output(self):
        return luigi.LocalTarget(ont.MODEL_DATA + os.sep + "y_probas-POC2-
v2.npy")

def requires(self):
        return etl_modeling.TrainPOC2ModelAllData()

def run(self):
        save_target = ont.MODEL_DATA + os.sep + "y_probas-POC2-v2.npy"
        X_path = ont.MODEL_DATA + os.sep + "X-POC2-v2.npy"
        Y_path = ont.MODEL_DATA + os.sep + "Y-POC2-v2.npy"
        trained_model_path = target_model_path
        diagnostics = Diagnostics.GradientBoostedClassifierDiagnostics()

diagnostics.write_cross_validate_predict(trained_model_path=target_model_path,
                                                    X_path=X_path,
                                                    Y_path=Y_path,
                                                    save_target=save_target)

def write_cross_validate_predict(self, trained_model_path, X_path, Y_path,
save_target):
    gs = joblib.load(trained_model_path)
    X = np.load(X_path)
    Y = np.load(Y_path)
    # gs = self.load_model(trained_model_path)
    y_probas = cross_val_predict(gs.best_estimator_, X, Y, cv=10,
method='predict_proba')
    np.save(save_target,y_probas)
    y_probas_df = pd.DataFrame(y_probas)
    y_probas_df.to_csv('test_y_probs.csv')
```

FIG. 75E a

```
import os
import luigi
import ontologies as ont
import PredictiveModel
import DataSet
import Diagnostics
import etl_DV_prep
import etl_IV_prep
import numpy as np
import pandas as pd trained_models_save_location = ont.TRAINED_MODELS_LOCATION
model_data_location = ont.MODEL_DATA class PrepModelData(luigi.WrapperTask):
    def requires(self):
        yield PrepFullPOC2DataSet()
        yield SaveFeatureLabelsAsNpy()
        yield SaveFeatureLabelsAsDF()
        yield SaveTrainTestData()

class PrepFullPOC2DataSet(luigi.Task):
    def output(self):
        return luigi.LocalTarget(model_data_location + os.sep + "FullData-POC2-
v2.csv")

def requires(self):
        return [etl_IV_prep.ConsolidateIVs()]

def run(self):
        data_set = DataSet.POC2DateSet()
        data_set.save_full_to_file(model_data_location + os.sep + "FullData-POC2-
v2.csv")

class SaveTrainTestData(luigi.Task):

def output(self):
        return luigi.LocalTarget(
            ont.MODEL_DATA + os.sep + "X-POC2-v2.npy")  # this is only one of the
files, need to fix this later def requires(self):
        return PrepFullPOC2DataSet()

def run(self):
        data_set = DataSet.POC2DateSet()
```

FIG. 75E (CONTINUED)

```
        data_set.prep_full()
        data_set.split_train_test()
        data_set.save_X(ont.MODEL_DATA + os.sep + "FullData-POC2-v2.csv")
        data_set.save_Y(ont.MODEL_DATA + os.sep + "FullData-POC2-v2.csv")

data_set.save_X_train(ont.MODEL_DATA + os.sep + "X_train-POC2-v2.npy")
        data_set.save_Y_train(ont.MODEL_DATA + os.sep + "Y_train-POC2-v2.npy")
        data_set.save_X_test(ont.MODEL_DATA + os.sep + "X_test-POC2-v2.npy")
        data_set.save_Y_test(ont.MODEL_DATA + os.sep + "Y_test-POC2-v2.npy")

class SaveFeatureLabelsAsNpy(luigi.Task):

def output(self):
        return luigi.LocalTarget(ont.MODEL_DATA + os.sep + "feature_labels-POC2-
v2.npy")

def requires(self):
        return PrepFullPOC2DataSet()

def run(self):
        df_full_file_path = model_data_location + os.sep + "FullData-POC2-v2.csv"
        data_set = DataSet.POC2DateSet()
        result =
data_set.save_feature_labels(df_full_file_path=df_full_file_path)
        np.save(ont.MODEL_DATA + os.sep + "feature_labels-POC2-v2.npy", result)

class SaveFeatureLabelsAsDF(luigi.Task):

def output(self):
        return luigi.LocalTarget(ont.MODEL_DATA + os.sep + "feature_labels_df-
POC2-v2.csv")

def requires(self):
        return PrepFullPOC2DataSet()

def run(self):
        df_full_file_path = model_data_location + os.sep + "FullData-POC2-v2.csv"
        data_set = DataSet.POC2DateSet()
        result =
data_set.save_feature_labels(df_full_file_path=df_full_file_path)
        result = pd.DataFrame(dict(IV=result))
        result.to_csv(ont.MODEL_DATA + os.sep + "feature_labels_df-POC2-v2.csv",
index=True)

class Model(luigi.WrapperTask):
    def requires(self):
```

FIG. 75E (CONTINUED)

```
        yield PrepModelData()
        # yield TrainPOC2Model()
        yield TrainPOC2ModelAllData()

class TrainPOC2Model(luigi.Task):
    def __init__(self):
        luigi.Task.__init__(self)
        self.model = PredictiveModel.POC2Model()

def output(self):
        return luigi.LocalTarget(ont.TRAINED_MODELS_LOCATION + os.sep + 'POC2-v2-
GradientBoostingClassifier.pkl')

def requires(self):
        return PrepModelData()

def run(self):
        X_train_path = ont.MODEL_DATA + os.sep + "X_train-POC2-v2.npy"
        Y_train_path = ont.MODEL_DATA + os.sep + "Y_train-POC2-v2.npy"
        self.model.fit_model(X_train_path=X_train_path,
Y_train_path=Y_train_path)
        self.model.save_model(
            save_model_name_path=ont.TRAINED_MODELS_LOCATION + os.sep + 'POC2-v2-
GradientBoostingClassifier.pkl')

class TrainPOC2ModelAllData(luigi.Task):
    def __init__(self):
        luigi.Task.__init__(self)
        self.model = PredictiveModel.POC2Model()

def output(self):
        return luigi.LocalTarget(ont.TRAINED_MODELS_LOCATION + os.sep + 'POC2-v2-
GradientBoostingClassifier-all-data.pkl')

def requires(self):
        return [PrepModelData(),etl_DV_prep.AllDVPrep()]

def run(self):
        X_path = ont.MODEL_DATA + os.sep + "X-POC2-v2.npy"
        Y_path = ont.MODEL_DATA + os.sep + "Y-POC2-v2.npy"
        self.model.fit_model_all_data(X_path=X_path, Y_path=Y_path)
        self.model.save_model(
```

FIG. 75F

```
import os
import luigi
import ontologies as ont
import Diagnostics
import etl_DV_prep
import etl_modeling target_model_path = ont.TRAINED_MODELS_LOCATION + os.sep + 'POC2-v2-
GradientBoostingClassifier-all-data.pkl' class RunDiagnostics(luigi.WrapperTask):
    def requires(self):
        # yield etl_modeling.TrainPOC2Model()
        yield etl_modeling.TrainPOC2ModelAllData()
        # yield CalcAccuracy()
        yield CalcCrossValidate()
        yield CalcROC()
        # yield CalcROCCurves()
        yield CalcFeatureImportanceAllData()
        # yield CalcLiftTrain()
        # yield CalcLiftTest()
        #  yield CalcClassProbs()
        yield CalcPartialDependencies()

class RunDiagnosticsAllData(luigi.WrapperTask):
    def requires(self):

yield etl_modeling.TrainPOC2ModelAllData()
        yield CalcAccuracy()
        yield CalcCrossValidate()
        yield CalcROC()
        yield PlotLift()
        yield WriteCompanyResultsTable()
        yield CalcFeatureImportanceAllData()

class CalcCrossValidate(luigi.Task):
    def output(self):
        return luigi.LocalTarget(ont.MODEL_DATA + os.sep + "y_probas-POC2-
v2.npy")

def requires(self):
        return etl_modeling.TrainPOC2ModelAllData()

def run(self):
        save_target = ont.MODEL_DATA + os.sep + "y_probas-POC2-v2.npy"
        X_path = ont.MODEL_DATA + os.sep + "X-POC2-v2.npy"
        Y_path = ont.MODEL_DATA + os.sep + "Y-POC2-v2.npy"
        trained_model_path = target_model_path
        diagnostics = Diagnostics.GradientBoostedClassifierDiagnostics()
```

FIG. 75F (CONTINUED)

```
diagnostics.write_cross_validate_predict(trained_model_path=target_model_path,
                                          X_path=X_path,
                                          Y_path=Y_path,
                                          save_target=save_target)

class CalcAccuracy(luigi.Task):

def output(self):
        return luigi.LocalTarget(ont.DIAGNOSTICS_RESULTS + os.sep +
'accuracy.txt')

def requires(self):
        return [etl_modeling.TrainPOC2ModelAllData(),CalcCrossValidate()]

def run(self):
        Y_probs_path = ont.MODEL_DATA + os.sep + "y_probas-POC2-v2.npy"
        Y_path = ont.MODEL_DATA + os.sep + "Y-POC2-v2.npy"
        diagnostics = Diagnostics.GradientBoostedClassifierDiagnostics()
        diagnostics.write_accuracy_summary(Y_path=Y_path,
Y_probs_path=Y_probs_path)

class CalcROC(luigi.Task):

def output(self):
        return luigi.LocalTarget(ont.DIAGNOSTICS_RESULTS + os.sep +
'roc_GradientBoostedClassifier_POC2_v2.png')

def requires(self):
        return [etl_modeling.TrainPOC2ModelAllData(),CalcCrossValidate()]

def run(self):
        Y_Probs_path = ont.MODEL_DATA + os.sep + "y_probas-POC2-v2.npy"
        Y_path = ont.MODEL_DATA + os.sep + "Y-POC2-v2.npy"
        feature_labels_path = ont.MODEL_DATA + os.sep + "feature_labels-POC2-
v2.npy"
        diagnostics = Diagnostics.GradientBoostedClassifierDiagnostics()
        diagnostics.plot_roc(feature_labels_path=feature_labels_path,
                             Y_path=Y_path,
                             Y_probs_path=Y_Probs_path,
                             save_chart_path=ont.DIAGNOSTICS_RESULTS + os.sep +
'roc_GradientBoostedClassifier_POC2_v2.png')

class PlotLift(luigi.Task):
    def output(self):
        return luigi.LocalTarget(ont.DIAGNOSTICS_RESULTS + os.sep +
'lift_GradientBoostedClassifier_POC2_v2.png')
```

FIG. 75F (CONTINUED)

```
    def requires(self):
        return [etl_modeling.TrainPOC2ModelAllData(),CalcCrossValidate()]

def run(self):
        Y_Probs_path = ont.MODEL_DATA + os.sep + "y_probas-POC2-v2.npy"
        Y_path = ont.MODEL_DATA + os.sep + "Y-POC2-v2.npy"

diagnostics = Diagnostics.GradientBoostedClassifierDiagnostics()
        diagnostics.plot_lift(Y_path=Y_path, Y_probs_path=Y_Probs_path,
                              save_chart_path=ont.DIAGNOSTICS_RESULTS + os.sep +
'lift_GradientBoostedClassifier_POC2_v2.png')

class WriteCompanyResultsTable(luigi.Task):
    def output(self):
        return luigi.LocalTarget(ont.DIAGNOSTICS_RESULTS + os.sep +
'company_classifications.csv')

def requires(self):
        return [etl_modeling.TrainPOC2ModelAllData(),CalcCrossValidate()]

def run(self):
        full_data = ont.MODEL_DATA  + os.sep + "FullData-POC2-v2.csv"
        save_target = ont.DIAGNOSTICS_RESULTS + os.sep +
'company_classifications.csv'
        Y_Probs_path = ont.MODEL_DATA + os.sep + "y_probas-POC2-v2.npy"
        Y_path = ont.MODEL_DATA + os.sep + "Y-POC2-v2.npy"
        diagnostics = Diagnostics.GradientBoostedClassifierDiagnostics()

diagnostics.write_company_catgorizations(Y_path=Y_path,Y_probs_path=Y_Probs_path,
full_data_path=full_data,
                                              save_target=save_target)

class CalcFeatureImportanceAllData(luigi.Task):
    def output(self):
        return luigi.LocalTarget(ont.DIAGNOSTICS_RESULTS + os.sep +
'feature_importances.csv')

def requires(self):
        return etl_modeling.TrainPOC2ModelAllData()

def run(self):
        trained_model_path = ont.TRAINED_MODELS_LOCATION + os.sep + 'POC2-v2-
GradientBoostingClassifier-all-data.pkl'
        feature_labels_path = ont.MODEL_DATA + os.sep + "feature_labels-POC2-
v2.npy"
        diagnostics = Diagnostics.GradientBoostedClassifierDiagnostics()
        feature_importances =
```

FIG. 75F (CONTINUED)

```
diagnostics.calc_feature_importances(trained_model_path=trained_model_path, feature_labels_path=feature_labels_path)
        feature_importances.to_csv(ont.DIAGNOSTICS_RESULTS + os.sep +
'feature_importances.csv')

class CalcPartialDependencies(luigi.Task):
    def output(self):
        return luigi.LocalTarget(ont.DIAGNOSTICS_RESULTS + os.sep +
'partial_dependences1.png')

def requires(self):
        return etl_modeling.TrainPOC2ModelAllData()

def run(self):
        trained_model_path = ont.TRAINED_MODELS_LOCATION + os.sep + 'POC2-v2-
GradientBoostingClassifier-all-data.pkl'  #
        feature_labels_path = ont.MODEL_DATA + os.sep + "feature_labels-POC2-
v2.npy"
        X_path = ont.MODEL_DATA + os.sep + "X-POC2-v2.npy"
        d = Diagnostics.GradientBoostedClassifierDiagnostics()
        d.plot_partial_dependences_charts(trained_model_path=trained_model_path, feature_labels_path=feature_labels_path,
                                          X_path=X_path, save_files_folder=ont.DIAGNOSTICS_RESULTS)
```

FIG. 76

*Filtering Criteria*

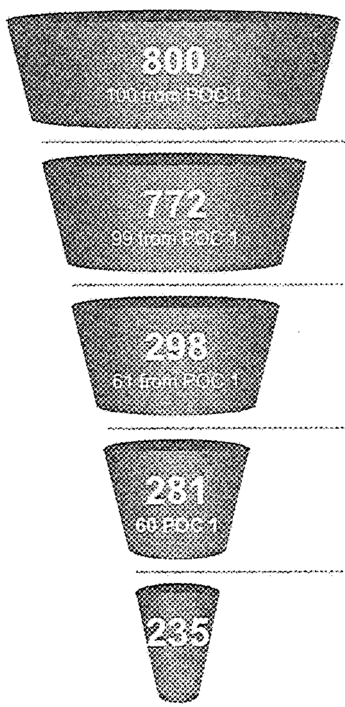

In the immuno-oncology space
Discovered using keyword based searches of the Quid companies database[1]. Used immuno-oncology (IO) terminology such as immuno-therapeutics for cancer, immune modulators and known IO targets.

Have CapIQ IDs
28 missing companies likely exclusively from Crunchbase

Have CIQ financial data, or acquired or failed since 2012
Companies with at least one financial period in CIQ.

Are not 'known successes' in measurement year (2012, 2013, 2014)
17 companies in total can be excluded - most with TEV in 2015 of over ~$10B.

Have data for at least one dependent (success) variable (2014 measurement year)
- Just TSR - e.g., 192 companies
- Just revenue growth - e.g., 159 companies While availability of 'success' data limits the number of companies used to train and test model, the model can be applied to a much larger number of early stage companies that lack 'success' data

FIG. 77

Example method for Extract, Transform, and Load (ETL) pipeline.

- All steps can be managed by an ETL work management platform (e.g. Luigi, AirFlow)
- Work Management platform can use a Directed Acyclic Graph structure to ensure that a work process is only run after all prior dependent processes are completed.

1. Many kinds of data can be gathered from many sources
    a. Example Types of Data
        i. Patents
            1. Counts (publications, families)
            2. Citations (forward/backward)
            3. Text (description, abstract, claims)
        ii. Inventorship (founder, key employee)
            1. Scientific Journal Articles
            2. Full text
            3. Abstract text
            4. Bibliographic (author, institution, Grant funders, etc)
        iii. Financial Data
            1. Revenues
            2. Employee counts
        iv. Media Data
            1. news articles
            2. social media posts
        v. Investment Data
            1. Investment amounts and timing
            2. Investor investment history
        vi. Founder
            1. Previous companies founded
            2. Patents
            3. Scientific journal publications
        vii. Open Source Software contributions
            1. Github commits
    b. Methods of gathering can comprise:
        i. RESTful APIs
        ii. FTP servers
        iii. Manual download from web app
        iv. Automated crawling of websites
2. Data can be placed in raw folder(s)
3. Data can be cleaned and combined into standard format
4. Derived data points can be generated from the cleaned raw data

FIG. 77 (CONTINUED)

a. Derived date point examples
    i. BCG Quality Index Score
    ii. Sentiment of media text
    iii. Collaboration network metrics (co-authorship/inventorship/assignment)
        1. Eigenvalue
        2. Degree
        3. Betweeness Centrality
        4. Closeness
    iv. CAGR metrics
        1. employee count
        2. funding event magnitudes
        3. patent publication
        4. scientific journal article publication 5. Cleaned data and Derived data can be combined into a single dataframe
6. Data can be split into an observation year (2014 in our case) and a measure year (2017 in our case). Data from 2014 is used to predict outcome success in 2017.
7. Missing data can be <u>imputed</u>. Optionally, companies with missing data can be dropped.
8. Dependent variables can be derived
    a. Company success metrics
        i. Company was shuttered (failure) vs. company was acquired (success)
        ii. Company's Total Shareholder Return (TSR) is positive
        iii. Company's TSR out performed risk cohort (risk cohort could be defined as the FDA approval stage at which a company's drugs is currently. Companies with earlier stage FDA approvals are more risky than later stages)
        iv. Company's stock price increased more than threshold value
9. Dependent variables can be combined with other independent variables into a "model ready" dataframe.
10. Model can be trained
    a. Model is a classifier model.
    b. Examples of classifier models
        i. <u>Gradient Boosted Classifier</u>
        ii. Logistic Regression
        iii. Neural Network
        iv. Support Vector Machine
    c. Gradient Boosted Classifier can have many input parameters. In order to find the best combination of input parameters, we can write a script to try a large number of variations and then combine the results of each combination at the end. The combination of parameters which produce the best output can be used as the final model.
11. Model can be diagnosed (tested)
    a. Because we have few data points, a traditional train/test methodology can be inappropriate. To solve this problem we used a <u>Cross Validation</u> technique.

FIG. 77 (CONTINUED)

12. Model Diagnostics can be written to text and graphical charts and presented to user
13. Model can be used to predict the outcome success of the companies (e.g., in the dataset in 2017 given data from 2014).
14. Model can be used to predict outcome success of companies 5 years from now given data from today.
15. Model results can be compared against similar stock indexes and human expert "Stock pickers" to determine if similar.

FIG. 78

1. Model Data Preparation & Training –
    a. The final data preparation and training can be activated from 'etl_modeling.py' which can include the two classes PrepModelData () & TrainPOC2ModelAllData().

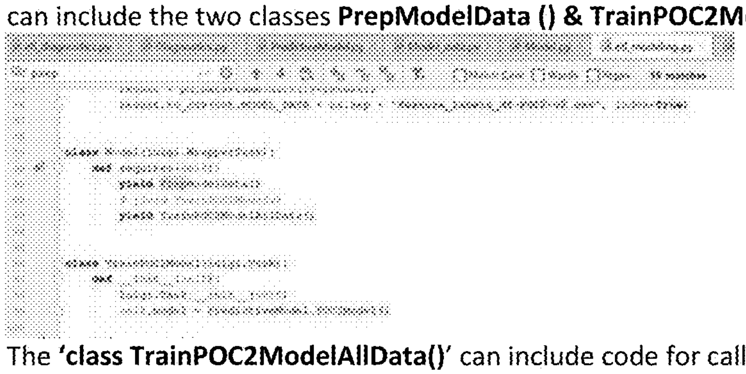

b. The 'class TrainPOC2ModelAllData()' can include code for calling a specific function 'fit_model_all_data' which is defined within 'PredictiveModel.py' python file.

2. Model capability of predicting success/ failure in the future

FIG. 79

1. Cross-validation – a. This function can get activated from 'etl_diagnostics.py' that is using a 'class CalcCrossValidate()'.

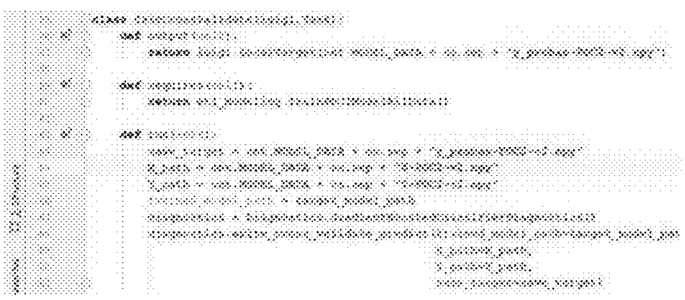

b. The 'class CalcCrossValidate()' can include code for calling a specific function 'write_cross_validate_predict' which is defined within 'Diagnostics.py' python file.

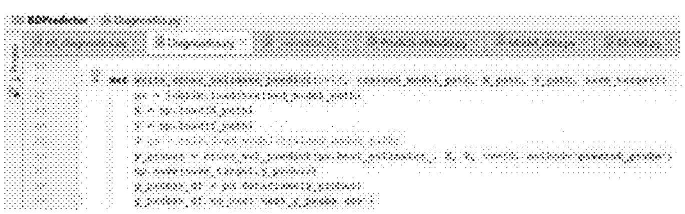

c. The function 'write_cross_validate_predict' within 'Diagnostics.py' can use a function 'cross_val_predict' which can be a pre-defined function from 'cross_val_predict' python package.

Next step: Use model to look at landscape today to identify and prioritize targets with high possibility of success

Ability to focus model on therapeutic areas of most interest, further tweak/refine predictive capability

FIGURE 11 Schematic for how we adjust for measurement year.pptx

THE BOSTON CONSULTING GROUP

| Step | Tally of Companies | Affected Companies | Details | Details |
|---|---|---|---|---|
| 1 | 745 | 745 | Keyword based search for immuno-oncology | Include search string here |
| 2 | 800 | 55 | Companies included in POC1 not captured by Step 1 | |
| 3 | 792 | 792 | Have Capital IQ ID | Mapped Quid DbID to CapitalIQ ID, those missing used fuzzy match search in capitalIQ and manually validated |
| 4 | 298 | 298 | Have Financial data in Capital IQ | CapitalIQ links financial data to companies using a table of financial period. Companies were filtered to only those that had a least one entry in the financial data table (no date limitation). SQL (mixed with python) used<br><br>SELECT<br>c.companyId<br>,c.companyName<br>FROM [CIQ].[dbo].[ciqCompany] c<br>JOIN ciqFinPeriod fp on fp.companyId = c.companyId<br>WHERE c.companyID IN ({", ".join([str(x) for x in short_list])}) |
| 5 | 280 | 18 | Are not "Known successes" (EV > $ 5B, etc?) | Companies over $5B in EV in 2015 as listed in capital IQ collection 100017 ("Average TEV") were excluded. Additionally, Bristol-Myers Squibb Australia Pty Ltd was excluded. Full list of company's exluded: |
| 6 | 197 | | Have at least one TSR value from VSC 2011-2016 | |
| 7 | | 2 | Add in known failures (eg. Out of Business) | Capital IQ Operating Status is Out of Business |

FIG. 81A

| S.No | Data Type of Variable | Data Sources of Variable | Feasibility of Calculation from Measurement Year | Variables (to be calculated from Measurement Year) Name | Company Level | Data Level | Who/how will be calculated | Input Data Files | Output Data Files | Detailed calculation | Rationale for POC2 |
|---|---|---|---|---|---|---|---|---|---|---|---|
| 1 | Financial Data | Capital IQ, Evaluate Pharma, Crunchbase | Yes | Valuation: Enterprise Value | is current year (compare data - 1) Enterprise value > $1 bn ? Yes = 1. No=0 | | Gamma | Integrated financial data by Gamma Team | Company Level Patent Data - Gamma | Refer sheet, Detailed depend. variable calcu | Exclude because EV and TSR are both only available for public companies and TSR better measure |
| 2 | Financial Data | Capital IQ, Valuescinece, Orbis, Factiva | Yes | Revenue | Positive Revenue | | Gamma | Integrated financial data by Gamma Team | Company Level Patent Data - Gamma | Refer sheet, Detailed depend. variable calcu | Possibly Use but as a growth rate |
| 3 | Financial Data | Capital IQ, Valuescinece, Orbis, Factiva | Yes | | Curent Positive Revenue Growdi | | Gamma | Integrated financial data by Gamma Team | Company Level Patent Data - Gamma | Refer sheet, Detailed depend. variable calcu | |
| 4 | Financial Data | Capital IQ, Valuescinece, Orbis, Factiva | Yes | Cash Flow | Positive Cash Flow Growth | | Gamma | Integrated financial data by Gamma Team | Company Level Patent Data - Gamma | Refer sheet, Detailed depend. variable calcu | |
| 5 | Financial Data | Capital IQ, Valuescinece, Orbis, Factiva | Yes | Gross Profit ($) | Positive gross profit ($) | | Gamma | Integrated financial data by Gamma Team | Company Level Patent Data - Gamma | Refer sheet, Detailed depend. variable calcu | |
| 6 | Financial Data | Capital IQ, Valuescinece, Factiva, then Orbis | Yes | Gross Margin (%) | Positive gross profit margin growth | | Gamma | Integrated financial data by Gamma Team | Company Level Patent Data - Gamma | Refer sheet, Detailed depend. variable calcu | Possibly Use but as a growth rate |
| 7 | Funding Data | Capital IQ | Yes | Acquired Status | Acquired between start of funding data pull year and measurement year | | Gamma | Integrated funding data by Gamma Team | Company Level Patent Data - Gamma | Refer sheet, Detailed depend. variable calcu | Will apply in POC2 |
| 8 | Financial Data | Capital IQ, Orbis for missing values | Yes | Valuation: Market Cap | Is current NPV of > $1 bn ? | | Gamma | Integrated financial data by Gamma Team | Company Level Patent Data - Gamma | Refer sheet, Detailed depend. variable calcu | Exclude for same reason as EV |
| 9 | Financial Data | Expert input | Yes | Acquired by BMS | Acquired by BMS | | Gamma | Integrated financial data by Gamma Team | Company Level Patent Data - Gamma | Refer sheet, Detailed depend. variable calcu | Exclude for consistency of date |
| 10 | Financial Data | CapitalIQ | Yes | Forward revenue growth (FRG) | Project growth in revenue going forward of greater than 10% | | Gamma | Integrated financial data by Gamma Team | Company Level Patent Data - Gamma | Refer sheet, Detailed depend. variable calcu | |
| 11 | Financial Data | CapitalIQ | Yes | Forward earnings growth (FEG) | Project growth in earnings going forward of greater than 10% | | Gamma | Integrated financial data by Gamma Team | Company Level Patent Data - Gamma | Refer sheet, Detailed depend. variable calcu | |

FIG. 81B

| S.No | Data Type of Variable | Data Sources of Variable | Feasibility of Calculation from Measurement Year | Variables (to be calculated from Measurement Year) | | | Detailed calculation |
|---|---|---|---|---|---|---|---|
| | | | | Name | Company Level | Data Level | |
| | Financial | VSC; CapIQ or Quid for year | | TSR | Yes | | |
| | Financial | VSC | | Risk Adjusted TSR | | | |
| | Financial | TBD | | Organic Revenue Growth | | | Possibly use acquisition history of companies to exlude those that have made acquisitions between measurement year and today, if no acquisition made, assume organic revenue |
| | Financial | | | Revenue Growth | | | |
| | Financial | TBD | | Revenue Growth combined with Projected Forward revenue growth (FRG) | | | |
| | Financial | Evaluate Pharma | | Change in NPV of total products | | | |
| | Company Status | CapitaliQ | | Acquistion Status | | | Company is acquired post measurement year |
| | Company Status | CapitaliQ | | Out of Business | | | Company status is "out of business" post measurement year |
| | Relationships | | | License Status | | | Company has licensed any product(s) |
| | | | | NPV CAGR | | | |

FIG. 81C

Patent Data Files

Parameters for creating the collated patent data files adjusted for measurement years

| Parameters | Adjustment | Details & Next Steps |
| --- | --- | --- |
| Patent Citations | Adjust forward citations to remove citations that happen post-measurement year | Use Detailed Patent citations field in order to remove citations post measurement<br>POC1 used application year of forward citing patent - need to determine best process for removing citations post measurement yeear |
| Number of Filings in data files | Adjust number of filings based on publication year - publications post measurement year would be removed | |

FIG. 81D

| S.No. | Data Type of Variable | Data Sources of Variable | Variables (to be calculated from Measurement Year) Name | Company Level | Normalizing Fact… at founding year | (Abs… |
|---|---|---|---|---|---|---|
| 1 | Patents | Thomson Innovation for Company, Associated Inventors / Founders | Quantity | # of patents (families) | | |
| 1.1 | Patents per year | | | Avg # filed patents per year (application date) (families) | | |
| 2 | Patents | Thomson Innovation for Company, Associated Inventors / Founders | | # of patents per R&D spend (families) | | |
| 3 | Patents | Thomson Innovation for Company, Associated Inventors / Founders | | # of patents per years from founding | | |
| 4 | Patents | Thomson Innovation for Company, Associated Inventors / Founders | | # of patents at founding year | Yes | |
| 5 | Patents | Thomson Innovation for Company, Associated Inventors / Founders | Growth (time bounded) | CAGR last 3 years from Measurement Year | | |
| 6 | Patents | Thomson Innovation for Company, Associated Inventors / Founders | Growth (time bounded) | # of growth spikes > 30% since 1995 up till Measurement Year | | |
| 7 | Patents | Thomson Innovation for Company, Associated Inventors / Founders | BCG Quality Index | Average BCG Quality Index | | |
| 8 | Patents | Thomson Innovation for Company, Associated Inventors / Founders | | Average Top 10% BCG Quality Index | | |
| 9 | Patents | Thomson Innovation for Company, Associated Inventors / Founders | | Median BCG Quality Index | | |
| 10 | Patents | Thomson Innovation for Company, Associated Inventors / Founders | | Maximum BCG Quality Index | | |
| 11 | Patents | Thomson Innovation for Company, Associated Inventors / Founders | Forward citations | Average count of adjusted forward citations by application year | | |
| 12 | Patents | Thomson Innovation for Company, Associated Inventors / Founders | | Average count of adjusted external forward citations by application year | | |
| 13 | Patents | Thomson Innovation for Company, Associated Inventors / Founders | Backward citations | Average count of backward citations patent | | |
| 14 | Patents | Thomson Innovation for Company, Associated Inventors / Founders | Leading edge | Average count of backward citations non-patent | | |
| 15 | Patents | Thomson Innovation for Company, Associated Inventors / Founders | Freshness | Freshness for 2 years prior to measurement year | | |
| 16 | Patents | Thomson Innovation for Company, Associated Inventors / Founders | Novelty | Novelty for 5 years prior to measurement year | | |
| 17 | Patents | Thomson Innovation for Company, Associated Inventors / Founders | Citation patterns | In_Degree | | |
| 18 | Patents | Thomson Innovation for Company, Associated Inventors / Founders | | Out_Degree | | |
| | | | | Eigenvector | | |
| | | | | Betweenness | | |
| | | | | Closeness | | |
| | | | | Harmonic | | |
| | | | | Clustering (low scores should rank well) | | |
| 19 | Patents | Thomson Innovation for Company, Associated Inventors / Founders | | Self_references | | |
| 20 | Patents | Thomson Innovation for Company, Associated Inventors / Founders | Remaining life of patents | Average remaining life of patents | | |
| 21 | Patents | Thomson Innovation for Company, Associated Inventors / Founders | Family size | Average family size | | |
| 22 | Patents | Thomson Innovation for Company, Associated Inventors / Founders | Co-assignment with universities | Ratio ((# of patents having co assignments) / (total # of patents)) | | |
| 23 | Patents | Thomson Innovation for Company, Associated Inventors / Founders | Granted patents | (# of granted patents/ # of pending applications) | | |
| 24 | Patents | Thomson Innovation for Company, Associated Inventors / Founders | First occurence of new CPC codes | # of patents having new CPC codes in the last 3 years from Measurement Year | | |
| 25 | Patents | Thomson Innovation for Company, Associated Inventors / Founders | Correlation of patents to a product (EvaluatePharma?) | # of unique patents in orange book | | |
| 25.1 | Patents | | Average or median number of inventors per patent | | | |
| 26 | Scientific Publications | Web of Science for Company, Associated Inventors / Founders | Quantity | # of publications | | |
| 26.1 | Scientific Publications | Web of Science for Company, Associated Inventors / Founders | | Average # published per year | | |
| 27 | Scientific Publications | Web of Science for Company, Associated Inventors / Founders | | # of publications per R&D spend | | |
| 28 | Scientific Publications | Web of Science for Company, Associated Inventors / Founders | | # of publications per years from founding | | |
| 29 | Scientific Publications | Web of Science for Company, Associated Inventors / Founders | | # of publications at founding year | Yes | |
| 30 | Scientific Publications | Web of Science for Company, Associated Inventors / Founders | Growth (time bounded) | CAGR for last 3 years from Measurement Year | | |
| 31 | Scientific Publications | Thomson Innovation for Company, Associated Inventors / Founders | Growth (time bounded) | # of growth spikes > 30% since 2006 | | |
| 32 | Scientific Publications | Web of Science for Company, Associated Inventors / Founders | Freshness | Freshness for last 3 years from Measurement Year | | |
| 33 | Scientific Publications | Web of Science for Company, Associated Inventors / Founders | H-Index | H-Index | | |
| 34 | Scientific Publications | Web of Science for Company, Associated Inventors / Founders | Citations | Average # of adjusted citations | | |
| 35 | Scientific Publications | Web of Science for Company, Associated Inventors / Founders | | Average # of adjusted self citations | | |
| 36 | Scientific Publications | Web of Science for Company, Associated Inventors / Founders | | Average # of adjusted external citations | | |
| 37 | Scientific Publications | Web of Science for Company, Associated Inventors / Founders | Leading edge | Average # of cited references | | |
| 38 | Scientific Publications | Web of Science for Company, Associated Inventors / Founders | External Funding | (# non empty funding text) / (total # of publications) | | |
| 39 | Scientific Publications | Web of Science for Company, Associated Inventors / Founders | Collaboration networks - institution | Number of collaborating institutions | | |
| 40 | Scientific Publications | | Collaboration networks - individuals | Number of collaborating authors | | |
| 41 | Scientific Publications | | Journal impact | Journal Score | | |
| 42 | Funding Data | Quid data for Company | Funding Amounts | # of funding amounts | | |
| 43 | Funding Data | Quid data for Company | Private Funding Events | # of funding rounds | | |
| 43.1 | Funding Data | | Canceled PI Event | | | |
| 44 | Funding Data | Quid data for Company | Deviation between private funding rounds | | | |
| 44.1 | Funding Data | | Acceleration rate | | | |
| 45 | Funding Data | Quid data for Company | Investors | # of investors | | |
| 46 | Funding Data | | Investor Stage | | | |
| 46.1 | Funding Data | | Growth of funding values between rounds | | | |
| 46.2 | Funding Data | | Funded by "smart investor" | | | |
| 46.3 | Funding Data | | Large first financing | | | |
| 47 | Financial Data | Valuescience/ Orbis / Factiva data for Company | Latest Available Operating Revenue | Latest Available Financial Year Operating Revenue / ((No of years since founding) * (Measurement Year – Latest Available Financial Year + 1)) | | |
| 47.1 | Financial Data | | Archived NPV | Archived NPV at measurement year | | |
| 48 | Financial Data | Valuescience/ Orbis / Factiva data for Company | CAGR of revenue over the past 3 years from measurement year | CAGR last 3 years from Measurement Year | | |
| 49 | Financial Data | Valuescience/ Orbis / Factiva data for Company | CAGR of gross profit over the past 3 years from measurement year | CAGR last 3 years from Measurement Year | | |
| 50 | Founder Data | Orbis / Factiva for Associated Inventors / Founders | Quantity | # of patents | | |
| 51 | Founder Data | Orbis / Factiva for Associated Inventors / Founders | | # of publications | | |
| 52 | Founder Data | Orbis / Factiva for Associated Inventors / Founders | H-Index | H-Index | | |
| 53 | Founder Data | Orbis / Factiva for Associated Inventors / Founders | Previous companies | # of previous companies started | | |
| 54 | Founder Data | Orbis / Factiva for Associated Inventors / Founders | Collaboration networks - institution | Number of collaborating institutions | | |
| 54.1 | Founder Data | Orbis / Factiva for Associated Inventors / Founders | Collaboration networks - individuals | Number of collaborating authors | | |
| 54.2 | Founder Data | | Founder Experience | Number of times person appears as founder in CapIQ up to measurement year | | |
| 55 | Others | Orbis / Factiva for Company | Employee data | No of employees in the latest available year / ((No of years since founding year) * (Measurement Year – Latest Available Year)) | | |
| 56 | Others | Orbis / Factiva for Company | | CAGR for the last 3 years from the Measurement Year | | |
| 57 | Others | Web of Science | Phase of clinical trial | No of products in clinical trials uptill measurement year | | |
| 58 | Others | | Phase of clinical trial | No of products registered, launched or approved uptill measurment year | | |
| 59 | Others | Quid data for Company | Rank of sub-technology | | | |
| 60 | | | | | | |

FIG. 81E

Funding data metrics

Metric 42 : Funding Amounts
Definition: This metric is the total sum of private investment (PI) funding amounts the company has received uptill measurement year Input Data Files
CapitalIQ_FundingDataFile_20171115v1

Logic Steps for Gamma Script
Step 1: For every M&A target,
# of funding amounts = (Sum of "Total Transaction Value ($USDmm, Historical rate)" for Transaction Status =(Announced / Effective / Closed) uptill measurement year
Store # of funding amounts in Company Level Metric Data file - Gamma

Metric 43 : Private Funding Events
Definition: This metric is the total number of private investment (PI) funding rounds the company has received uptill measurement year Input Data Files
CapitalIQ_FundingDataFile_20171115v1

Logic Steps for Gamma Script
Step 1: For every M&A target,
# of funding rounds = (No. of enteries for Transaction Status = (Announced / Effective / Closed) uptill measurement year)
Store # of funding rounds in Company Level Metric Data file - Gamma

Metric 43.1 : No Cancelled PI Event
Definition: This metric reflects if a company had a cancelled PI event in the last 5 years from measurement year, this would indirectly reflect its probability for being unsuccessfu Input Data Files
CapitalIQ_FundingDataFile_20171115v1

Logic Steps for Gamma Script
Step 1: For every M&A target,
sort CapitalIQ_FundingDataFile_20171115v1 as per Level 1 = Target / Issuer, level 2 = All Transactions Announced Date
If (within last 5 years from measurement year Transcation Status is never equal to "Cancelled"), then No cancelled PI event = 1, else -1
Store No Cancelled PI Event in Company Level Metric Data file - Gamma

Metric 44: Deviation between private funding rounds
Definition: this metric measures the deviation between last two private funding rounds of a company uptill measurement year. Standard time for a funding cycle is typically 18 months +- 6 months Input Data Files
CapitalIQ_FundingDataFile_20171115v1

Logic Steps for Gamma Script
Step 1: For every M&A target,
If ( # of funding rounds >= 2 for Transaction Status = (Announced / Effective / Closed) uptill measurement year), calculate the metric with below steps, else dont calculate this metric
sort CapitalIQ_FundingDataFile_20171115v1 as per Level 1 = Target / Issuer, level 2 = All Transactions Announced Date
Deviation between private funding rounds = (IF(Time diference between the last two rounds for Transaction Status = (Announced / Effective / Closed) uptill measurement year is less than 2 years, then assign value as +1, else assign value as -1)
Store Deviation between private funding rounds in Company Level Metric Data file - Gamma

Metric 44.1: Acceleration rate
Definition: this metric defines the rate at which the time is decreasing between the funding rounds of a company uptill measurement yea Input Data Files
CapitalIQ_FundingDataFile_20171115v1

Logic Steps for Gamma Script
Step 1: For every M&A target,
If (# of funding rounds >= 3 for Transaction Status = (Announced / Effective / Closed) uptill measurement year), calculate the metric with below steps, else dont calculate this metric
sort CapitalIQ_FundingDataFile_20171115v1 as per Level 1 = Target / Issuer, level 2 = All Transactions Announced Date
Acceleration rate = slope (compounded growth) of the time difference between the subsequent funding rounds for Transaction Status = (Announced / Effective / Closed) uptill measurement yea
Store Acceleration rate in Company Level Metric Data file - Gamma Example below for understanding:

FIG. 81F a) Calculate time difference between funding rounds and represent as below in an array

| Company | Diff b/w Round 1 and 2 | Diff b/w Round 2 and 3 | Diff b/w Round 3 and 4 | Diff b/w Round 4 and 5 . . | Acceleration rate |
|---|---|---|---|---|---|
| Company 1 | 5 | 4 | 2 | 6 | 0.33 = ((6-5)/3) |
| Company 2 | 5 | 4 | 3 | 2 | -1 = ((2-5)/3) |
| Company 3 | 5 | 10 | 15 | 17 | 4 = ((17-5)/3) | b) Calculate the acceleration rate as the slope of the company = (difference of time between last two rounds -- difference of time between first two rounds) / (total no. of rounds -2 c) Unit of the time difference to remain same (months / days)

Metric 45 : # of investors
Definition: This metric is the total number of investors invested in a company Input Data Files
CapitalIQ_FundingDataFile_20171115v1

Logic Steps for Gamma Script
Step 1: For every M&A target,
If (# of funding rounds >= 1 for Transaction Status = (Announced / Effective / Closed) uptill measurement year), calculate the metric with below steps, else dont calculate this metric
For all funding rounds where transaction status = (announced / effective / closed) uptill measurement year, Delimit the Buyers/Investors column by
# of investors = (No. of unique investors)
Store # of Investors in Company Level Metric Data file - Gamma
Also, store the name of unique investors in a permanent variable file (for use in other metrics

Metric 46 : Investor Stage
Definition: This metric reflects the funding stage a company has reached normalised by the year in which the company was founded Input Data Files
CapitalIQ_FundingDataFile_20171115v1
Quid Raw Data File of Targets... for deriving Founding Year (use any file which may have founding years for the data set Logic Steps for Gamma Script
Step 1: For every M&A target having founding year <= measurement year,
If (# of funding rounds >= 1 for Transaction Status = (Announced / Effective / Closed) uptill measurement year), calculate the metric with below steps, else dont calculate this metric
sort CapitalIQ_FundingDataFile_20171115v1 as per Level 1 = Target / Issuer, level 2 = All Transactions Announced Date
For all Transaction Status = (Announced / Effective / Closed) uptill measurement year, store Round Type in an array
Investor Stage = max rank in the round type array / (Measurement Year - Founding Year +1)
Store Investor Stage in Company Level Metric Data file - Gamma

| Rank Table | |
|---|---|
| Angel | 1 |
| Seed | 2 |
| Series A | 3 |
| Series B | 4 |
| Series C | 5 |
| Series D | 6 |
| Series E | 7 |
| Series F | 8 |
| Series G | 9 |
| Series H | 10 |
| Venture | 6.5 |
| Growth | 11 |
| Debt | 0 |
| PIPE | 11 |

Example: A company founded in 2010 has 4 funding rounds before measurement year (2014) with round types angel , series A, series C, growth. Then investor stage = (rank of growth = 11)/(2014 - 2010 + 1)

FIG. 81F (CONTINUED)

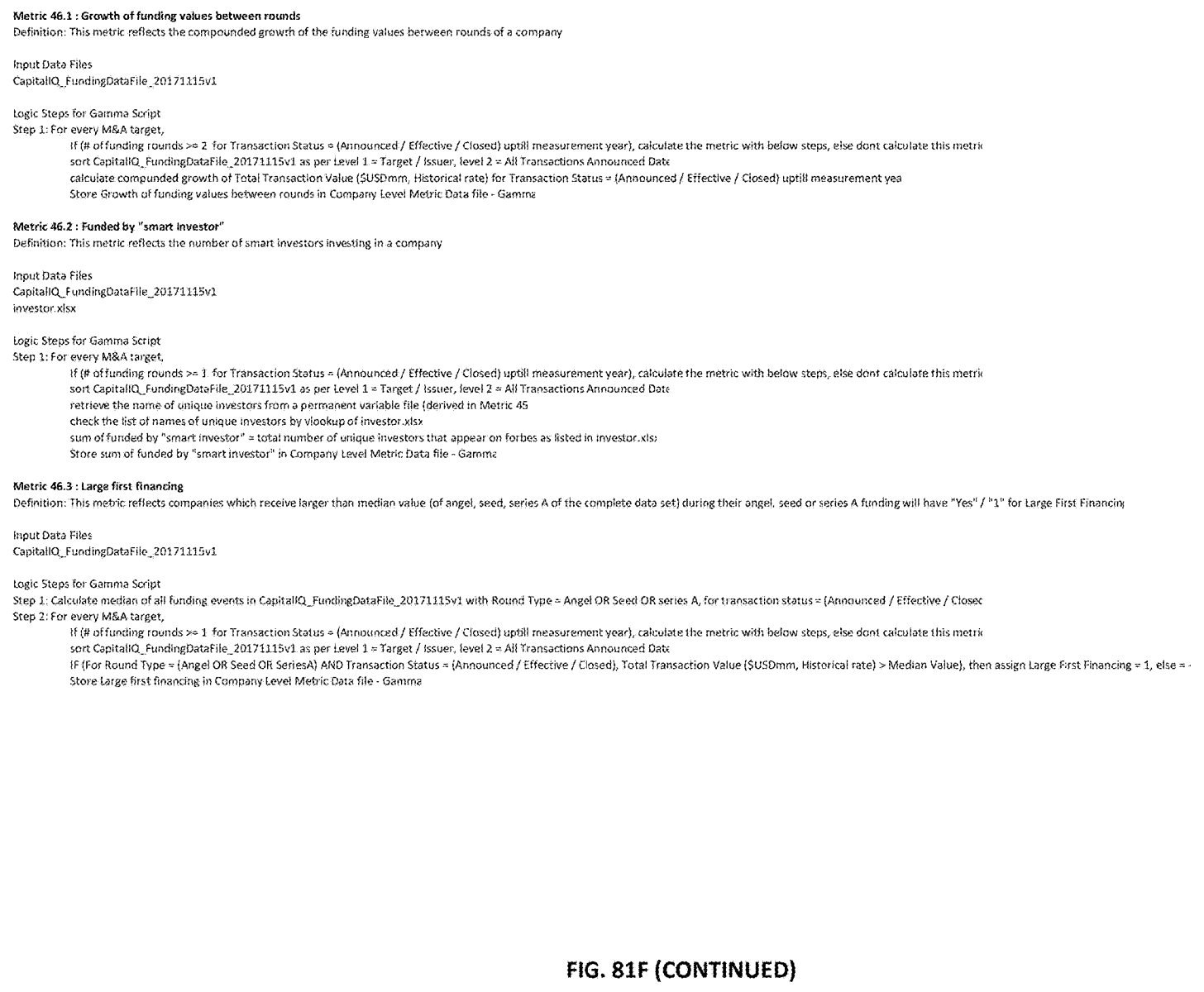

Metric 46.1 : Growth of funding values between rounds
Definition: This metric reflects the compounded growth of the funding values between rounds of a company Input Data Files
CapitalIQ_FundingDataFile_20171115v1

Logic Steps for Gamma Script
Step 1: For every M&A target,
- If (# of funding rounds >= 2 for Transaction Status = (Announced / Effective / Closed) uptill measurement year), calculate the metric with below steps, else dont calculate this metri
- sort CapitalIQ_FundingDataFile_20171115v1 as per Level 1 = Target / Issuer, level 2 = All Transactions Announced Date
- calculate compunded growth of Total Transaction Value ($USDmm, Historical rate) for Transaction Status = (Announced / Effective / Closed) uptill measurement yea
- Store Growth of funding values between rounds in Company Level Metric Data file - Gamma

Metric 46.2 : Funded by "smart investor"
Definition: This metric reflects the number of smart investors investing in a company Input Data Files
CapitalIQ_FundingDataFile_20171115v1
investor.xlsx Logic Steps for Gamma Script
Step 1: For every M&A target,
- If (# of funding rounds >= 1 for Transaction Status = (Announced / Effective / Closed) uptill measurement year), calculate the metric with below steps, else dont calculate this metri
- sort CapitalIQ_FundingDataFile_20171115v1 as per Level 1 = Target / Issuer, level 2 = All Transactions Announced Date
- retrieve the name of unique investors from a permanent variable file (derived in Metric 45
- check the list of names of unique investors by vlookup of investor.xlsx
- sum of funded by "smart investor" = total number of unique investors that appear on forbes as listed in investor.xls
- Store sum of funded by "smart investor" in Company Level Metric Data file - Gamma

Metric 46.3 : Large first financing
Definition: This metric reflects companies which receive larger than median value (of angel, seed, series A of the complete data set) during their angel, seed or series A funding will have "Yes" / "1" for Large First Financing Input Data Files
CapitalIQ_FundingDataFile_20171115v1

Logic Steps for Gamma Script
Step 1: Calculate median of all funding events in CapitalIQ_FundingDataFile_20171115v1 with Round Type = Angel OR Seed OR series A, for transaction status = (Announced / Effective / Closed
Step 2: For every M&A target,
- If (# of funding rounds >= 1 for Transaction Status = (Announced / Effective / Closed) uptill measurement year), calculate the metric with below steps, else dont calculate this metri
- sort CapitalIQ_FundingDataFile_20171115v1 as per Level 1 = Target / Issuer, level 2 = All Transactions Announced Date
- IF (For Round Type = (Angel OR Seed OR SeriesA) AND Transaction Status = (Announced / Effective / Closed), Total Transaction Value ($USDmm, Historical rate) > Median Value), then assign Large First Financing = 1, else = -
- Store Large first financing in Company Level Metric Data file - Gamma

FIG. 81F (CONTINUED)

SYSTEMS AND METHODS FOR PROCESSING INFORMATION

CROSS-REFERENCE TO RELATED APPLICATIONS

The present application is a Continuation-in-Part of U.S. patent application Ser. No. 16/668,835, filed Oct. 30, 2019, and is a Continuation-in-Part U.S. patent application Ser. No. 16/691,341, filed Nov. 21, 2019, which claims priority to U.S. provisional Ser. No. 62/770,455, filed on Nov. 21, 2018, titled "SYSTEMS AND METHODS FOR PREDICTING SUCCESSFUL INVESTMENT OPPORTUNITIES," the contents of each are incorporated herein by reference in their entireties.

BRIEF DESCRIPTION OF DRAWINGS

FIGS. 5-6 illustrate examples of how documents can be evaluated using cosine similarity, according to embodiments.

FIGS. 7-8 illustrate several linkage examples, and example suggested fields for a first pass semantic analysis, according to embodiments.

FIG. 9 illustrates some example methods for linking assets, including semantic count, semantic overlap, common linkages, and IPC distance, according to embodiments.

FIG. 10 provides additional example details on semantic count and semantic overlap, according to embodiments.

FIG. 11 illustrates examples of using co-occurrences to identify types of relationships between assets, according to embodiments.

FIG. 13 illustrates multiple types of direct/explicit ties and indirect/inferred ties, according to embodiments.

FIG. 15 illustrates how assets can be ranked and prioritized using network metrics to identify those likely to be most viable and/or valuable, according to embodiments.

FIG. 17 indicates that individual assets can be surfaced and ranked for ideation, according to embodiments.

FIG. 19 sets forth examples of clustering, according to embodiments.

FIGS. 20-21 illustrate various ways that clusters can be used and visualized in advanced linkages networks, according to embodiments.

FIGS. 22-26 illustrate specific metrics used to assess the importance, influence, connectivity and strength of tie between assets, entities, etc. in a network created using an advance linkages approach, according to embodiments.

FIGS. 29-30 illustrate example visualizations for a network, according to embodiments.

FIGS. 31 and 33 set forth additional details of the linkage system, according to embodiments.

FIGS. 34-37 illustrates details of FIG. 33, according to embodiments.

FIGS. 38-39 illustrates how data entry templates can be exported once user defined fields are created, according to embodiments.

FIGS. 40-42 illustrate example data entry sheets, according to embodiments.

FIGS. 43A-43M illustrate examples of templates, according to embodiments.

FIGS. 44-45 illustrates additional example details of how data can be entered and checked, according to embodiments.

FIGS. 46-62 illustrates additional example details of how weights can be assigned and calculations can be run, according to embodiments.

FIG. 63A-63B illustrates an example of determining a meta tie value in the python coding language, according to embodiments.

FIG. 64 illustrates an example of generating a meta asset value in the python coding language, according to embodiments.

FIG. 65A-65C illustrates an example of generating a network comprising patent publication asset nodes, scientific publications asset nodes, and company nodes, according to embodiments.

FIG. 66A-66C is an example of how the Latent Dirichlet Allocation algorithm may be used to assign a document to a topic, according to embodiments.

FIG. 67A-67D is an example of how sentences or paragraphs conforming to a given topic may be extracted from a document using a rule-based approach, according to embodiments.

FIG. 68 is an example of an output which may be generated by the rule-based sentence extraction illustrated in FIG. 67, according to embodiments.

FIG. 69A-69C is an example of how a file containing patent documents and associated attributes maybe loaded into a Neo4j Graph Database, according to embodiments.

FIGS. 72A-72F show example variables that can be used, according to embodiments of the invention.

FIGS. 73A-73F illustrates example data and variables that can be used, according to embodiments of the invention.

FIGS. 74A-74K illustrate example metrics that can be used, according to embodiments of the invention.

FIGS. 75A-75F illustrate example code that can be used, according to embodiments of the invention.

FIG. 76 sets forth an example filtering process, according to embodiments of the invention.

FIG. 77 illustrates a detailed example for predicting investment opportunities, according to embodiments of the invention.

FIG. 78 illustrates details of how a gradient boosting technique is trained, according to embodiments of the invention.

FIG. 79 illustrates details of how the trained gradient boosting technique is tested using cross-validation, according to embodiments of the invention.

FIGS. 81A-81F show example variable definitions, according to embodiments of the invention.

DETAILED DESCRIPTION OF EMBODIMENTS

System for Linking Documents

Figure 1:
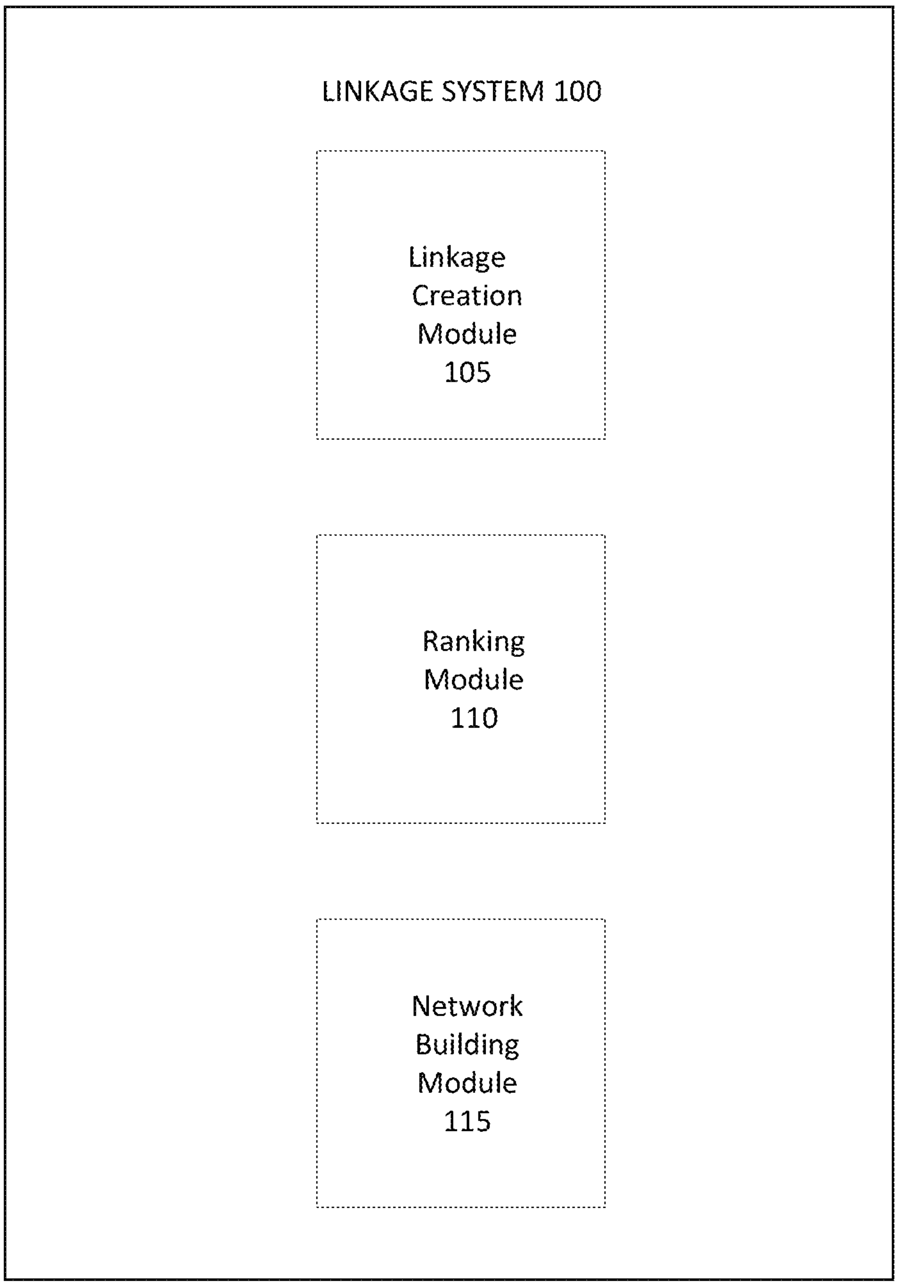
FIG. 1 illustrates a system for linking assets, according to embodiments.

FIG. 1 illustrates a system for linking assets (e.g., entities, documents (e.g., patents, articles, conferences, grants, funding events, web site information), technology codes, themes, industries, technologies, etc.) according to an embodiment. In the examples set forth below, many different types of assets (e.g., entities, documents, patents, people, social media data, news/media data, etc.) are linked (e.g., using features), but those of ordinary skill in the art will see that almost anything can be linked. FIG. 1 illustrates a linkage system 100 that comprises a linkage creation module 105, a ranking module 110, and a network building module 115. The linkage creation module 105 can identify linkages. The ranking module 110 can identify ties (e.g., clusters of similar assets using structural similarity, strength of tie, etc.) and provide a weight to each type of tie. The network building module 115 can build the network of linked assets. FIGS. 31 and 33 set forth additional details of the linkage system 100, according to embodiments of the invention.

In some embodiments, multiple types of ties (e.g., co-occurrence, structural occurrence, direct connection, semantic tie) can be weighted and combined into a single tie in a single network in order to evaluate similarity of assets. Different kinds of assets can be evaluated for similarity. The data and/or weighting information can be modified in order to tailor the network to accomplish different objectives. The assets and ties can be filtered. The data can be visualized in multiple node types and multiple data types.

In some aspects of the present disclosure, assets may be linked using various features. For example, if people are being linked, the features may comprise: job, education, authorships, or patents filed, or any combination thereof. If articles are being linked, features may comprise: topic category, times cited, data published, author, etc. If patents are being cited, features may comprises: times cited, inventors, assignee, data, number of inventors, etc. If companies are being cited, features may comprise: revenue, year founded, investment amount, description of business area, etc.

Method for Linking Entities

Figure 2:
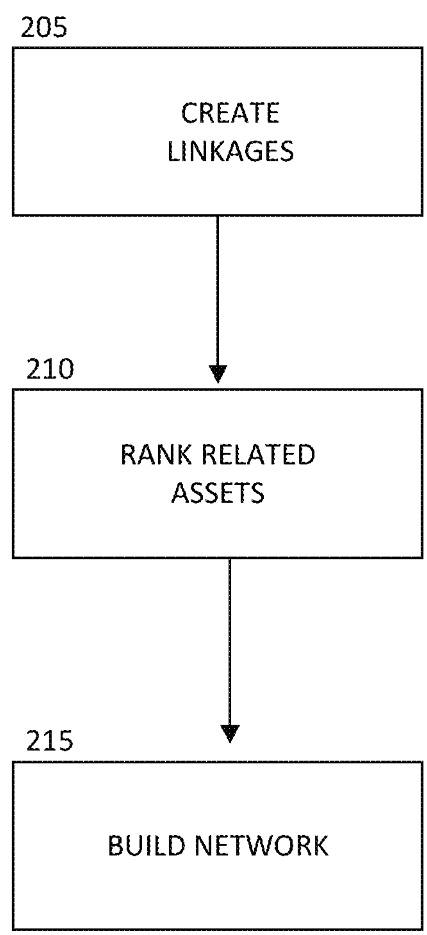
FIG. 2 illustrates a method for linking entities, documents or assets, according to embodiments.

FIG. 2 illustrates a method for linking entities, documents or assets, according to an embodiment. In 205, linkages can be created. In 210, related assets' similarity and/or strength of tie, etc. can be ranked. In 215, the network can be built.

Create Linkages

In 205, linkages can be created. For example, linkages can be suggested between entities, documents or assets that are similar. For example, co-occurrence ties, structural equivalence, direct/indirect ties, or any combination thereof, can be used to suggest and/or create linkages.

Co-Occurrence

For example, with respect to patents, co-occurrence ties can comprise: co-authorships, co-affiliations, same or similar citations (e.g., patents), or industry-specific information (e.g., clinical trial approved), and/or many other types of co-occurrences. FIG. 11 illustrates examples of using co-occurrences to identify six types of relationships between assets: patent to patent, expert to expert, bundle to bundle, patent to expert, expert to bundle, and bundle to patent.

Structural Equivalence

Figure 12:
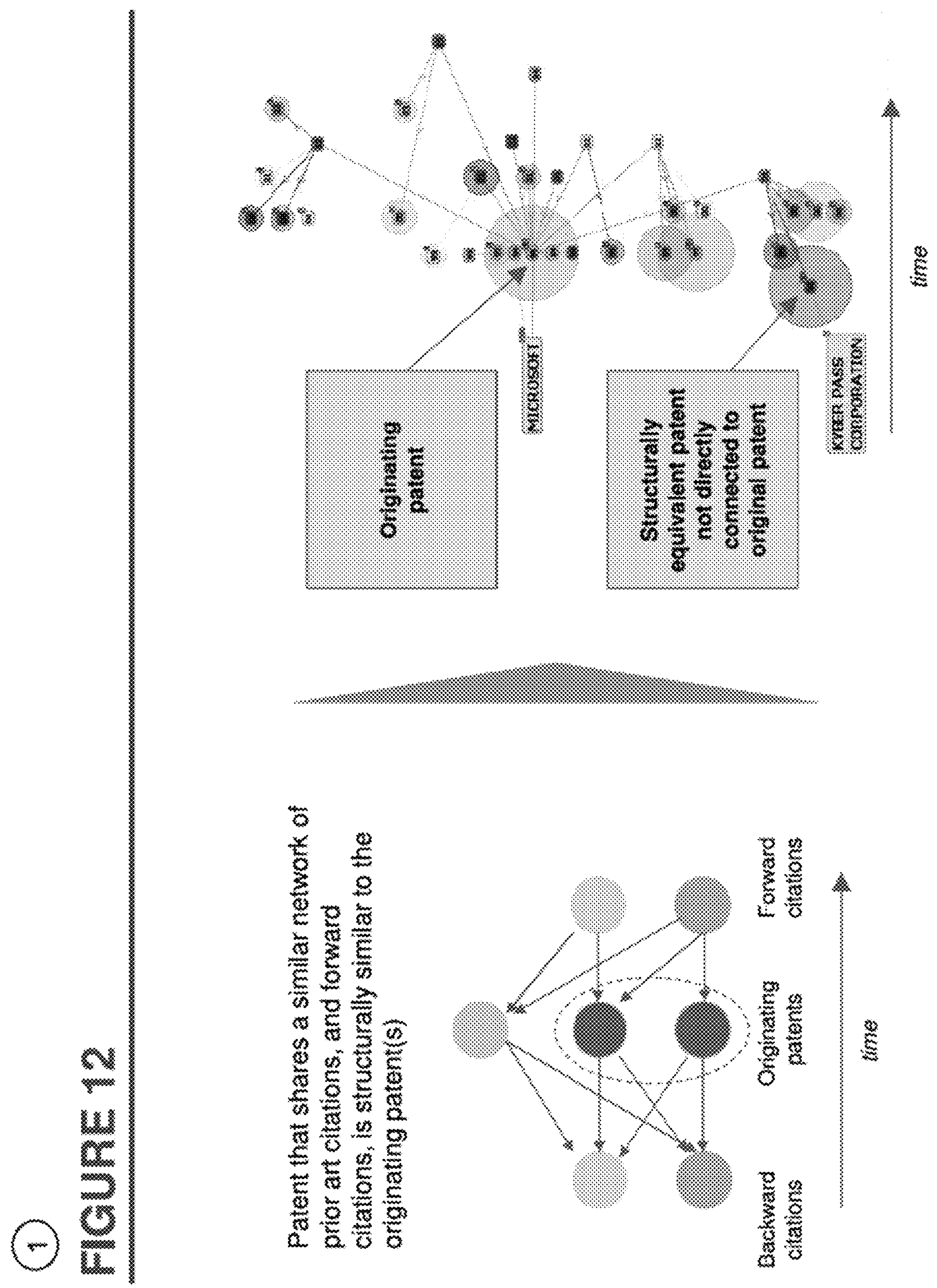
FIG. 12 illustrates an example of structural equivalence, according to embodiments.

Structural equivalence can identify related assets based on similarity of connections to other assets. FIG. 12 illustrates an example of structural equivalence. As shown in FIG. 12, a patent can share a similar network of backward (e.g., prior art) citations, and forward citations. These citations can indicate that a given patent is similar or connected to other patents because the prior art and forward citations are shared by/to the originating (given) patent(s), making them structurally equivalent even though they are not directly connected.

Direct/Indirect Ties

FIG. 13 illustrates multiple types of direct/explicit ties (e.g., one patent cites another) and indirect/inferred (e.g., shared author, semantically similar, shared DWPI keywords, shared IPC codes, shared institution owner) ties that can exist between patent x and patent y (e.g., authors, codes (e.g., International Patent Classification codes), third-party identified patent keywords (e.g., Derwent Worldwide Patent Index (DWPI) terms)).

The frequency and weight of each can be combined to create a single weighted score (e.g., a cumulative weight) for each tie. (The weight can be pre-defined and/or determined with an algorithm.) This can be done to identify unique co-occurrences, calculate the frequency/strength of the co-occurrence tie (e.g., the number of times authors co-authored together). The cumulative weight can cumulate different co-occurrence and direct ties between assets, and can be based on the relative weighting of the type of tie.

Figure 14:
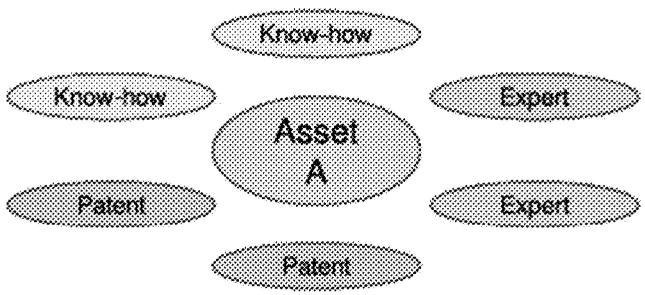
FIG. 14 illustrates how assets can be ranked using the strength of connection based on the relative strength of cumulated ties to a given asset, according to embodiments.

FIG. 14 illustrates how assets can be ranked using the strength of connection (e.g., "more like this") based on the relative strength of cumulated ties to a given asset.

Examples of properties used for ranking can be: asset type, asset name, strength of relationship to the asset of interest, and the rank. FIG. 14 illustrates how asset A is related to other things of interest to determine a value for asset A.

Figure 3:
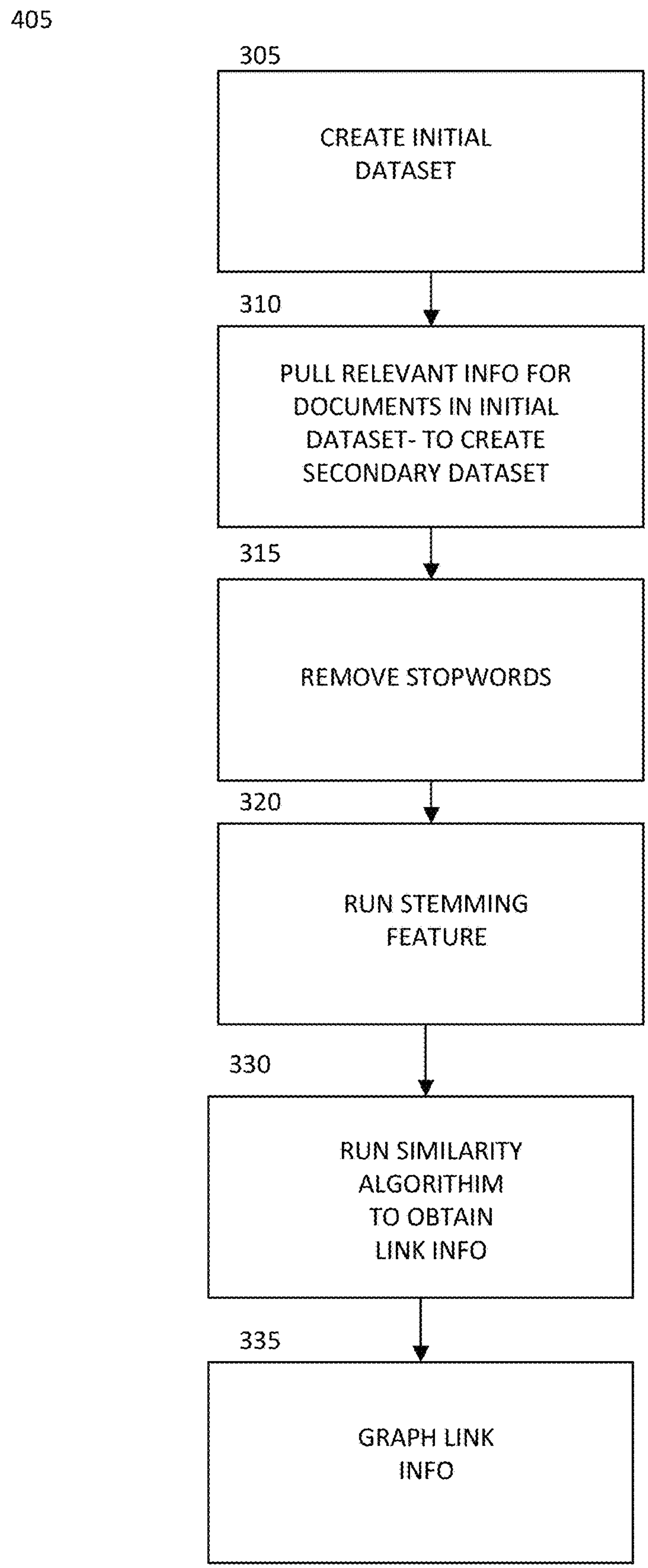
FIG. 3 illustrates an example of creating links, according to embodiments.

FIG. 3 illustrates an example of creating links, according to an embodiment. In the example of FIG. 3, patents are used as the documents that are being linked, but those of ordinary skill in the art will see that many types of documents, entities, people, or other assets can be linked. (e.g., scientific articles, conference abstracts, new articles, company financial data, analyst reports, company transactions data). In 305, an initial dataset of documents can be created. By way of example, documents from several companies (e.g., International or global companies, medium sized companies or startups) and/or several technology areas (e.g., Artificial Intelligence, biotech, 3D printing, etc.) can be used as an initial data set. For example, 6000 patents from several companies and technology areas can be used as the initial data set.

In 310, all relevant information for the entities or documents in the initial set of documents can be pulled. For example, all forward and/or backward citations and all family members of the 6000 patents in the initial dataset example can be used to create a secondary dataset. For example, as shown in FIG. 10, if patents are being reviewed, forward citation patents and patent applications, backward citation patents and patent applications, or family member patents and patent applications, or any combination thereof, can be pulled. (Those of ordinary skill in the art will see that other types of documents can also be pulled.) In this manner, a large number of records can be pulled (e.g., approximately 160,000 records from the initial data set of 6000 records in this example) as a secondary dataset.

FIGS. 7 and 8 illustrate several linkage examples, and example suggested fields for a first pass semantic analysis. Each document type in the secondary dataset can have multiple semantic fields associated with the document type, which semantic fields can then be assessed and matched against semantic fields associated with other documents. For example, terminology used in the title and/or abstract of a patent may have some similarities (e.g. matching words) to the terminology used in the description of a product or technology, or the credentials description of an expert Cleaning and curation of text data can help effectively use semantic matching to identify linkages. In 315, basic stopwords (e.g., using a Natural Language ToolKit library) can be removed. For example, the frequently occurring words can be used as stopwords (e.g., 'the', 'and', 'or) and can be removed. In 320, a stemming feature can be run (e.g., algorithmic, dictionary) to associate common words. For example, the words "process, processing, processes" can all be associated together as "process".

In 330, a similarity algorithm (e.g., a cosine similarity algorithm, Euclidean distance; Manhattan distance, Minkowski distance, Jaccard similarity, or any combination thereof) can be run against all the documents (e.g., the patents). For example, key fields (e.g., title, abstract, independent claims) can be text mined for each document in the secondary data set to come up with a word count for each key field of each document. See FIG. 7 for examples of key fields for patents, experts, know-how and technologies. For example, for each patent in the secondary data set, certain sections (e.g., the title, abstract, and independent claims) can be text mined to come up with a frequency distribution (e.g., a number of times each word appears in these sections) for each of the sections (e.g., each of the title, abstract and independent claims sections) of each patent.

FIG. 9 illustrates some example methods for linking assets, including semantic count, semantic overlap, common linkages, and IPC distance. FIG. 10 provides additional details on semantic count and semantic overlap.

Referring back again to FIG. 3, the output of 330 can be an M×M matrix containing a score between each document (e.g., patent), where M is the number of documents (e.g., patents). The score can indicate links between the various documents (e.g., patents) and assess their strength. For example, FIGS. 5-6 illustrate an example of a cosine similarity algorithm that can be used to assess text similarity based on word count. Those of ordinary skill in the art will see that many other algorithms exists and can be applied in this context.

Examples 1 and 2 of FIG. 5 illustrate an example of how documents can be evaluated using cosine similarity. Two documents can be evaluated to have a score between 1 and 1, where 1 is a perfect match and 0 is no match. In Example 1 of FIG. 5, document A has 2 instances of the word "Paris" and 0 instances of the word "London". Document B has 0 instances of the word "Paris" and 2 instances of the word "London". The angle between the two document vectors can be calculated to be 90 degrees, the cos (90 degrees)=0, and thus the two documents are not similar.

In Example 2 of FIG. 5, document A has 1 instance of the word "Paris" and 1 instance of the word "London". Document B has 2 instances of the word "Paris" and 0 instances of the word "London". The angle between the two document vectors can be calculated as 45 degrees, the cos (45 degrees)=. 7, and thus the two documents are not similar.

FIG. 6 illustrates another example of how documents can be evaluated using cosine similarity. In 601, two example texts are given. In 602, the texts are translated to vectors. In 603, their cosines are calculated using a cosine similarity algorithm. In 604, the cosines are recorded in a M by M matrix. The cosine similarity scores can be recorded between each asset and every other corresponding asset in the database. The matrix can be collapsed into 3 columns, with asset 1, asset 2, and the cosine score.

In 335, the data from 330 can be pulled into a graph database. A graph database allows the data to be linked multiple ways and with varying types of ties and strengths of ties.

Rank Related Assets' Similarity by Strength of Tie

In 210, related assets', entities' or documents' similarity or strength of tie can be ranked. For example, any co-occurrences and/or structural equivalents, and/or direct ties between any two assets can be cumulated and/or measured. The ranking can be done by ranking assets by strength of connection and/or by prioritization (e.g., likely viability/value). The strength of connection (e.g., "more like this") rank can be based on a weighted average strength of tie of accumulated co-occurrences and direct ties for any given relationship between two assets. The prioritization can be done using, for example, any of the following: centrality, eigenvector centrality, or weighted influence (e.g., modified Katz metric), or any combination thereof.

FIG. 15 illustrates how assets can be ranked and prioritized using network metrics to identify those likely to be most viable and/or valuable. Network ties can link assets in the group. The ties can reflect similarity and/or influence between assets. For example, FIG. 15 indicates that centrality can measure connected-ness of an asset within a group of assets, and can be used to identify assets most central to the network. Eigenvector centrality can measure connected-ness of a given asset to other well connected assets. An asset's centrality can be proportional to the sum of centralities of those it has ties to, and can determine the assets which are most central to the overall network, by virtue of their connection to other well connected assets.

FIG. 17 indicates that individual assets can be surfaced and ranked for ideation. Emerging clusters of assets can be identified. Betweenness centrality can identify the number of times that a node lies along the shortest path between two others. It can measure an asset's role in linking different assets in the network. It can be used to identify patents and assets most likely to be highly innovative/leading edge, within a given results set. Bridges can describe assets that connect otherwise unconnected assets. Bridges can sit at the confluence of otherwise unconnected networks and can be a source of new ideas and have a performance advantage by virtue of their position. Bridges can identify innovative and/or leading edge assets and can identify potentially higher performing assets. Burt's constraint metric and/or a betweenness centrality metric are examples of measuring which nodes in a network have a strong bridging connection and may indicate innovation. See, e.g., Burt, Ronald, The Source of Good Ideas (2001); Feb. 15, 2019 Structural Holes Wikipedia page (e.g., https://en.wikipedia.org/wiki/Structural_holes), and the Feb. 15, 2019 Betweenness Centrality Wikipedia page (e.g., https://en.wikipedia.org/wiki/Betweenness_centrality). Those of ordinary skill in the art will see that other measures may be used.

Build Network

Figure 16:
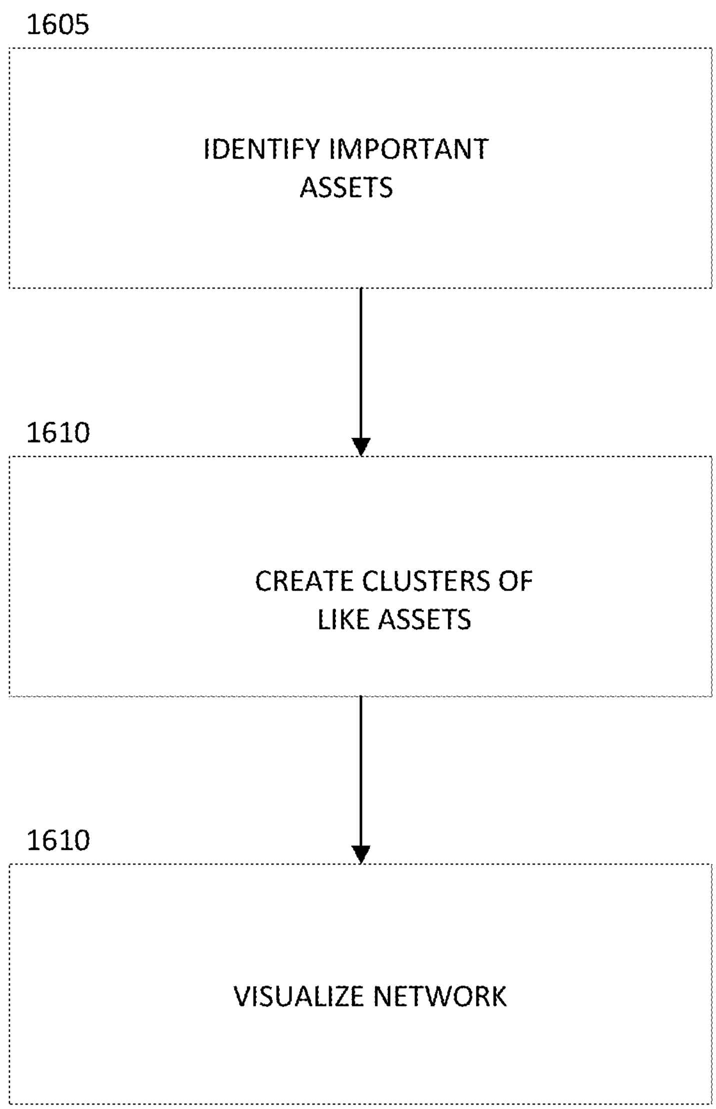
FIG. 16 sets forth an example process for how the network can be built, according to embodiments.
Figure 18:
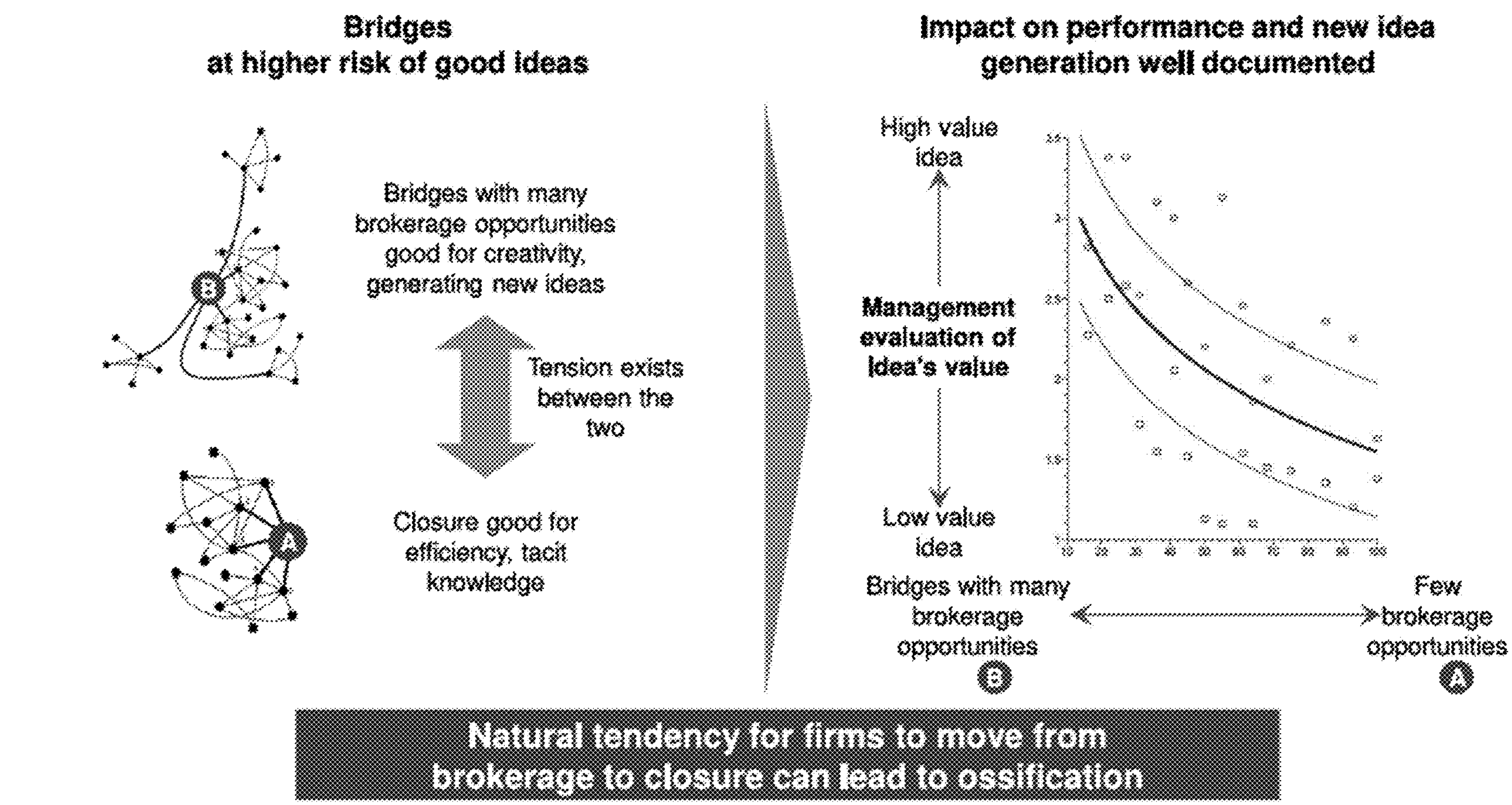
FIG. 18 illustrates an example of how bridges may be used to determine potential sources of innovation, according to embodiments.

In 215, the network can be built. FIG. 16 sets forth an example process for how the network can be built. In 1605, potential individual assets most likely to be highly innovative and/or leading edge can be identified based on their position in the network. Betweenness centrality and/or bridging can be used to identify emerging clusters of assets or assets that are mostly likely to sit at the intersection of previously disconnected networks of assets, and therefore may be more likely to signal innovation. Bridges can bring together different ideas from diverse networks and may therefore be more likely to be novel or innovative. FIG. 18 illustrates an example of how bridges may be used to determine potential sources (e.g., people, companies, technologies, concepts, themes) of innovation. FIG. 18 illustrates how brokerage opportunities may be good for creativity and generating new ideas. However, closure is good for efficiency and/or tacit knowledge. Tension can exist between these two concepts. For example, person B can be connected to clusters of people who are not highly connected. Thus, she may have a bigger opportunity to play a bridging or brokerage role. Person A can be connected to clusters of people who are already highly connected. Thus, he may have limited opportunity to play a bridging or brokerage role.

Figure 21:
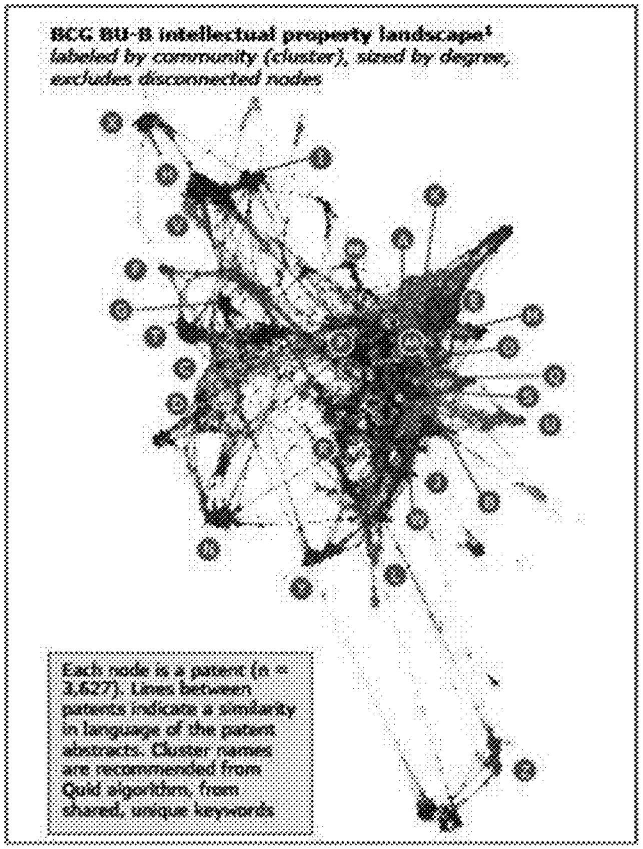

In 1610, clusters of like assets can be identified (e.g., using structural similarity, strength of tie). For example, clustering can be used to determine assets that have interconnections with other assets. Clustering algorithms can suggest groupings of nodes based on how connected they are to one another. Clustering algorithms can identify clusters of similar nodes (e.g., with shared attributes or shared patterns of attributes). Clustering can comprise: geographic clusters, semantic clusters, code clusters. FIG. 19 sets forth examples of clustering. Semantic clustering can be a cosine score that becomes a weighted strength of tie between individual nodes. Semantic clustering can identify clusters of thematically-similar nodes. FIGS. 20-21 illustrate various ways that clusters can be used and visualized in advanced linkages networks.

In 1615, the network can be visualized. For example, software (e.g., QUID, TOUCHGRAPH, N'COMPASS) can use semantic clustering to help with ideation. Network metrics and analysis can be integrated. FIGS. 29-30 illustrate example visualizations for a network.

Mapping Database Tool

FIG. 29 illustrates an example overview of a mapping database tool that can be used to do network mapping and analysis. It may facilitate data entry, compilation and analysis. It can calculate the importance and influence for organizations and individuals. It can conduct error checking and assist with data cleaning/consistency. It can also generate output data for use in network visualization tools.

In one embodiment, the mapping database tool can comprise a series of EXCEL worksheets and a user-friendly interface and calculation engine in ACCESS. FIG. 29 illustrates various analyses and outputs such as: the importance/influence of organizations 2905; the importance for two different objectives 2910; and the importance/influence of individuals 2915. FIG. 29 also illustrates how connections 2920 of any individual can be looked up. 2925 show how an individual can be selected. In 2930, a list of organization memberships, authorships, and connections for the selected person can be created by clicking on various lists, organizations, articles, or other connections, or any combination thereof. In 2935, the list of entities or assets (people, in this case) and their various connections are shown in an easy look-up format.

FIG. 30 illustrates another example overview of the mapping database tool. 3005 shows a high level view of a network. 3010 shows an individual to individual network. 3015 shows an individual drill-down network. 3020 show an organization to organization network map. 3025 shown an organization drill down network. 3030 shows a subset inclusion and coloring network.

Navigation Tool

FIG. 31 illustrates an example navigating tool. In 31A, user defined attribute variable fields for organizations, publications, and individuals can be specified. In 31B, templates can be exported (e.g., to EXCEL) and can be used to set up categories and sub-categories for organizations and publications. In 31C, data (e.g., using ACCESS or EXCEL) can be edited and cleaned. In 31D, weights can be assigned, calculations can be run, and data can be analyzed. In 31E, the data can be exported.

FIG. 33 illustrates another example overview of the navigation process. In 33A, relevant categories and/or activities for defining stakeholders and/or connections can be determined. In 33B, user defined fields and/or attributes can be specified. In 33C, data can be collected, input and checked. In 33D, weights can be assigned and calculations can be run. In 33E, output can be created.

Figure 32:
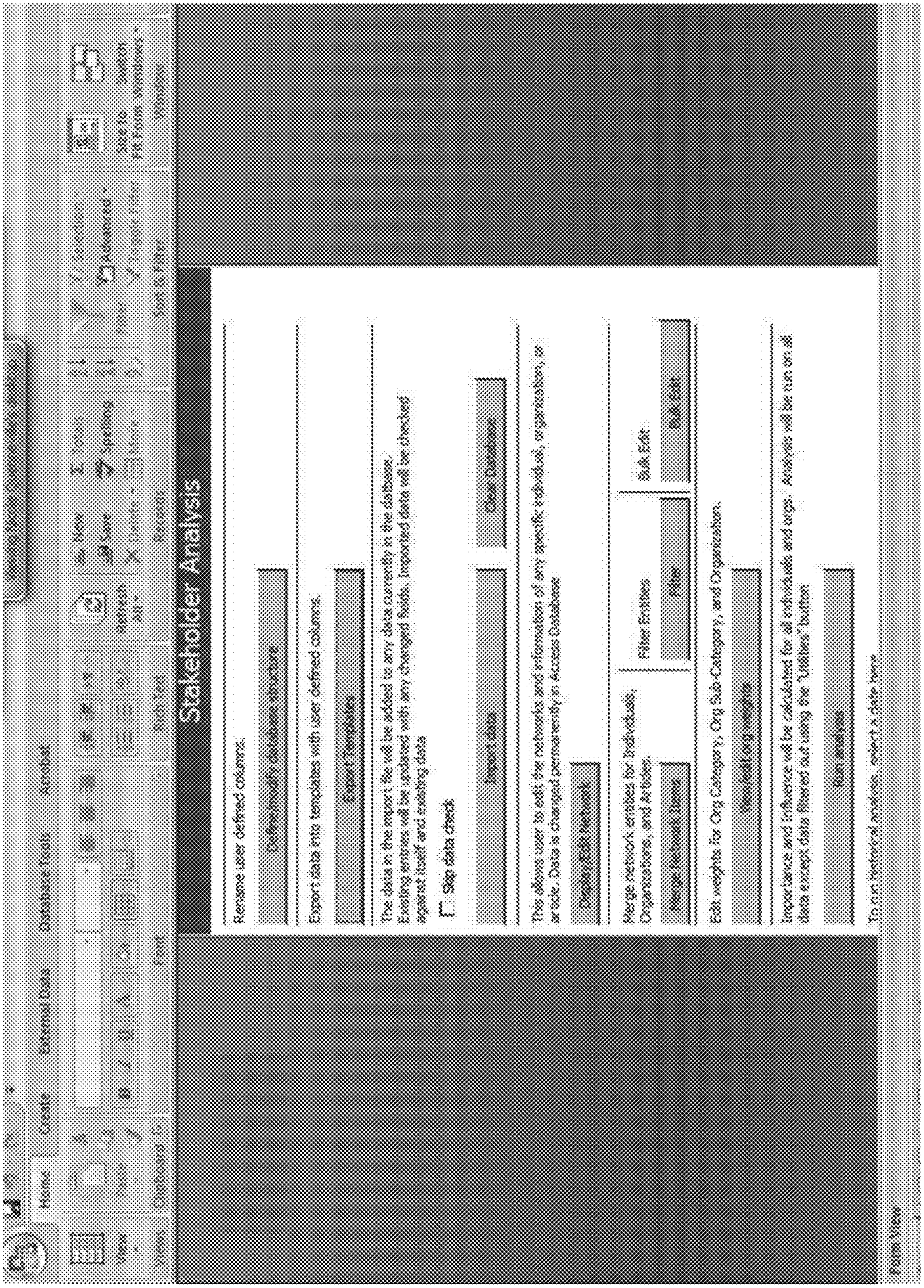
FIG. 32 illustrates an example screen shot for implementing the processes of FIGS. 31 and 33, according to embodiments.
Figure 56:
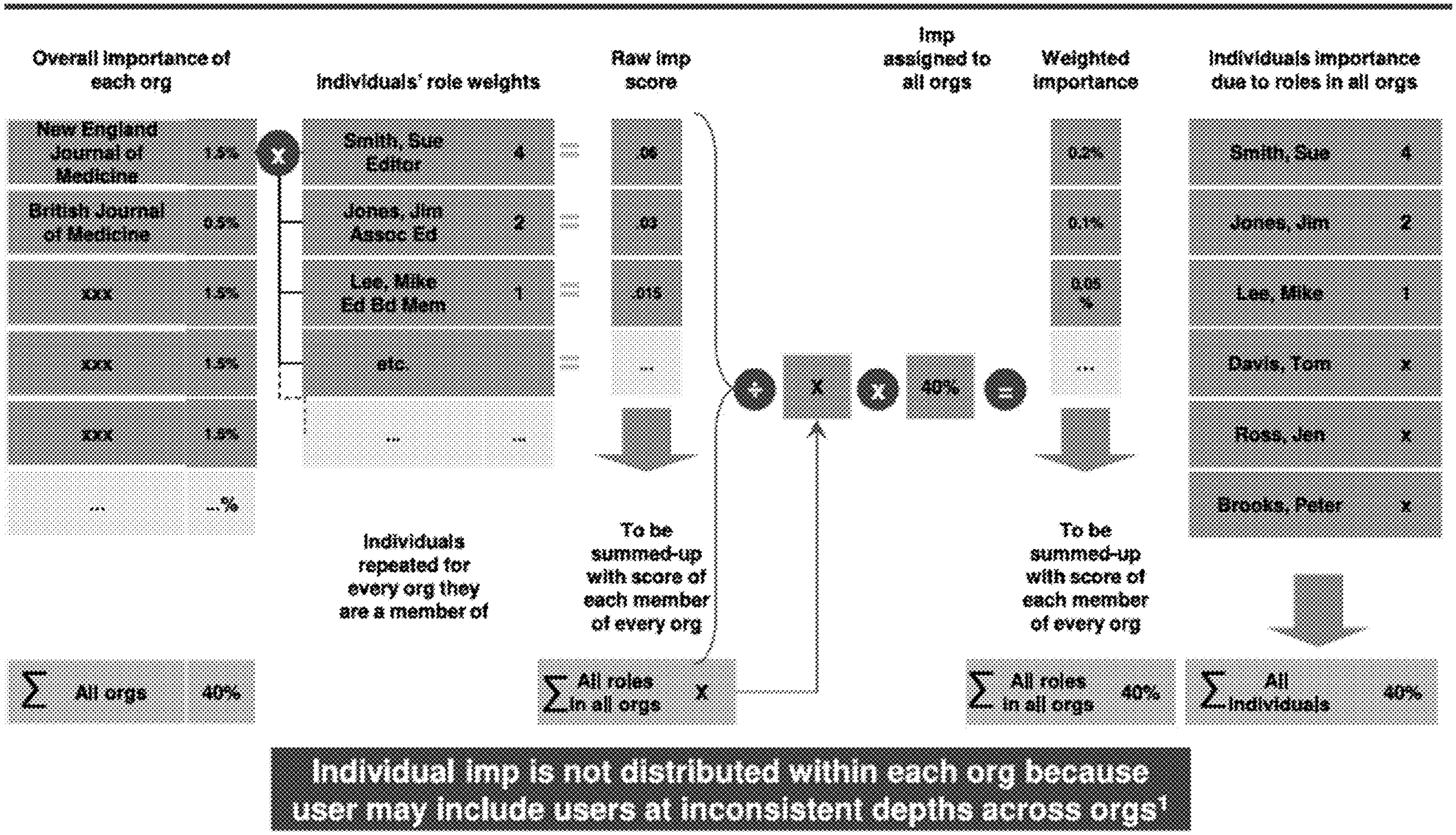

FIG. 32 illustrates an example screen shot for implementing the processes of FIGS. 31 and 33.

Define/Modify Database Structure (e.g. Stakeholders, Connections)

FIG. 34 illustrates details of 33A of FIG. 33, according to an embodiment, where examples of relevant categories and/or activities for defining entities or assets (in this case “stakeholders”) and/or connections are shown. Examples of entities comprise: government authorities, payers and access bodies, private sector, medical community, patients and public, informal connections. Those of ordinary skill in the art will see that many other types of categories and/or activities can be used.

FIG. 35 illustrates additional details of 33A, including an example of how chosen categories and subgroups of these can be entered into a system (e.g., in EXCEL). The highest level organization categories can be entered. Then subcategories can be entered, along with information about which category it belongs to. Specify User Defined Fields and/or Attributes. FIG. 36 illustrates example details of 33B of FIG. 33, including how user defined fields and/or attributes can be specified. The user defined columns can pertain to attribute data. The definition of these can depend on the individual case. In this example, up to five numeric attributes, and five text attributes, can be allowed per entity. Those of ordinary skill in the art will see that many other numbers of attributes can be entered.

FIG. 37 illustrates additional example details of 33B, including how determining which attributes to include depends on the questions that need to be answered and needed data cuts. Examples of attributes that can be used in various embodiments are shown.

FIG. 38-40 illustrates how data entry templates can be exported (e.g., to Excel) once user defined fields are created. FIG. 39-42 illustrate example data entry sheets. FIG. 43A-43M illustrates examples of templates (e.g., using ACCESS). Input Data. FIGS. 41-42, and 45 illustrate additional example details of how data can be entered and checked (e.g., as set forth in 33C of FIG. 33 above), including how errors can be reported out and fixed. Error checking can happen automatically when data is imported. An error report can automatically be generated and saved.

The error report can highlight problems and where they are occurring. The errors can be directly edited in the worksheet and be re-imported.

Figure 4:
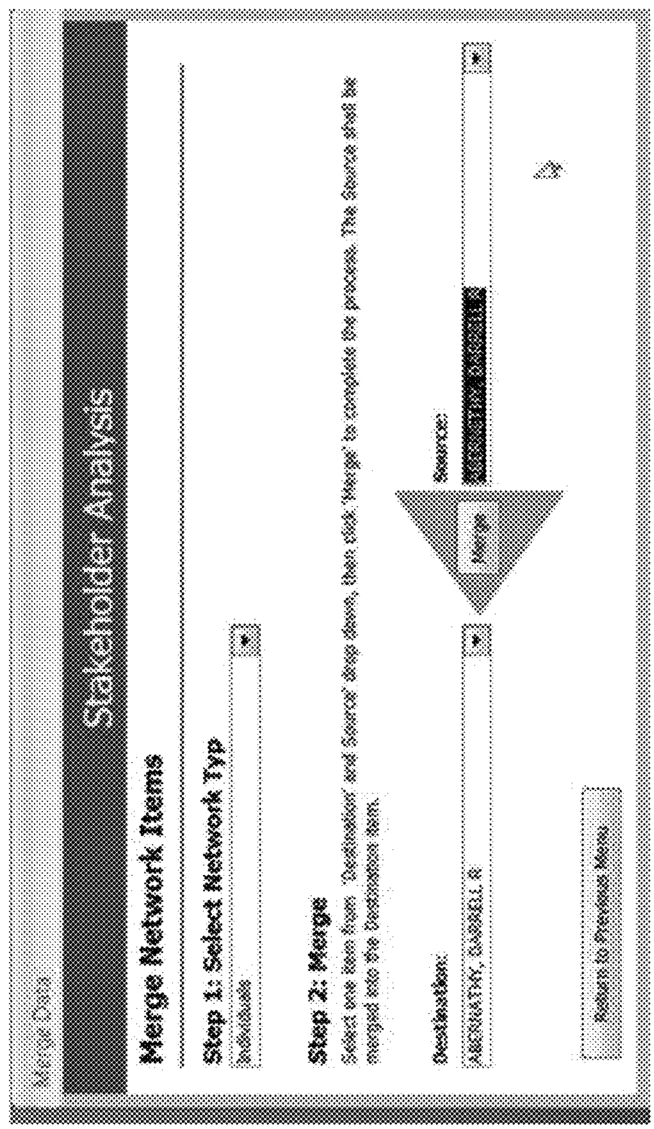
FIG. 4 illustrates examples data functions, wherein data can be merged, updated, filtered, or any combination thereof, according to embodiments.
Figure 27:
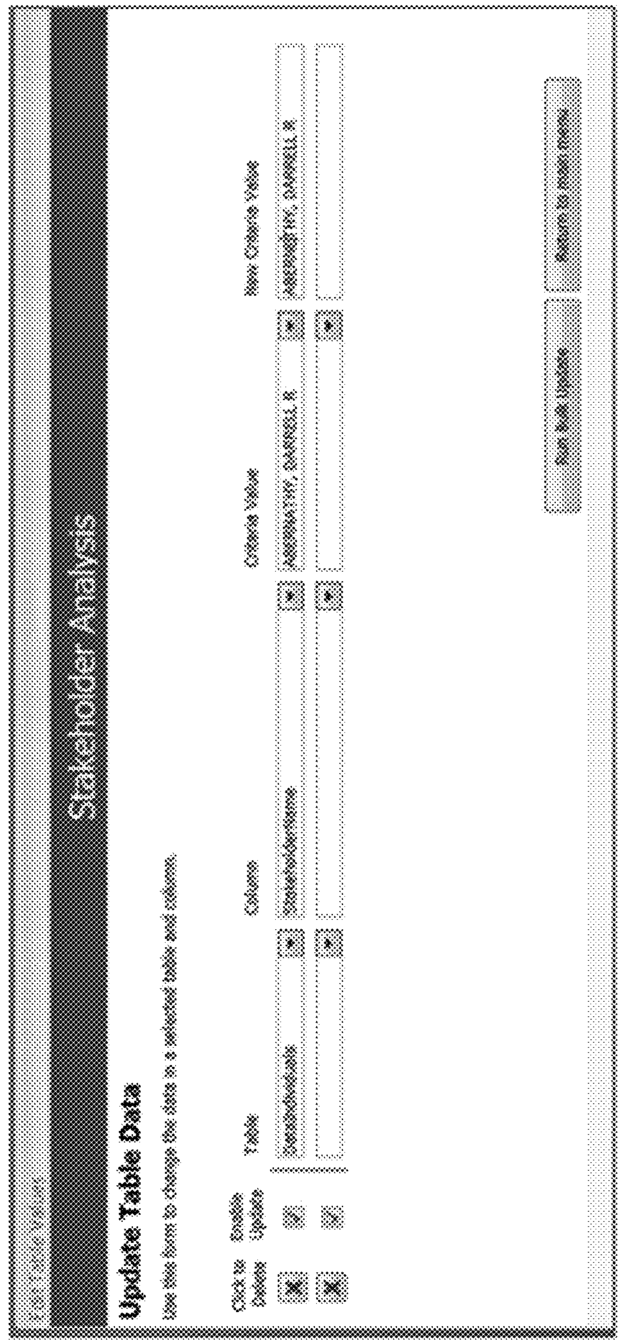
FIGS. 27-28 illustrate examples data functions, wherein data can be merged, updated, filtered, or any combination thereof, according to embodiments.
Figure 28:
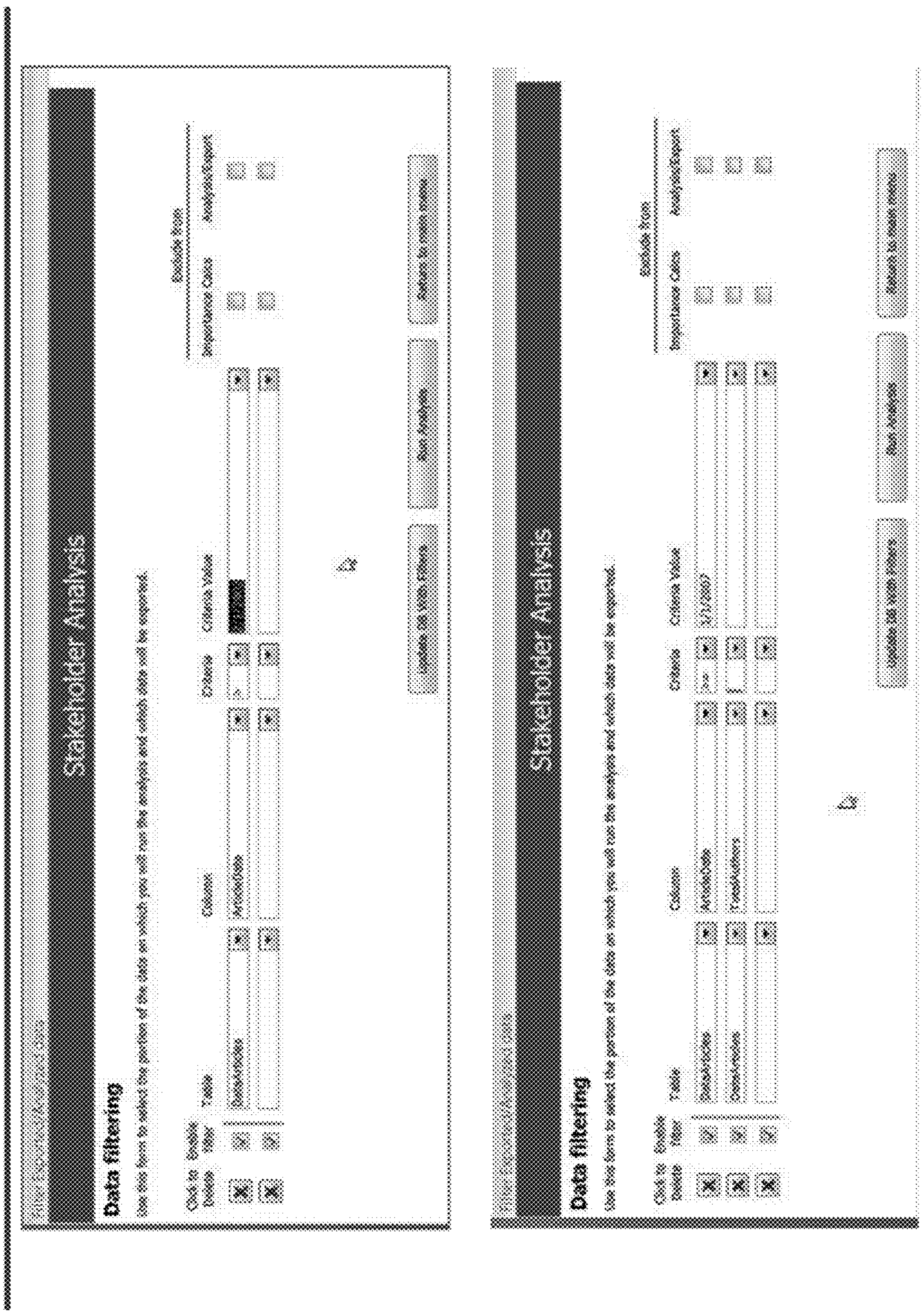

FIGS. 4, and 27-28 illustrate examples data functions, wherein data can be merged, updated, filtered, or any combination thereof, according to embodiments of the invention.

Weighted Influence Metrics

As discussed in FIG. 33 above, in 33D, metrics can be weighed. FIGS. 22-26 highlight specific metrics used to assess the importance, influence, connectivity and strength of tie between assets, entities, etc. in a network created using an advance linkages approach. FIG. 22 illustrates how stakeholder network metrics can vary in terms of complexity. In a simplified approach, decision criteria can be built in, intuitive, simple, and easy to communicate. In a moderately sophisticated approach, the decision criteria can be built in (e.g., with exception of betweenness centrality) and reasonable to communicate. In a more sophisticated approach, the decision criteria can generate externally complex algorithms, be time consuming, and be difficult to explain. For all types of decision criteria, an importance score can be determined by summing individual weights. FIG. 22 illustrates that many different types of metrics can be used to determine important connectivity in a network. FIG. 22 illustrates examples of combinations of metrics that can be used for simplified, moderate and sophisticated approaches. For example, a Burt's metric, Katz centrality metric, or Freeman metric (or some modification of one of these), or another metric (e.g., an another third party metric, or an internal metric), or any combination thereof can be used. See, for example: Feb. 15, 2019 Structural Holes Wikipedia page (e.g., https://en.wikipedia.org/wiki/Structural_holes); Feb. 15, 2019 Katz Centrality Wikipedia page (e.g., https://en.wikipedia.org/wiki/Katz_centrality), and Feb. 15, 2019 Centrality Wikipedia page (e.g., https://en.wikipedia.org/wiki/Centrality).

FIG. 23 illustrates how an influence score can display the importance of each stakeholder's network. For example, for the importance metric, bubble sizes can represent cumulative weighted importance scores for the assets. Two separate metrics can be calculated in some embodiments: simple influence, weighted influence. The connections between the assets can also be shown. When the two graphs in FIG. 23 are combined, one can see that A has the highest influence score, driven by the level of importance of those to which A is connected.

FIG. 24 illustrates an example of a simple influence. A challenge can be to determine which individuals exert control over the network by virtue of their own importance, as well as by virtue to the importance of those to whom they are connected. Both the number of people in individual A's ego net, and their importance, need to be taken into account when determining influence. A simplified way to get a relative sense of influence is to add the importance scores of the assets (e.g., people) in an individual network. For the network in FIG. 24, this can be: influence of (A)=importance of C+ importance of E. Thus, the influence of A=6=1+5.

FIG. 25 illustrates an example of a weighted influence. A challenge can be that most individuals have much stronger ties with some of the individuals in the network as opposed to others. The strength of tie between A and C can be a probability that C will pass a piece of information to A. This can consider all co-authorships/memberships connecting the individuals. Strengths of ties do not need to be directional. In FIG. 25, individual A can have a much greater chance of influencing the network if she has a strong tie with E. A way to determine the weighted influence of A=[importance of C×strength of tie of (A to C)]+[importance of E×strength of tie of (A to E)]. Thus, in FIG. 23, A=[1 X.2]+[5 X.3]=.2+1.5=1.7.

FIG. 26 illustrates how connectivity and influence can be calculated using a three step process. In 2605, connections can be catalogued and weighed. This can catalogue all links between all individuals (e.g., due to co-memberships, co-authorships). The weight strengths of ties between individuals can return a probability that information can be passed from individual X to Y.

FIGS. 46-62 illustrates additional example details of how weights can be assigned and calculations can be run.

Output

As discussed above with respect to FIG. 33, in 33E, output can be created. FIGS. 29-30 illustrate example visualizations for a network.

Example Pseudocode

FIG. 63 illustrates an example of determining a meta tie value in the python coding language.

FIG. 64 illustrates an example of generating a meta asset value in the python coding language.

FIG. 65 illustrates an example of generating a network comprising patent publication asset nodes, scientific publications asset nodes, and company nodes. It further illustrates generating ties between these nodes, generating meta asset values, generating meta tie values. It further illustrates calculating an asset's network influence based on the network containing the nodes, ties, and values.

FIG. 66 is an example of how the Latent Dirichlet Allocation algorithm may be used to assign a document to a topic.

FIG. 67 is an example of sentences or paragraphs conforming to a given topic may be extracted from a document using a rule-based approach. It further illustrates how documents may be assigned to topics using a rule-based algorithm.

FIG. 68 is an example of an output which may be generated by the rule-based sentence extraction illustrated in FIG. 67.

FIG. 69 is an example of how a file containing patent documents and associated attributes maybe loaded into a Neo4j Graph Database.

Predicting Successful Investment Opportunities

In some embodiments, early stage investment opportunities (e.g., companies, sectors, technologies, products, R&D projects) can be identified. For example, investment opportunities can be ranked by likelihood of success. In addition, a particular investment opportunity (e.g., company, sector, technology, products, R&D projects) can be evaluated to determine its likelihood of success or failure (e.g., false positive), and/or strengths or weaknesses. For example, companies can be monitored at early stages of development, such as for example biotech companies before the phase 3 stage (e.g., phase 3 can be defined as the final phase of clinical trials for an experimental new drug, which is only reached if phase 2 trials show evidence of effectiveness). As another example, R&D projects, or new technologies, or new product development can also be monitored and assessed at early stages and before making investment decisions, prior to products or services being available on the market. Non-traditional predictors of success (e.g., patents, scientific acumen, collaboration networks, influence, founder history, media data, etc.) can be used instead of or in addition to traditional predictors of success (e.g., financial variables, for example estimated revenue, revenue CAGR growth, profit margins, valuations, shareholder returns etc.).

Figure 70:
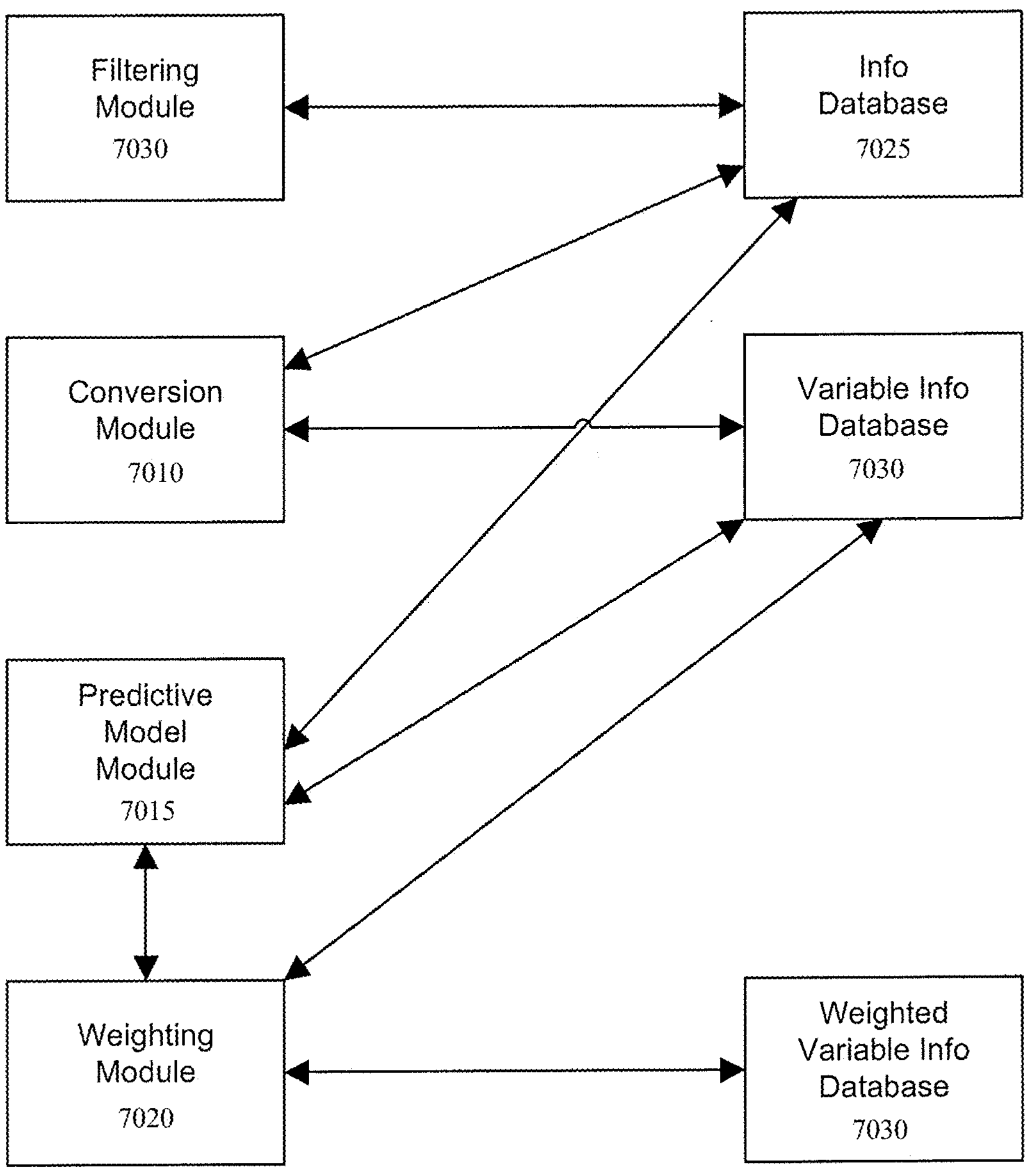
FIG. 70 illustrates a system for predicting investment opportunities, according to embodiments of the invention.

FIG. 70 illustrates a system for predicting investment opportunities, according to an embodiment. The system can comprise: an information database 7025, a variable information database 7030, and a weighted variable database 7035, a filtering module 7005, a conversion module 7010, a predictive model module 7015, or a weighting module 7020, or any combination thereof.

Figure 71:
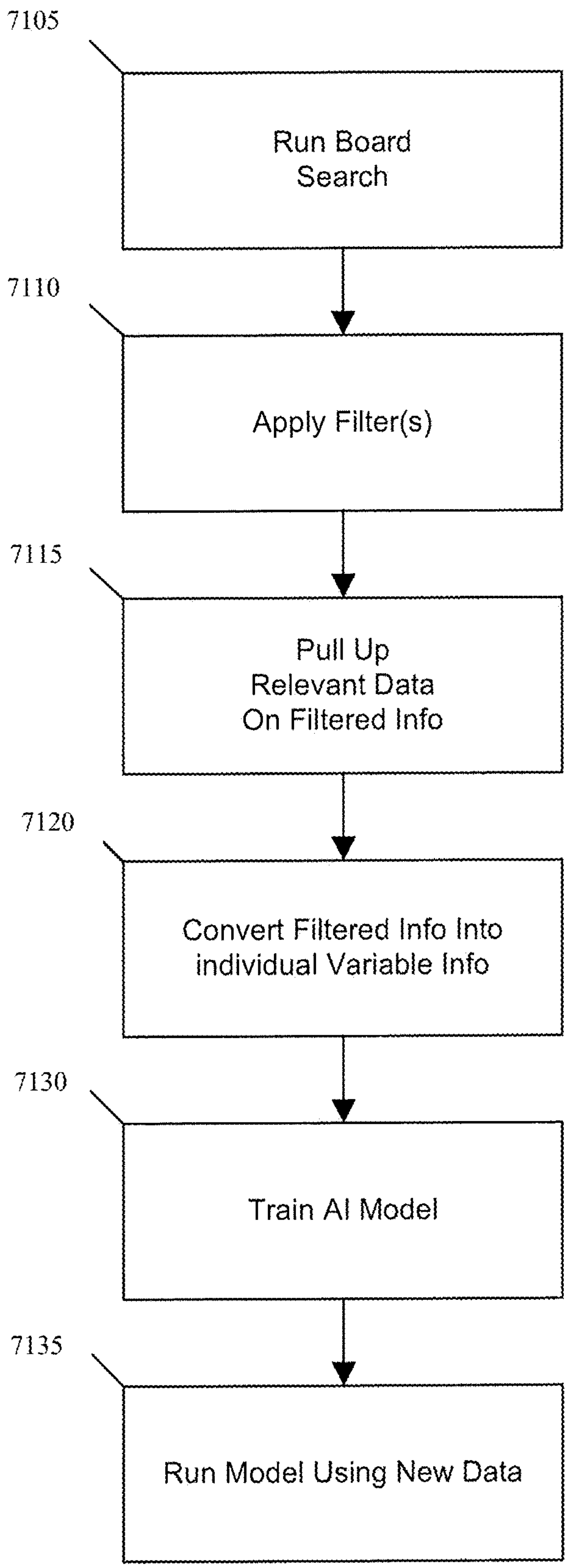
FIG. 71 illustrates a method for predicting investment opportunities, according to embodiments of the invention.

FIG. 71 illustrates a method for predicting investment opportunities. (Note that FIG. 77 sets forth a detailed example of method 7100.) In 7105, a broad search (e.g., using a semantic-based search, industry and/or technology codes, industry knowledge, interviewing of subject matter experts, media mentions, scientific research, smart money flows, patent filings, company activity databases (e.g., Capital IQ, Crunchbase), investment activity database (e.g., Pitchbook), industry reports) can be run to come up with a broad list of opportunities. For example, a keyword-based search of a QUID companies database, or a CapitalIQ industry code search (e.g., using various immune-oncology terminology and/or industry or sector codes) can be performed.

In 7110, filter(s) can be applied to come up with a filtered list that is a subset of the broad search results. Examples of filters can include the ability to measure independent and/or dependent variables. FIG. 76 sets forth an example filtering process. For example, in an immune-oncology space, 800 companies can be discovered using keyword based searches of the Quid companies database. 772 can have CapIQ IDs. 7198 can have at least one financial period in CIQ. 7181 can be companies that are not now successes. 7135 can have data for at least one dependent success variable.

Figure 73F:
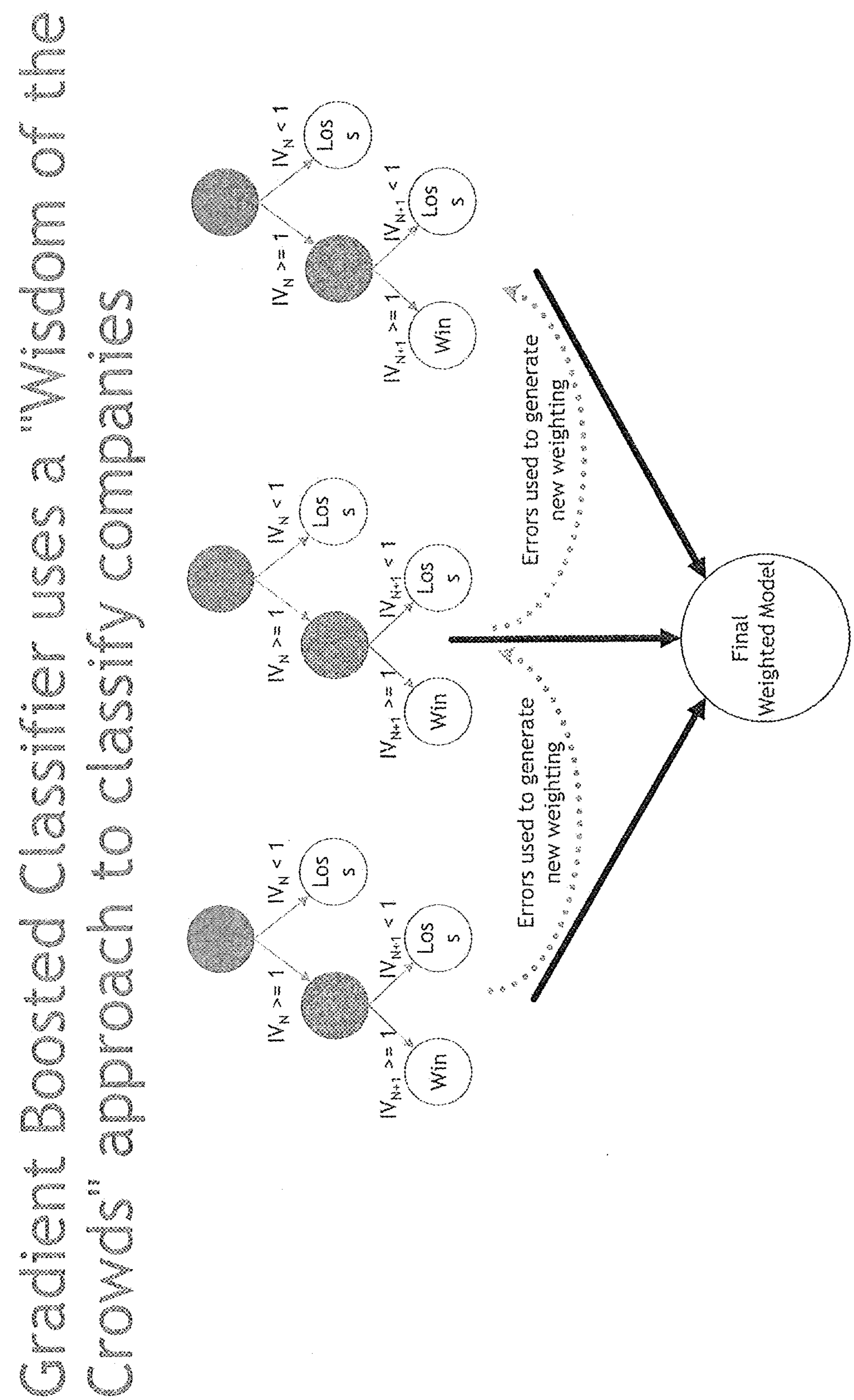

In 7115, relevant data (e.g., data related to the independent and/or dependent variables) can be pulled on the filtered companies. FIG. 73B illustrates example data that can be pulled and prepared (e.g., cleaned). For example, FIG. 73B illustrates various data files (e.g., quid raw data files, raw data files, capital IQ data files, instructions for financial data integration, patent records collated data file, patent families collated data file, company level patent data (IA), company level patent data (gamma), scientific literature collated data file, scientific literature collated data file (Hindex), rank of journals, company level patent data (SNA), collaboration networks (Sci. Lit), prerequisite file quid raw data (investor vent report)) that can be pulled and cleaned. The quantity, file type, worksheets, whom to provide, additional fields apart from default, comments, and detailed instructions for data file creation can be provided for each type of data file.

Cleaning and conversion of data can generate network features for networks (e.g., collaboration, citation, influence networks). Network metrics can be calculated from network features and used as independent variables. Note that this is just an example, and more (e.g., media data) or less data can be pulled. In some embodiments, data that is time sensitive can be adjusted so that it can be used as if it were historic data (e.g., the collected data can be adjusted to coincide with training dates). Data adjustments can be made prior to the variable metric calculation in order to mimic the measurement year. FIG. 73D illustrates example dependent variable metric calculations that can be done.

Figure 80:
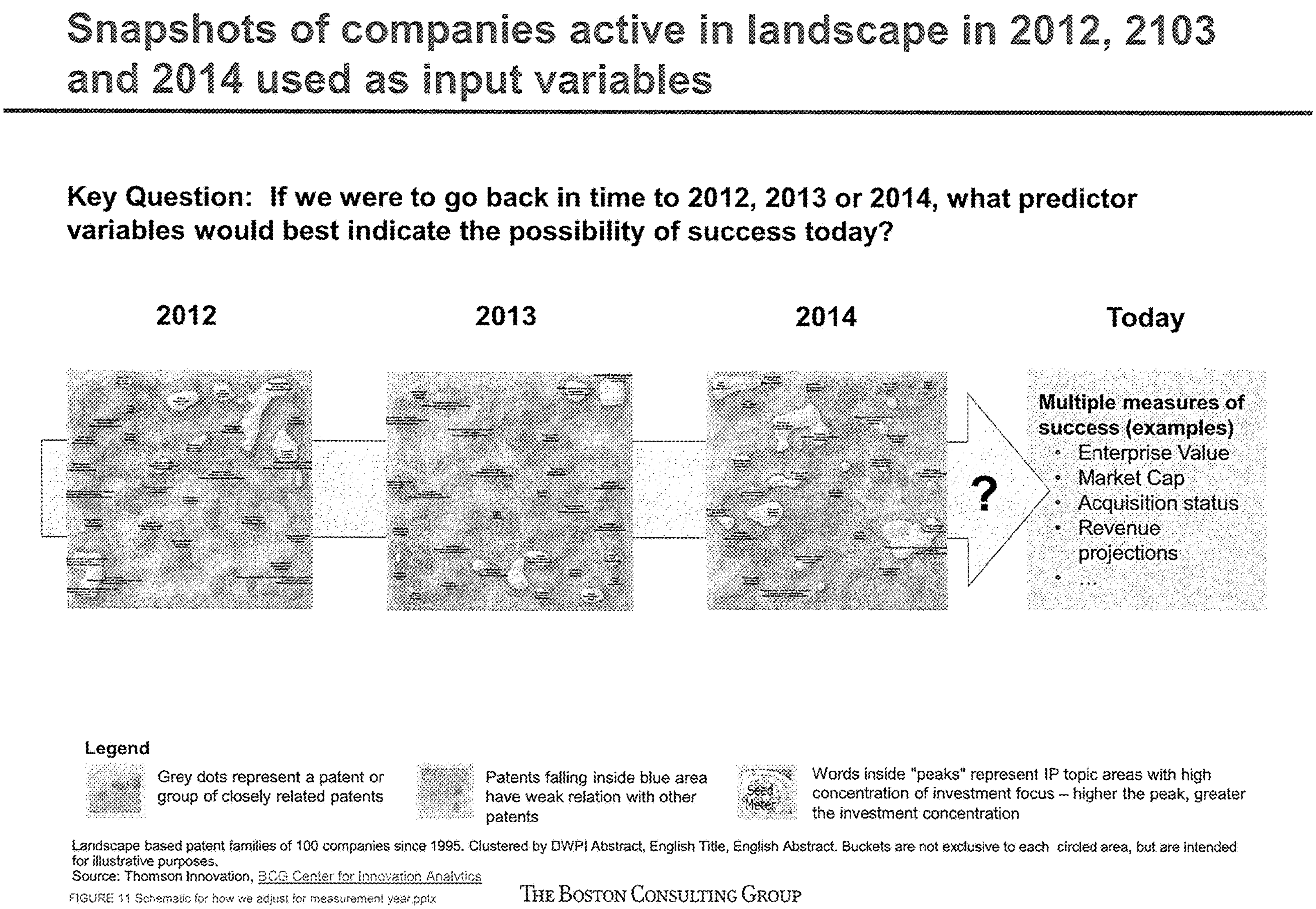
FIG. 80 sets forth example details of company information active in various years, according to embodiments of the invention.
Figure 80:
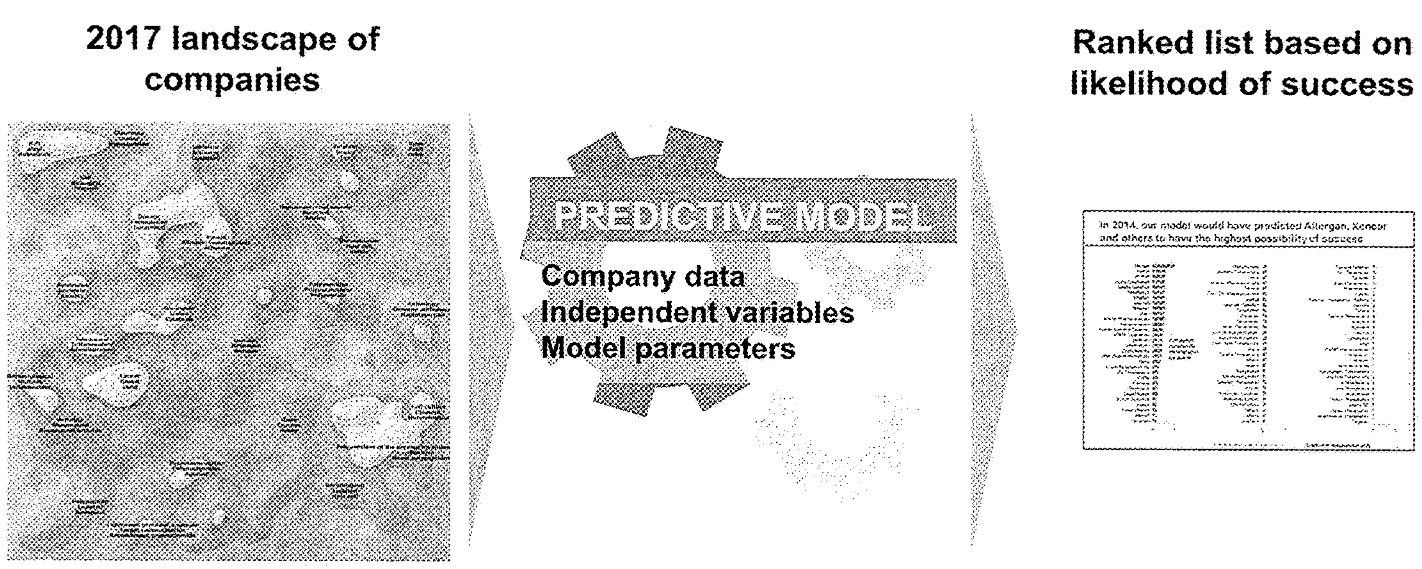

FIG. 80 sets forth example details of company information active in various years (e.g., 2012, 2013, and 2014). Various time frames can be reviewed to determine which predictor variables would best indicate the possibility of success. Multiple measures of success can be reviewed (e.g., enterprise value, market cap, acquisition status, revenue projections, etc.). The grey dots in FIG. 80 can represent a patent or group of closely related patents. Patents falling inside a blue area have a weak relation with other patents. Words inside peaks can represent IP topic areas with high concentration of investment focus. The higher the peak, the greater the investment concentration can be.

The model can look at a current landscape to identify and prioritize targets with a high possibility of success. A ranked list based on a likelihood of success can be provided. The model can provide the ability to focus on therapeutic areas of most interest. The predictive capability can be further refined.

FIG. 73A shows a detailed example of how some example files can be converted to take into account measurement year, including: patent citations that were adjusted to remove those that occurred after the measurement year, scientific literature citations adjusted up to the measurement year, financial data adjusted up to the measurement year, and all metrics calculated up to the measurement year. For example, in FIG. 73A, several types of pre-requisite data can be converted, including: patent records collated data file, patent families collated data file, scientific literature collated data file, scientific literature collated data file (Hindex), and quid raw data file of 7000 M&A targets. Example logic steps for converting each of these different types of data is shown on FIG. 73A.

In 7120, the relevant data about the filtered companies can be converted into individual independent and dependent variable information and stored in a database. FIGS. 74A-74K sets forth example details on how the conversion can take place. Note that the individual variable information can change depending on the companies, sectors, etc. being analyzed. FIG. 74A illustrates financial data metrics that can be used in an example. FIG. 74B illustrates founder data metrics that can be used in an example. FIG. 74C illustrates funding data metrics that can be used in an example. FIGS. 74D-74G illustrate patenting activity metrics that can be used in an example. FIGS. 74H-74J illustrate scientific literature metrics that can be used in an example. FIG. 74K illustrates other metrics that can be used in an example.

In 7130, a machine learning technique (e.g., gradient boosting) can be used to train the predictive model using the converted individual variable information and previously known data (e.g., sample predictions made using data from 2014, and successes observed in 2017) to determine weights to assign the individual variables. Gradient boosting comprises a machine learning technique for regression and classification problems, which can produce a prediction model in the form of an ensemble of weak prediction models (e.g., decision trees). It can build the model in a stage-wise fashion like other boosting methods do, and it can generalize them by allowing optimization of an arbitrary differentiable loss function. For more information on gradient boosting, see the Nov. 20, 2018 Wikipedia page (https://en.wikipedia.org/wiki/Gradient_boosting), which is herein incorporated by reference.

FIG. 78 illustrates details of how the gradient boosting technique is trained. In step 1, model data preparation and training can be completed. In step 1*a*, the final data preparation and training can be activated and can include two classes. In step 1*b*, one of the classes from step 1*a* can include code for calling a specific function. In step 2, the capability of predicting success and/or failure in the future can be determined.

FIG. 79 illustrates details of how the trained gradient boosting technique is tested using cross-validation, according to an embodiment. In step 1 cross validation can be done. In step 1*a*, a certain function can be activated from a certain class. In step 1*b*, the certain class can include code for calling the specific function which is defined within a certain file. In step 1*c*, the certain function within the file can use a pre-defined function.

FIGS. 73A, 73E-73F, and 75A-75F illustrate additional details on how the gradient boosting technique works and can be used (e.g., to determine which variables are most important in any given investment opportunity to determine the likelihood of success). In 7135, the trained predictive model can be run using the weighted individual independent variables on new data to predict future investment opportunities.

FIG. 75A-75F illustrate additional pseudo-code details about the predicted model. FIG. 75A is example python code illustrating how an Extract, Transform, and Load (ETL) process can be orchestrated to prepare data into appropriate format, generate derived independent variables, and train a machine learning model. Although this example uses a python library called Luigi (https://github.com/spotify/luigi) which can be published as an open source library and maintained by the company Spotify, there are many other ETL libraries or software tools which could be used such as Apache Airflow (https://airflow.apache.org/), Bonobo (https://www.bonobo-project.org/), or Alteryx (https://www.alteryx.com/).

FIG. 75B is example python code illustrating how a predictive model may be diagnosed and evaluated for accuracy or goodness of fit. In this example, cross validation can be used to score the model's predictions against true values of the dependent variables. Similarly, this code also illustrates the generation and saving of charts illustrating the model's predictive power in some embodiments. For example, a Receiver Operating Characteristic (ROC) curve can be generated and saved to disk. The Area Under the Curve (AUC) value can also be generated along with accuracy, lift, and feature importances, which can all be written to disk in a file.

FIG. 75C is example python code illustrating class hierarchy for predictive modelling objects. The PredictiveModel class can be a parent class comprising a group attributes and methods common to all instances of PredictiveModel. For example, this parent class can have the attribute "version" and "model_type" which can be used to keep track of the various evolutionary generation of the predictive models. Class inheritance may be an object-oriented programming concept known to those skilled in the art.

FIG. 75D is example python code illustrating how an Extract, Transform, and Load (ETL) process can be orchestrated to process raw data into one or more data structures which can be ready to be used as training and testing data for a predictive modeling process.

FIG. 75E is example python code illustrating how an Extract, Transform, and Load (ETL) process can be orchestrated to run a series of diagnostic tests on a trained predictive model. In this specific example, the Luigi library can be used to orchestrate the diagnostic methods defined in FIG. 75B over the models defined in FIG. 75C.

Example Process for Collecting Data

FIG. 73C illustrates an example method for collecting the data for use with the system. In step 1, a tab delimited text file can be created from ach worksheet where scientific literature is stored. In step 2, the information can be merged into one text file or kept as separate files and sent to an IA team. In step 3, the IA team can load data into a WOK navigator using a wizard and input files. In step 4, the IA team can resolve affiliation and authors. In step 5, the IA team can spend time using suggest groups to further clean the data. In step 6, the IA team can load the network and export the data to EXCEL. In step 7, the system can collect data for affiliation collaboration and author collaboration.

Variable Details

FIGS. 72A-72F show example variables that can be used. Note that any or all of these variables, in addition to other variables in some cases, may be utilized. Variables can include patents (e.g., count, growth spikes, quality, citation patterns, productization); scientific literature (e.g., count, growth spikes, quality, collaboration networks, impact score); funding information (e.g., amounts, stages, timeline), financial information (R&D spend, revenue, profit), founder information (e.g., experience, relationships, collaboration networks); other information (e.g., employee count, products in clinical trial, sub-technology ranking); and media information (e.g., volume, media spikes, sentiment over time).

FIG. 74A-74K shows details related to how various variable metrics (e.g., financial metrics, natural metrics, founder metrics, fending metrics, patent metrics, scientific literature metrics, other metrics) are calculated and used, according to embodiments of the invention.

FIGS. 81A-81F shows additional information related to the example variable definitions.

Figure 82A:
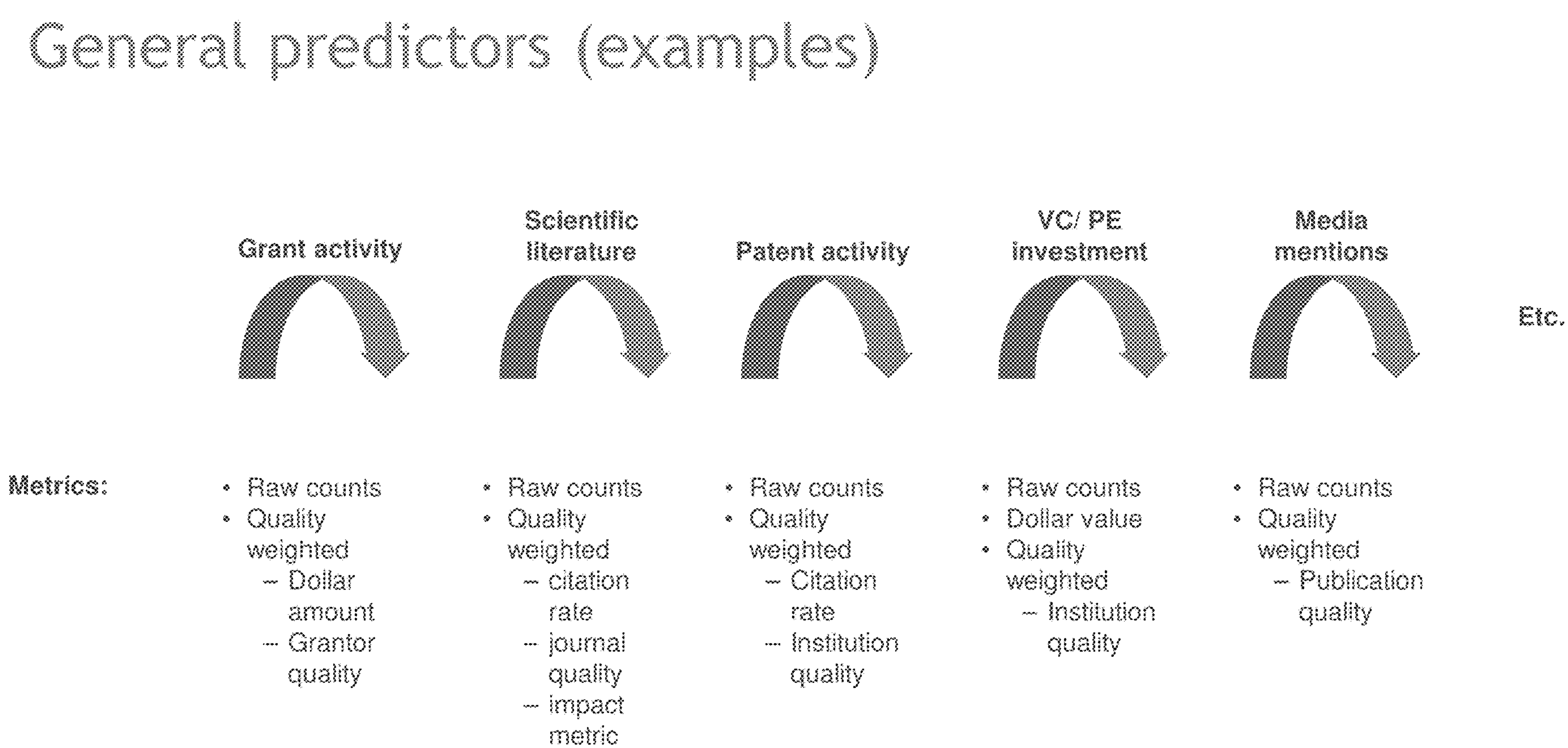
FIGS. 82A-82B show examples of pre-financial variables, according to embodiments of the invention.
Figure 82B:
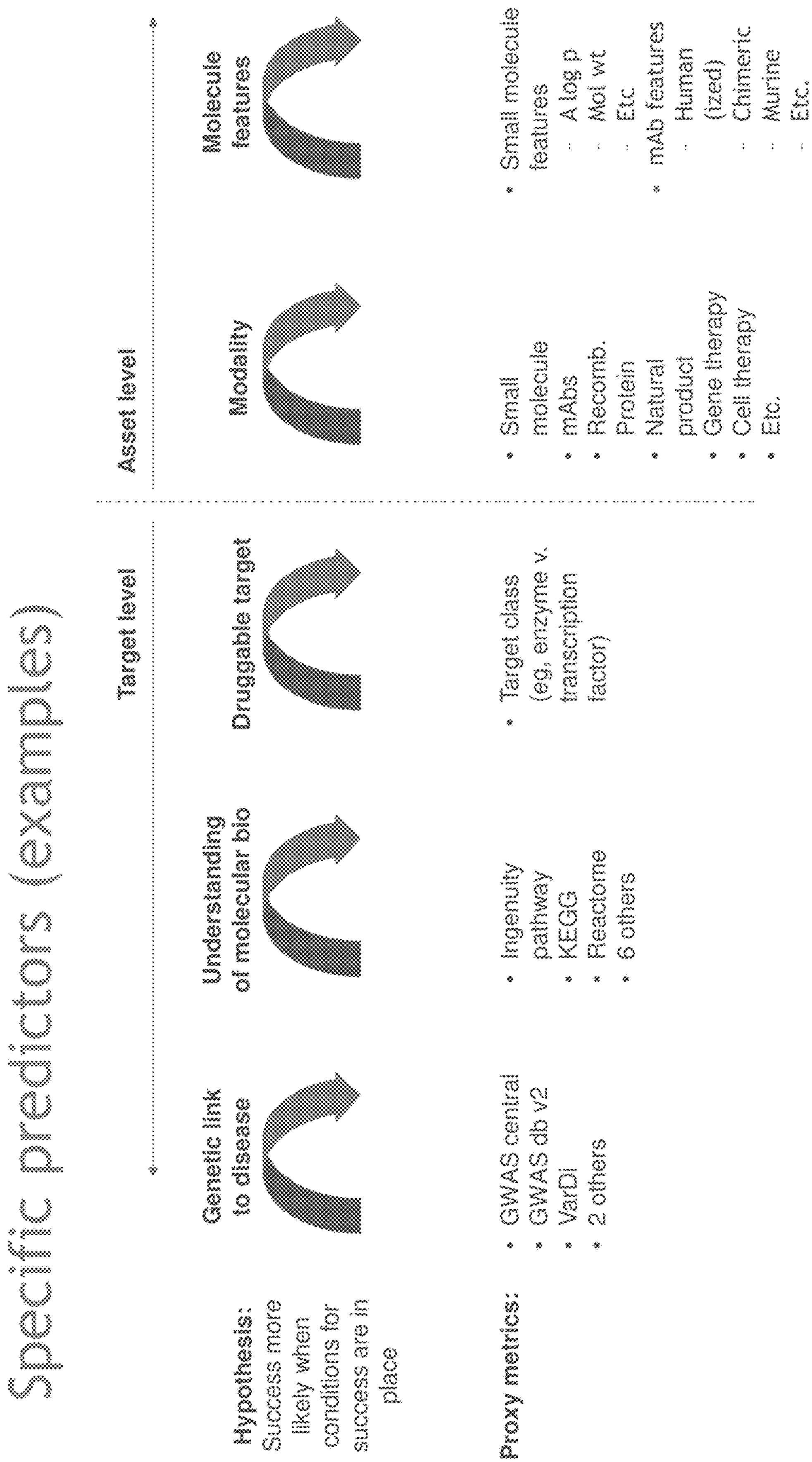

FIGS. 82A and 82B show examples of pre-financial variables.

Machine Learning Details

As discussed above with respect to 7130 and 7135 of FIG. 71, the predictive model can use the dependent variables combined with other independent variables into a "model ready" data frame that can be trained. In some embodiment, the predictive model can be a classifier model, and can comprise one or more of the following: a gradient boosted classifier, a logistic regression classifier, a neural network classifier, and/or a support vector machine classifier.

When a gradient boosted classifier is used, it can have many input parameters. In order to find the best combination of input parameters, we can write a script to try a large number of variations and then combine the results of each combination at the end. The combination of parameters which produce the best output can be used as the final model. In some embodiments, because we have few data points, a traditional train/test methodology may be inappropriate. The predictive model can be trained using previous datasets. Then, the trained predictive model can be used to predict outcome success of companies in the future (e.g., 3 years from now) given data from today.

In some embodiments, weighted variables can be used when predicting future success. The variable weights may be determined when the predictive model is being trained.

In some embodiments, we can consider the stage of maturity of for example, companies, technologies or assets when training the model. For example, we can categorize companies into cohorts based on the FDA approval phase of their drug and adjust our dependent success variables (for example, Total Shareholder Return or TSR) relative to cohort.

BCG patent quality index can be an indicator of quality for: comparing the relative strength of different technologies within a company; comparing relative strength of portfolios between competitors; or identifying and prioritizing patents for further legal and technical investigation to determine their potential strength or value; or any combination thereof. A patent quality index can be based on several key measures that have been shown empirically to correlate most highly with patent value Example measures can comprise: age adjusted forward citation counts; breadth of patent claims; or large number of diverse, backward citations; or any combination thereof. For each of these measures, values for the entire dataset can be indexed to 7000. In addition, each of these measures can be weighted according to a pre-determined weighting scheme. The weighted sum for each patent can then be calculated. An individual patent's BCG Quality Index can be interpreted relative to other patents in the defined portfolio. High quality patents can be defined as the top scoring patents within a given database.

The following references, which are herein incorporated by reference, show various ways that a patent quality index can be determined:

Juan Alcácer, Michelle Gittelman & Bhaven Sampat, Applicant and examiner citations in U.S. patents: An overview and analysis, 38 Res. Policy 415-427 (2009).

James Bessen, The value of U.S. patents by owner and patent characteristics, 37 Res. Policy 932-945 (2008).

Gregory F Nemet & Evan Johnson, Do important inventions benefit from knowledge originating in other technological domains?, 41 Res. Policy 7090-7100 (2012).

DETAILED EXAMPLE

FIGS. 77A-77C illustrates a detailed example of the process of FIG. 71, according to an embodiment. As shown in FIGS. 77A-77C, a method for extraction, transformation and load (ETL) can be done. In step 1, many kinds of data can be gathered from many sources. 1*a* illustrates example types of data, which can include: patents, inventorship, financial data, media data, investment data, founder, and open source software contributions. In 1*b*, example methods of gathering are shown, which can include: RESTful APIs, FTP servers, manual download from web app, and automated crawling of websites. In step 2, data can be placed in raw folders. In step 3, data can be cleaned and combined into a standard format.

In step 4, derived data points can be generated from the cleaned raw data. In 4*a*, derived data point examples are shown, which can include: a quality index score, a sentiment of media text, a collaboration network metrics, a CAGR metrics. In step 5, cleaned data and derived data can be combined into a single dataframe. In step 6, data can be split into an observation year and a measure year. In step 7, missing data can be imputed. In step 8, dependent variables can be derived. In step 9, dependent variables can be combined with other independent variables into a model ready dataframe. In step 10, the model can be trained. In step 11, the model can be tested. In step 12, model diagnostics can be written to test and graphical charts and presented to a user. In step 13, the model can be used to predict the outcome of success of the companies. In step 14, the model can be used to predict the outcome of companies in a certain number of years. In step 15, the model results can be compared against similar stock indexes and/or human measurements to determine if similar.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown. For example, the steps in the flowcharts do not need to be completed in the order specified, but can be completed in a different order.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 7012(f). Claims that do not expressly include the phrase "means for" or "step for" are not to be interpreted under 35 U.S.C. 7012(f).

The invention claimed is:

1. A method for processing information, comprising:

receiving, by a processor, a data set comprising information from multiple sources including patents, scientific articles, company data, and financial data, wherein the data is associated with a company;

extracting, by the processor utilizing natural language processing, attributes from the information, wherein the extracting comprises removing stopwords, performing stemming, and generating word frequency distributions of the data set, wherein the natural language processing comprises tokenizing the data set;

generating, by the processor, a graph database with nodes corresponding to the information and ties corresponding to the attributes, wherein a value of the tie corresponds to at least one of a co-occurrence, structural equivalents, or relationship between the attributes, wherein the value is calculated using a similarity algorithm selected from cosine similarity, Euclidean distance, Manhattan distance, Minkowski distance, and Jaccard similarity, wherein generating the graph database further comprises:

identifying, by the processor in the graph database, multiple tie categories for multiple types of information that can be categorized, a tie comprising a relationship between information;

determining, by the processor, a relative definition for each tie category based on at least one of centrality, eigenvector centrality, and betweenness centrality of nodes in the graph database;

assigning, by the processor, a category weight for each tie category using the determined relative definition for each tie category, wherein the category weight represents a probability of information transfer between nodes;

combining, by the processor, the value of the tie with the tie category weight to create a weighted tie value for each tie, wherein the weighted tie value represents a cumulative strength of connection between nodes; and combining, by the processor, all weighted tie values into a meta tie value to identify clusters of similar nodes and to rank nodes based on their importance and influence within the graph database, wherein the meta tie value is further configured to identify bridges comprising nodes that connect otherwise unconnected clusters of nodes in the graph database; and predicting, by the processor using a machine learning model, a future outcome of success for the company based on an input comprising the weighted tie value for each tie and the meta tie value.

2. The method of claim 1, wherein the multiple sources further include social media data and news articles.

3. The method of claim 1, wherein the attributes extracted from the information include patent citations, scientific article citations, company financial metrics, and founder information.

4. The method of claim 1, wherein the relative definition for each tie category is determined based on a combination of centrality, eigenvector centrality, and betweenness centrality of nodes in the graph database.

5. The method of claim 1, further comprising filtering the nodes and ties in the graph database based on predefined criteria before combining the weighted tie values.

6. The method of claim 1, wherein the machine learning model comprises at least one of a gradient boosted classifier, a logistic regression classifier, a neural network classifier, and a support vector machine classifier.

7. The method of claim 1, further comprising visualizing the graph database using a network visualization tool to display relationships between nodes.

8. The method of claim 1, wherein the future outcome of success for the company is predicted for a specific time period.

9. The method of claim 1, further comprising adjusting the prediction based on a stage of maturity of the company.

10. The method of claim 1, further comprising determining potential sources of innovation comprising at least one of people, companies, technologies, concepts, or themes based on the meta tie value.

11. A system for processing information, comprising:

a processor; and a memory storing instructions that, when executed by the processor, cause the processor to:

receive a data set comprising information from multiple sources including patents, scientific articles, company data, and financial data, wherein the data is associated with a company;

extract, utilizing natural language processing, attributes from the information, wherein the extracting comprises removing stopwords, performing stemming, and generating word frequency distributions of the data set, wherein the natural language processing comprises tokenizing the data set;

generate a graph database with nodes corresponding to the information and ties corresponding to the attributes, wherein a value of the tie corresponds to at least one of a co-occurrence, structural equivalents, or relationship between the attributes, wherein the value is calculated using a similarity algorithm selected from cosine similarity, Euclidean distance, Manhattan distance, Minkowski distance, and Jaccard similarity, wherein the instructions that cause the processor to generate the graph database further cause the processor to:

identify, in the graph database, multiple tie categories for multiple types of information that can be categorized, a tie comprising a relationship between information;

determine a relative definition for each tie category based on at least one of centrality, eigenvector centrality, and betweenness centrality of nodes in the graph database;

assign a category weight for each tie category using the determined relative definition for each tie category, wherein the category weight represents a probability of information transfer between nodes;

combine the value of the tie with the tie category weight to create a weighted tie value for each tie, wherein the weighted tie value represents a cumulative strength of connection between nodes; and combine all weighted tie values into a meta tie value to identify clusters of similar nodes and to rank nodes based on their importance and influence within the graph database, wherein the meta tie value is further configured to identify bridges comprising nodes that connect otherwise unconnected clusters of nodes in the graph database; and predict, using a machine learning model, a future outcome of success for the company based on an input comprising the weighted tie value for each tie and the meta tie value.

12. The system of claim 11, wherein the multiple sources further include social media data and news articles.

13. The system of claim 11, wherein the attributes extracted from the information include patent citations, scientific article citations, company financial metrics, and founder information.

14. The system of claim 11, wherein the relative definition for each tie category is determined based on a combination of centrality, eigenvector centrality, and betweenness centrality of nodes in the graph database.

15. The system of claim 11, wherein the instructions further cause the processor to filter the nodes and ties in the graph database based on predefined criteria before combining the weighted tie values.

16. The system of claim 11, wherein the machine learning model comprises at least one of a gradient boosted classifier, a logistic regression classifier, a neural network classifier, and a support vector machine classifier.

17. The system of claim 11, wherein the instructions further cause the processor to visualize the graph database using a network visualization tool to display relationships between nodes.

18. The system of claim 11, wherein the future outcome of success for the company is predicted for a specific time period.

19. The system of claim 11, wherein the instructions further cause the processor to adjust the prediction based on a stage of maturity of the company.

20. The system of claim 11, wherein the instructions further cause the processor to determine potential sources of innovation comprising at least one of people, companies, technologies, concepts, or themes based on the meta tie value.

21. The method of claim 1, wherein the bridges are identified using at least one of betweenness centrality, Katz centrality metric, Freeman metric, or Burt's constraint metric to determine nodes positioned at intersections of previously disconnected networks.

22. The system of claim 11, wherein the bridges are identified using at least one of betweenness centrality, Katz centrality metric, Freeman metric, or Burt's constraint metric to determine nodes positioned at intersections of previously disconnected networks.

* * * * *